United States Patent
Szum et al.

(10) Patent No.: US 6,661,959 B2
(45) Date of Patent: *Dec. 9, 2003

(54) RADIATION-CURABLE OPTICAL GLASS FIBER COATING COMPOSITIONS, COATED OPTICAL GLASS FIBERS, AND OPTICAL GLASS FIBER ASSEMBLIES

(75) Inventors: David M. Szum, Elmhurst, IL (US); Chander P. Chawla, Batavia, IL (US); James R. Petisce, West Dundee, IL (US); John T. Vandeberg, Barrington, IL (US); George Pasternack, Riverwoods, IL (US); Timothy E. Bishop, Algonquin, IL (US); Paul E. Snowwhite, Elgin, IL (US); Edward P. Zahora, Naperville, IL (US); Stephen C. Lapin, Waterford, WI (US)

(73) Assignee: DSM N.V., Heerlen (NL)

( * ) Notice: Subject to any disclaimer, the term of this patent is extended or adjusted under 35 U.S.C. 154(b) by 59 days.

This patent is subject to a terminal disclaimer.

(21) Appl. No.: 10/004,410

(22) Filed: Dec. 6, 2001

(65) Prior Publication Data

US 2002/0168163 A1 Nov. 14, 2002

Related U.S. Application Data

(63) Continuation of application No. 09/838,140, filed on Apr. 20, 2001, now Pat. No. 6,339,666, which is a continuation of application No. 09/035,771, filed on Mar. 6, 1998, now Pat. No. 6,298,189, which is a continuation-in-part of application No. 08/877,585, filed on Jun. 17, 1997, now abandoned, which is a continuation-in-part of application No. 08/840,893, filed on Apr. 17, 1997, now abandoned, which is a continuation-in-part of application No. 08/745,790, filed on Nov. 8, 1996, now abandoned.

(51) Int. Cl.[7] ............................... G02B 6/22; C08F 2/48
(52) U.S. Cl. ..................... 385/128; 385/141; 385/145; 522/178
(58) Field of Search ................................. 385/123–128, 385/141, 143, 145; 522/172–183, 904, 905

(56) References Cited

U.S. PATENT DOCUMENTS

| | | |
|---|---|---|
| 3,984,172 A | 10/1976 | Miller |
| 4,472,021 A | 9/1984 | Ansel et al. |
| 4,474,830 A | 10/1984 | Taylor |
| 4,496,210 A | 1/1985 | Ansel et al. |

(List continued on next page.)

FOREIGN PATENT DOCUMENTS

| | | |
|---|---|---|
| CA | 2171504 | 9/1996 |
| DE | 4302327 | 8/1994 |
| EP | 104 864 A2 | 4/1984 |

(List continued on next page.)

OTHER PUBLICATIONS

Properties of the R1055 coating composition, which was commercially available before Nov. 1995.
Properties of the 950–106 coating composition, which was commercially available before Nov. 1995.
Properties of the 3471–1–129 coating composition, which was commercially available before Nov. 1995.

(List continued on next page.)

*Primary Examiner*—John D. Lee
(74) *Attorney, Agent, or Firm*—Pillsbury Winthrop LLP

(57) ABSTRACT

Optical fiber coatings are disclosed having excellent ribbon stripping and adhesion behavior. The coatings are radiation-curable. The excellent stripping and adhesion behavior can be achieved by several means which include by use of additives, by use of radiation-curable oligomers having higher molecular weight, or by use of coatings having certain thermal properties. Combination of means can be employed. Stripping behavior can be measured by crack propagation and fiber friction measurements.

25 Claims, 11 Drawing Sheets

U.S. PATENT DOCUMENTS

| | | | |
|---|---|---|---|
| 4,624,994 A | 11/1986 | Ansel | |
| 4,636,223 A | 1/1987 | Mehl et al. | |
| 4,642,265 A | 2/1987 | Suzuki | |
| 4,660,927 A | 4/1987 | Kondow et al. | |
| 4,822,850 A | 4/1989 | Yashuda et al. | |
| 4,844,604 A | 7/1989 | Bishop et al. | |
| 4,900,126 A | 2/1990 | Jackson et al. | |
| 4,913,859 A | 4/1990 | Overton et al. | |
| 5,011,260 A | 4/1991 | Marx et al. | |
| 5,033,335 A | 7/1991 | Yatsu et al. | |
| 5,037,763 A | 8/1991 | Petisce | |
| 5,093,386 A | 3/1992 | Bishop et al. | |
| 5,104,433 A | 4/1992 | Chapin et al. | |
| 5,146,531 A | 9/1992 | Shustack | |
| 5,219,896 A | 6/1993 | Coady et al. | |
| 5,227,410 A | 7/1993 | Eckberg et al. | |
| 5,240,971 A | 8/1993 | Eckberg et al. | |
| 5,302,627 A | 4/1994 | Field et al. | |
| 5,336,563 A | 8/1994 | Coady et al. | |
| 5,345,528 A | 9/1994 | Katz et al. | |
| 5,352,712 A | 10/1994 | Shustack | |
| 5,373,578 A | 12/1994 | Parker | |
| 5,379,363 A | 1/1995 | Bonicel et al. | |
| 5,384,342 A | 1/1995 | Szum | |
| 5,473,720 A | 12/1995 | Ali et al. | |
| 5,492,733 A | 2/1996 | D'Anna et al. | |
| 5,502,145 A | 3/1996 | Szum | |
| 5,787,218 A | 7/1998 | Ohtaka et al. | |
| 5,907,023 A | 5/1999 | Chawla | |
| 5,913,004 A | 6/1999 | Takase et al. | |
| 5,949,940 A | 9/1999 | Botelho et al. | |
| 5,977,202 A | 11/1999 | Chawla et al. | |
| 6,014,488 A | 1/2000 | Shustack | |
| 6,110,593 A | 8/2000 | Szum et al. | |
| 6,169,126 B1 | 1/2001 | Szum et al. | |
| 6,222,969 B1 | 4/2001 | Botelho et al. | |
| 6,298,189 B1 * | 10/2001 | Szum et al. | 385/128 |
| 6,339,666 B2 * | 1/2002 | Szum et al. | 385/128 |

FOREIGN PATENT DOCUMENTS

| | | |
|---|---|---|
| EP | 104 864 B1 | 4/1984 |
| EP | 116 140 | 8/1984 |
| EP | 260 842 | 3/1988 |
| EP | 307 218 | 3/1989 |
| EP | 407 004 | 1/1991 |
| EP | 527 266 | 2/1993 |
| EP | 535 828 | 4/1993 |
| EP | 565 798 | 10/1993 |
| EP | 732 625 | 9/1996 |
| EP | 780 712 | 6/1997 |
| EP | 262 340 | 4/1998 |
| JP | 58-115402 | 7/1983 |
| JP | 59-074506 | 4/1984 |
| JP | 59-074507 | 4/1984 |
| JP | 60-262115 | 12/1985 |
| JP | 02-062505 | 3/1990 |
| JP | 3-35210 | 2/1991 |
| JP | 8-113621 | 5/1996 |
| JP | 08-143806 | 6/1996 |
| WO | 94/19185 | 9/1994 |
| WO | 95/23772 | 9/1995 |
| WO | 96/11965 | 4/1996 |
| WO | 96/12749 | 5/1996 |
| WO | 96/23828 | 8/1996 |
| WO | 96/30182 | 10/1996 |
| WO | 98/21157 | 5/1998 |
| WO | 99/31161 | 6/1999 |

OTHER PUBLICATIONS

W.W. King et al., "Thermomechanical Mechanism for Delamination of Polymer Coatings from Optical Fibers," Journal of Electronic Packaging, Jun. 1997, vol. 199, pp. 133–138.

Mills, G., "Testing of 4– and 8–Fiber Ribbon Strippability," 427 International Wire and Cable Symposium Proceedings (1992), pp. 472–475.

Toler et al., "Factors Affecting Mechanical Stripping of Polymer Coatins from Optical Fibers," International Cable and Wire Symposium Proceedings (1989), pp. 509–512.

"Union Carbide and Organofunctional Silane Products and Applications," (1991, 1992), total of 18 pages.

Blyler et al., "Coatings and Jackets," Optical Fiber Telecommunications, 1979, Chapter 10, pp. 299–341.

Wu, Polymer Interface and Adhesion, Marcel Dekker, 1982, pp. 406–434.

"Release Agents," Encyclopedia of Polymer Science, 2nd edition, vol. 14, Wiley–Interscience 1988, pp. 411–421.

Jackson et al., "An Enhanced Ribbon Structure for High Fiber Count Cables in the Loop," International Wire and Cable Symposium Proceedings (1989) pp. 569–573.

Gadonna et al., Methods for the Characterization of the State of Fibre Primary Coating, EFOC/LAN, 10th Annual Conference, Paris (Jun. 1992) pp. 248–251.

Jackson et al., "Design and Performance of Compact 204–Fiber Ribbon Cable," Optical Fiber Communication Conference ( Jan. 1990)vol. 1, Paper WM10.

Kohtala et al. "Optical Fiber Ribbon Cable Manufacture," Wire Industry, Oct. 1991, pp. 627–630.

Schmid et al., "The Effect of UV Curable Secondary Buffers on the Strippability of Commercially Available Fibers," Wire Journal International (Oct. 1991) pp. 63–66.

Apicella et al., "Adhesion of Coatings on Glass: A New Measurement Method," EFOC Proceedings, (Jun. 1991), pp. 100–104.

Yuce et al., "The Effect of Coating Cure on the Mechanical Characteristics of Optical Fibers," International Wire and Cable Symposium Proceedings (1990), pp. 715–721.

Cuomo et al., "Behavior of Optical Fibre Stripping Force Under Different Aging Test Conditions," EFOC Proceedings (Jun. 1991), pp. 27–30.

Abel et al., "Dynamic Water Sensitivity of UV Acrylate Inks and Matrix Coating and Its Relationship to the Water Soak Performance of Optical Fibre Ribbons," EFOC & N, Fiber Optic Communications (1993), pp. 298–302.

Moses et al., "A Test for Optical Fiber Coating Strippability," International Wire and Cable Symposium Proceedings (1987), pp. 163–168.

Jackson et al., "Fiber Protective Coating Design Parameters for Current Telecommunication Applications," $10^{th}$ NFOEC Proceedings (Jun. 1994), pp. 93–100.

Sommer et al., "One Duel Coating System for Fiber to Meet All Needs: Long Time Loop and Ribbon Cable," 12 EFOC & N Proceedings (Jun. 1994), pp. 155–157.

Aloisio et al., "A Vasoelestic Analysis of Thermally Induced Residual Stress in Duel Coated Optical Fibers," International Wire and Cable Symposium Proceedings (1995), pp. 139–145.

Petisce et al., "Effect of novel cleaning solvents on optical fiber coatings," International Wire and Cable Symposium Proceedings (1994), pp. 126–133.

Edwards et al., "Ultraviolet–Cured Coatings for Optical Fibres—The Effect of Coatings Design on Fibre Reliability," SPIE–The International Society for Optical Engineering Proceedings, Fiber Optics Reliability and Testing: Benign and Adverse Environments, vol. 2074 (1993), pp. 120–128.

Lawson, "Contributions and Effects of Coatings on Optical Fibers," Proceedings—Optical Fibers in Adverse Environments, vol. 404, (SPIE), pp. 109–118 (No date).

Wei, "Degradation of Fiber Strength During Coating Stripping,"International Wire and Cable Symposium Proceedings (1989), pp. 199–204.

Szum et al., "New method for Measuring the Contribution of UV Cured Coatings Toward Color Changes Upoon Aging of UV Cured Inks," International Conference on Plastics in Telecommunications (PIT VI, Sep. 1992), pp. P10/1–P10/8.

Nuyken et al., "Oxetane Photopolymerization—A System with Low volume Shrinkage," Macromol. Symposium 107, (1996), pp. 125–138.

* cited by examiner

RADIATION-CURABLE OPTICAL GLASS FIBER COATING COMPOSITIONS, COATED OPTICAL GLASS FIBERS, AND OPTICAL GLASS FIBER ASSEMBLIES

CROSS-REFERENCE TO RELATED APPLICATIONS

This application is a continuation of application U.S. patent application Ser. No. 09/838,140, filed Apr. 20, 2001 (now U.S. Pat. No. 6,339,666), which is itself a continuation of U.S. patent application Ser. No. 09/035,771, filed on Mar. 6, 1998 (now U.S. Pat. No. 6,298,189), which is itself a continuation-in-part application of U.S. patent application Ser. No. 08/877,585, filed on Jun. 17, 1997 (abandoned), which is itself a continuation-in-part application of U.S. patent application Ser. No. 08/840,893, filed on Apr. 17, 1997 (abandoned), which is itself a continuation-in-part application of U.S. patent application Ser. No. 08/745,790, filed on Nov. 8, 1996 (abandoned), all of which are hereby incorporated in their entirety by reference.

FIELD OF THE INVENTION

The invention relates to radiation-curable inner and outer primary optical glass fiber coating compositions. The invention also relates to coated optical glass fibers and optical glass fiber assemblies. More particularly, the invention relates to a ribbon assembly having improved ribbon stripping capabilities.

BACKGROUND OF THE INVENTION

Optical glass fibers are usually coated with two superposed radiation-cured coatings, which together form a primary coating. The coating which contacts the glass surface is called the inner primary coating and the overlaying coating is called the outer primary coating.

The inner primary coating is usually a soft coating having a low glass transition temperature (hereinafter "Tg"), to provide resistance to microbending. Microbending can lead to attenuation of the signal transmission capability of the coated optical glass fiber and is therefore undesirable. The outer primary coating is typically a harder coating providing desired resistance to handling forces, such as those encountered when the coated fiber is cabled.

For the purpose of multi-channel transmission, optical glass fiber assemblies containing a plurality of coated optical fibers have been used. Examples of optical glass fiber assemblies include ribbon assemblies and cables. A typical optical glass fiber assembly is made of a plurality of coated optical glass fibers which are bonded together in a matrix material. For example, the matrix material can encase the optical glass fibers, or the matrix material can edge-bond the optical glass fibers together.

Optical glass fiber assemblies provide a modular design which simplifies the construction, installation and maintenance of optical glass fibers by eliminating the need to handle individual optical glass fibers.

Coated optical glass fibers for use in optical glass fiber assemblies are usually coated with an outer colored layer, called an ink coating, or alternatively a colorant is added to the outer primary coating to facilitate identification of the individual coated optical glass fibers. Such ink coatings and colored outer primary coatings are well known in the art. Thus, the matrix material which binds the coated optical glass fibers together contacts the outer ink layer if present, or the colored outer primary coating.

When a single optical glass fiber of the assembly is to be fusion connected with another optical glass fiber, or with a connector, an end part of the matrix layer can be removed to separate each of the optical glass fibers.

Desirably, the primary coatings on the coated optical glass fibers, and the ink coating if present, are removed simultaneously with the matrix material to provide bare portions on the surface of the optical glass fibers (hereinafter referred to as "ribbon stripping"). In ribbon stripping, the matrix material, primary coatings, and ink coating, are desirably removed as a cohesive unit to provide a clean, bare optical glass fiber which is substantially free of residue. This residue can interfere with the optical glass fiber ribbon mass fusion splicing operation, and therefore usually must be removed by wiping prior to splicing. However, the step of removing the residue can cause abrasion sites on the bare optical glass fiber, thus compromising the strength of the connection. The superior stripping functionality of ribbon assemblies to provide clean, residue-free, bare optical glass fibers during ribbon stripping according to this invention has heretofore been believed to be unobtainable.

A common method for practicing ribbon stripping at a terminus of the ribbon assembly is to use a heated stripping tool. Such a tool consists of two plates provided with heating means for heating the plates to about 90 to about 120 C. An end section of the ribbon assembly is pinched between the two heated plates and the heat of the tool softens the matrix material and the primary coatings on the individual optical glass fiber. The heat-softened matrix material and heat-softened primary coatings present on the individual optical glass fibers can then be removed to provide bare optical glass fiber ends, at which the fusion connections can be made. A knife cut is often used to initiate a break in the matrix material to the inner primary coating. Typically, only about a 1 to 4 cm section of the matrix material and coatings on the optical glass fibers need be removed. Identification of the bare individual optical glass fibers achieved by tracing back along the bare optical fiber until the ink coating or colored outer primary coating is seen.

U.S. Pat. No. 5,373,578 discloses a ribbon assembly containing a plurality of coated optical glass fibers. Each of the optical glass fibers is coated with an inner primary coating which is adjacent to the optical glass fiber, with an outer primary coating and an ink coating on the outer primary coating. The inner primary coating is modified so that adhesion between the inner primary coating and the optical glass fiber is reduced. This reduction in adhesion facilitates easy removal of the heat-softened primary coating when using a heat stripping method. While this patent discloses, at column 5, lines 10–13, that the adhesion between the inner primary coating and the optical glass fiber should be sufficient to prevent delamination of the inner primary coating from the optical glass fiber, any reduction in the adhesion between the inner primary coating and the optical glass fiber increases the possibility of such undesirable delamination, especially in the presence of moisture. Delamination of the inner primary coating from the optical glass fiber can lead to degraded strength of the optical glass fiber as well as signal transmission attenuation disadvantages.

Published European patent application 0262340 discloses a ribbon cable having a "peel layer" as the outermost coating layer on each of optical glass fibers contained within the ribbon cable. During ribbon stripping, the peel layer is destroyed and the matrix material is removed from the coated optical glass fibers. However, after ribbon stripping, the optical glass fibers are still coated with the primary coatings. That is, the primary coatings are not simultaneously removed with the matrix material in the ribbon assemblies disclosed in this publication.

U.S. Pat. No. 5,011,260 discloses a ribbon cable having a "decoupling layer" disposed between the coated optical glass fibers and the matrix material. In this manner, the matrix material may be easily removed from the coated optical glass fibers by application of low stripping force. This patent includes a general statement that the coatings on the optical glass fiber can be simultaneously removed with the matrix material during ribbon stripping. However, this patent fails to teach how to solve the problems associated with the residues remaining on the bare optical glass fibers after ribbon stripping conventional ribbon assemblies.

Published European patent application 0407004 discloses a ribbon cable containing a matrix material having sufficient adhesion to the ink coated optical glass fibers to remain adhered thereto during normal use but is easily strippable therefrom without damaging the integrity of the ink layer on the coated optical glass fibers. Thus, the ribbon assembly disclosed in this publication does not have the capability of removing the primary coatings on the optical glass fibers simultaneously with removal of the matrix material during ribbon stripping, so as to provide residue-free bare optical glass fibers.

Published European patent application 0527266 discloses a ribbon cable containing a lubricating "interfacial layer" which separates the matrix material from the coated optical glass fibers. The interfacial layer facilitates easy removal of the matrix material from the coated optical glass fibers. While this publication discloses at page 3, line 15, that the buffer layer and first protective coating can be stripped in one step, there is no disclosure teaching how to accomplish such an operation. Furthermore, the lubricating interfacial layer will inhibit simultaneous removal of the first protective coating with the matrix material. Thus, this publication does not teach how to make a ribbon assembly having the capability of removing the primary coatings on the optical glass fibers simultaneously with the matrix material during ribbon stripping, so as to provide residue-free bare optical glass fibers.

U.S. Pat. No. 4,900,126 discloses a ribbon cable in which the bonding adhesive forces between the ink layer and the primary coatings on the optical glass fibers are greater than the bonding between the ink layer and the matrix material. In this manner, the matrix material can be easily removed from the ink coated optical glass fibers without removing the ink layer. However, this patent does not address the problems associated with removing the primary coating layers simultaneously with the matrix material.

U.S. Pat. No. 4,660,927 teaches a silicone-coated optical fiber in which the soft silicone coating is easily peeled from the surface of the optical glass fibers by finger pressure. The coating contains a first siloxane component having aliphatic unsaturated groups and a second siloxane component having mercaptoalkyl groups. Because such a coating is easily peelable, as by rubbing with finger pressure, the coating has insufficient adhesion to the surface of the optical glass fibers to prevent delamination during most uses. Furthermore, this patent does not address the problems of ribbon stripping, but rather only the stripping of a single optical glass fiber. It is generally known that three coating systems (inner primary coating, outer primary coating, and ink coating) having acceptable single fiber strippability will exhibit dramatically different levels of strippability characteristics when used in ribbon form.

U.S. Pat. No. 4,496,210 provides a radiation-curable optical fiber coating composition containing a polysiloxane. However, this patent does not address the problems associated with ribbon stripping.

Japanese Patent Application H3-35210 teaches to combine a liquid lubricant, such as liquid silicone oil or liquid aliphatic oil, with a mercaptosilane compound in an inner primary coating composition. During stripping, when the bond between the surface of the optical glass fiber and inner primary coating is broken the liquid lubricant invades the boundary between the surface of the optical glass fiber and the inner primary coating. The liquid lubricant must not have a high compatibility with the inner primary coating or it will not bleed out of the inner primary coating during stripping. However, this document fails to teach a system to adjust the level of fiber friction between the adjacent surfaces of the optical glass fiber and the inner primary coating to a level which provides a resistive force that is less than the cohesive strength of the inner primary coating. Thus, while this document teaches that the inner primary coating can be stripped more easily by incorporating liquid lubricant compounds, the inner primary coating will still leave unwanted residue on the surface of the optical glass fiber if the above described fiber friction forces are at a level which provide a resistive force that is greater than the cohesive strength of the inner primary coating.

One primary coating composition available from JSR Corporation, designated as R-1055, is specified as having, inter alia, a viscosity of 5000 cps @ 25° C., a glass transition temperature of −4° C., a shrinkage value of 2.9%, a tensile strength value of 0.21 kg/mm$^2$, a tensile elongation value of 195%, an adhesion force of 20 g/cm and a Young's modulus @ 23° C. of 0.12 kg/mm$^2$. When this composition was tested in accordance with the test methods herein, it had a measured crack propagation value of 1.56 mm (standard deviation 0.2), and a fiber pull-out friction value of 26.3 g/mm (standard deviation 1.65).

There are many test methods which may be used to determine the performance of a ribbon assembly during ribbon stripping. An example of a suitable test method for determining the stripping performance of a ribbon is disclosed in the article by Mills, G., "Testing of 4- and 8-fiber ribbon strippability", 472 International Wire & Cable Symposium Proceedings (1992), the complete disclosure of which is incorporated herein by reference.

Many attempts have been made to understand the problems associated with ribbon stripping and to find a solution to increase ribbon stripping performance. The following publications attempt to explain and solve the problems associated with ribbon stripping: K. W. Jackson, et. al., "The Effect of Fiber Ribbon Component Materials on Mechanical and Environmental Performance", 28 International Wire & Symposium Proceedings (1993); H. C. Chandon, et. al., "Fiber Protective Design for Evolving Telecommunication Applications", International Wire & Symposium Proceedings (1992); J. R. Toler, et. al., "Factors Affecting Mechanical Stripping of Polymer Coatings From Optical Fibers", International Wire & Cable Symposium Proceedings (1989); and W. Griffioen, "Strippability of Optical Fibers", EFOC & N, Eleventh Annual Conference, Hague (1993).

The ability of a ribbon assembly to ribbon strip cleanly so as to provide bare optical glass fibers that are substantially free of residue is still unpredictable and the factors affecting ribbon stripping are not fully understood. There is still a need for an understanding of how the problems of ribbon stripping occur and a solution to these problems.

SUMMARY OF THE INVENTION

It is an objective of the present invention to provide a novel ribbon assembly having improved ribbon stripping capabilities. It is another objective of the present invention to provide a novel ribbon assembly which after ribbon stripping provides bare optical glass fibers which are substantially free of residue, that must be removed prior to forming connections to the respective selected bare optical fibers.

Surprisingly, the above objects and other objects are and have been obtained by the following. The present invention provides a novel ribbon assembly comprising:

a plurality of coated optical glass fibers, at least one optical glass fiber coated with at least an inner primary coating and an outer primary coating, and optionally an ink coating; and a matrix material bonding said plurality of coated optical glass fibers together, wherein said inner primary coating is adapted to provide the combination of properties of:

(i) sufficient adhesion to said optical glass fiber to prevent delamination during handling and in the presence of moisture; and (ii) a fiber friction force between said optical glass fiber and said inner primary coating which has been so adjusted as to allow the inner primary coating to slide readily off from the optical glass fiber while leaving substantially no residue on the surface of said optical glass fiber during ribbon stripping, when a stripping force which is less than the cohesive strength of said inner primary coating is applied to said ribbon assembly.

Also provided is a novel ribbon assembly comprising:

a plurality of optical glass fibers, at least one coated optical glass fiber coated with at least an inner primary coating and an outer primary coating, and optionally an ink coating; and a matrix material bonding said coated optical glass fibers together, and wherein said inner primary coating is adapted to provide a fiber pull-out friction of about 30 grams/millimeter or less at a rate of about 0.1 mm/sec in combination with a crack propagation characteristic of at least about 1 millimeter at a rate of 0.1 mm/sec.

The present invention further provides a coated optical glass fiber comprising:

an optical glass fiber;

an inner primary coating on the surface of said optical glass fiber;

an outer primary coating substantially co-extensive with the external surface of said inner primary coating, wherein said inner and outer primary coatings are so formulated and selected so as to provide a ratio of (i) the change in length of the inner primary coating from an ambient temperature to a ribbon stripping temperature to (ii) the change in length of the outer primary coating from said ambient temperature to said ribbon stripping temperature of less than about 1.5:1; and optionally an ink coating adjacent to said outer primary coating.

The invention further relates to a ribbon assembly containing at least one of these coated optical glass fibers.

The present invention further relates to a novel radiation-curable oligomer which can be used to adjust the fiber friction to a level such that the resulting adhesive resistive force level is less than the cohesive strength of the inner primary coating. The novel radiation-curable oligomer comprises:

at least one glass coupling moiety;

at least one slip agent moiety; and at least one radiation-curable moiety, wherein said glass coupling, glass adhesion, and radiation curable moieties are each covalently linked to said oligomer.

Also provided is a radiation-curable, inner primary coating composition containing the composite oligomer, a coated optical glass fiber made from the coating composition, and a ribbon assembly containing at least one such coated optical glass fiber.

The present invention also provides a radiation-curable, inner primary coating composition comprising at least one radiation-curable oligomer or monomer and a wax. Preferably, the wax is present in an amount sufficient to provide a fiber friction between an inner primary coating formed from said coating and an optical glass fiber such that there is exhibited a resistive force that is less than the cohesive strength of said coating formed from said composition. The invention also provides a coated optical glass fiber having an inner primary coating which contains a wax, and a ribbon assembly which contains at least one such coated optical glass fiber.

The present invention further provides a coated optical glass fiber having an inner primary coating which has been formulated from a radiation-curable, inner primary coating composition containing a radiation-curable silicone oligomer or a silicone compound. Preferably, the radiation-curable silicone oligomer or silicone compound is present in an amount sufficient to provide a fiber friction between the inner primary coating and the optical glass fiber such that there is exhibited a resistive force which is less than the cohesive strength of the inner primary coating. The invention also provides a ribbon assembly which contains at least one such coated optical glass fiber.

The present invention also provides a coated optical glass fiber having an inner primary coating which has been formulated from a radiation-curable, inner primary coating composition containing a radiation-curable fluorinated oligomer or a fluorinated compound. Preferably, the radiation-curable fluorinated oligomer or fluorinated compound is present in an amount sufficient to provide a fiber friction between the inner primary coating and the optical glass fiber such that there is exhibited a resistive force that is less than the cohesive strength of the inner primary coating. The invention further provides a ribbon assembly which contains at least one such coated optical glass fiber.

The present invention also provides a radiation-curable, inner primary coating composition comprising at least one radiation-curable oligomer or monomer and a solid lubricant which is substantially insoluble in the composition. Preferably, the solid lubricant is present in an amount sufficient to provide a fiber friction between an inner primary coating formed from said coating and an optical glass fiber such that there is exhibited a resistive force which is less than the cohesive strength of said coating formed from said composition. The invention also provides a coated optical glass fiber having an inner primary coating which contains a solid lubricant, and a ribbon assembly which contains at least one such coated optical glass fiber.

The present invention further provides a ribbon assembly comprising a plurality of coated optical glass fibers, at least one optical glass fiber coated with at least an inner primary coating and an outer primary coating, and optionally an ink coating, and a matrix material bonding said plurality of coated optical glass fibers together. The inner primary coating is formulated from a radiation-curable inner primary coating composition containing at least one radiation-curable urethane oligomer comprising at least one polymeric block and at least one functional group capable of polymerization in the presence of actinic radiation connected to said at least one polymeric block. The coating composition has a concentration of urethane groups which is selected to provide said inner primary coating with a fiber friction force level between said optical glass fiber and said inner primary coating in combination with a crack propagation level that provides the inner primary coating with the functional capability of sliding off of the optical glass fiber and leaving substantially no residue on the surface of said optical glass fiber during ribbon stripping when a stripping force which is less than the cohesive strength of said inner primary coating is applied to said ribbon assembly.

The present invention further provides a ribbon assembly comprising a plurality of coated optical glass fibers, at least one optical glass fiber coated with at least an inner primary coating and an outer primary coating, and optionally an ink coating, and a matrix material bonding said plurality of coated optical glass fibers together. The inner primary coating is formulated from a radiation-curable inner primary coating composition containing at least one radiation-curable oligomer comprising at least one polymeric block and at least one functional group capable of polymerization in the presence of actinic radiation connected to said at least one polymeric block. The polymeric block has a molecular weight which is selected to provide said inner primary coating with a fiber friction force level between said optical glass fiber and said inner primary coating in combination with a crack propagation level that provides the inner primary coating with the functional capability of sliding off of the optical glass fiber and leaving substantially no residue on the surface of said optical glass fiber during ribbon stripping when a stripping force which is less than the cohesive strength of said inner primary coating is applied to said ribbon assembly.

The invention also provides a radiation-curable, inner primary coating composition formulated from a composition comprising at least one urethane oligomer having at least one polymeric block and at least one functional group capable of polymerization in the presence of actinic radiation connected to said at least one polymeric block. The coating composition has a concentration of urethane groups that is so selected to provide said inner primary coating with a fiber friction force level between an optical glass fiber and an inner primary coating formed from said coating composition in combination with a crack propagation level which provides the inner primary coating with the functional capability of sliding off the optical glass fiber and leaving substantially no residue on the surface of said optical glass fiber during ribbon stripping when a stripping force which is less than the cohesive strength of said inner primary coating is applied to said inner primary coating.

The present invention further provides a radiation-curable, inner primary optical glass fiber coating composition formulated from a composition comprising at least one radiation-curable oligomer having at least one polymeric block and at least one functional group capable of polymerization in the presence of actinic radiation connected to said at least one polymeric block. The polymeric block has a molecular weight so selected to provide said inner primary coating with a fiber friction force level between said optical glass fiber and said inner primary coating in combination with a crack propagation level that provides the inner primary coating with the functional capability of sliding off the optical glass fiber and leaving substantially no residue on the surface of said optical glass fiber during ribbon stripping when a stripping force which is less than the cohesive strength of said inner primary coating is applied to said inner primary coating.

The present invention also provides coated optical glass fibers containing at least one inner primary coating formed from the above radiation-curable, inner primary coating compositions.

DETAILED DESCRIPTION OF PREFERRED EMBODIMENTS

Figure 1:
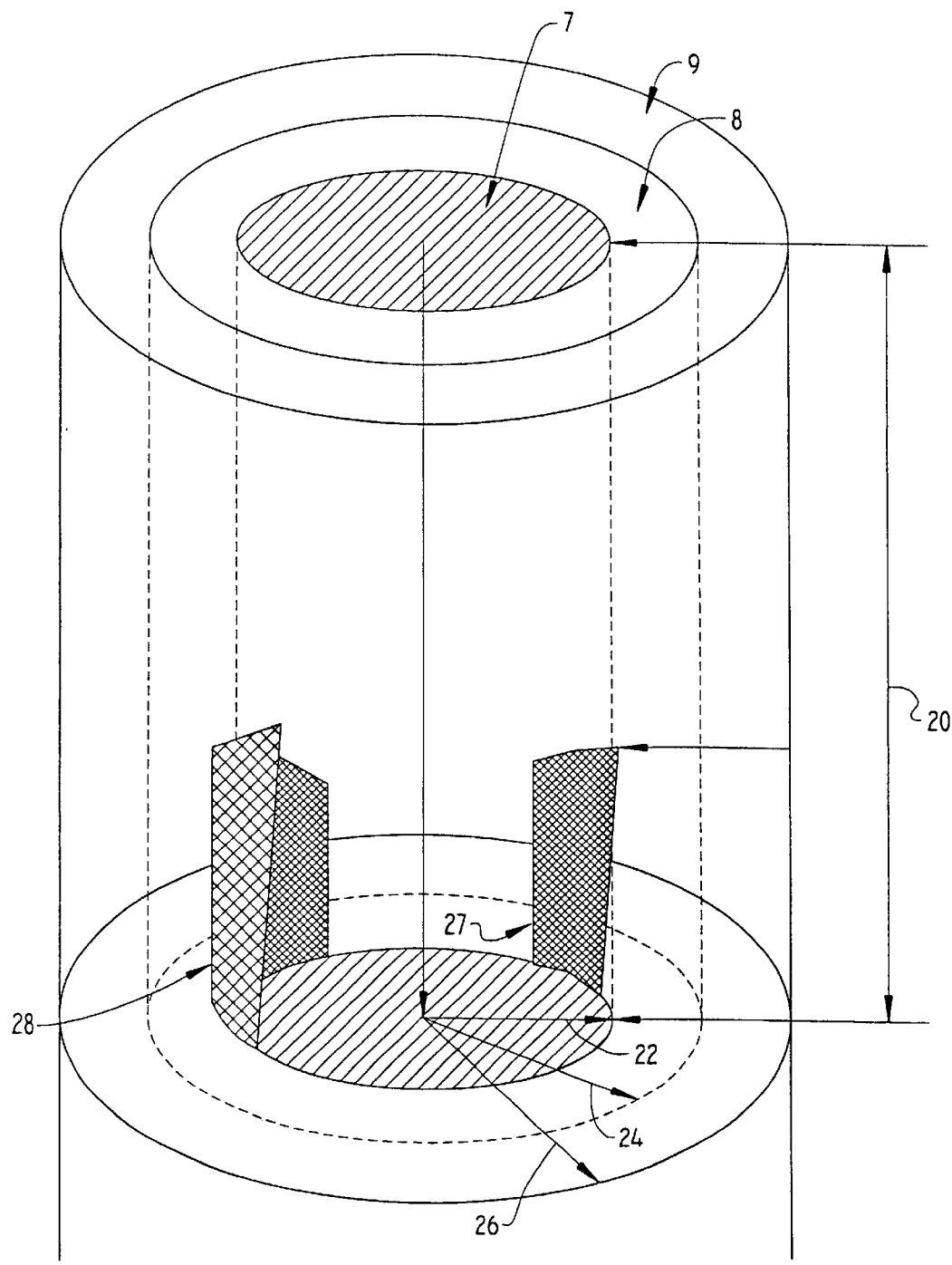
FIG. 1 illustrates a longitudinal cross-sectional view of a coated optical glass fiber.

The invention will now be explained in detail with reference to the attached drawings.

Based on extensive experimentation, it is now believed that ribbon stripping functionally involves two phases, a first adhesion breaking phase and a second frictive sliding phase. This can be characterized by the following equation (1):

$$F_{stripping} = F_{adhesive} + F_{friction} \tag{1}$$

where $F_{stripping}$ is the stripping force applied to the inner primary coating;

$F_{adhesive}$ is the force required to break the adhesive forces between the optical glass fiber and the inner primary coating; and $F_{friction}$ is a function of the normal force the inner primary coating exerts against the surface of the optical glass fiber and the coefficient of friction of the inner primary coating.

$F_{friction}$ is equal to $F_{static}$, defined as the condition when the inner primary coating is in a static position, and $F_{friction}$ is equal to $F_{kinetic}$ defined as when the inner primary coating is in motion relative to the optical glass fiber.

During the adhesion breaking phase, the adhesive force between the inner primary coating and the surface of the optical glass fiber must be broken to delaminate the inner primary coating from the surface of the optical glass fiber. Once that adhesive force is broken, and the inner primary coating is delaminated from the surface of the optical glass fiber, the fiber friction force between the inner primary coating and the surface of the optical glass fiber must then be overcome to remove the inner and outer primary coatings, along with the matrix material, from the optical glass fiber.

The adhesive force between the inner primary coating and the surface of the optical glass fiber is generally increased by an increase in the following:

(1) covalent bonding, for example from glass adhesion promoters;

(2) weak molecular interactions, such as Van der Waal's attractions, hydrogen-bonding, electrostatic, and the like;

(3) static coefficient of friction;

(4) surface energy of the inner primary coating and surface energy of the optical glass fiber;

(5) surface roughness; and (6) adhesive bonding area.

The adhesive force between the inner primary coating and the surface of the optical glass fiber is generally decreased by an increase in the temperature.

The fiber friction force between the inner primary coating and the surface of the optical glass is generally increased by an increase in one or more of the following:

(1) the normal force of the inner primary coating against the surface of the optical glass fiber at the ribbon stripping temperature;

(2) the static and kinetic coefficient of friction at the ribbon stripping temperature;

(3) surface roughness; and (4) frictive area.

The normal force includes weak molecular interactions, such as Van der Waal's attractions, hydrogen-bonding, electrostatic, and the like, between the surface of the optical glass fiber and the inner primary coating. In general, the fiber friction force is decreased with an increase in temperature.

The rigidity and integrity of the outer primary coating at the ribbon stripping temperature can also affect the frictive force. During ribbon stripping the outer primary coating, ink coating, and other rigid coating layers, such as the matrix material, provide the stiffening backbone which allows for intact removal of the matrix material and inner and outer primary coatings to provide a cohesive tube (hereinafter referred to as "coating tube"). If the rigidity and integrity are insufficient, the outer primary coating can buckle during ribbon stripping, which can significantly increase the fiber friction force and/or induce shearing stresses causing integrity failure of the inner primary coating resulting in undesirable residue on the surface of the optical glass fiber.

Preferably, the adhesion between the matrix material and the ink coating or colored outer primary coating is greater than the adhesion between the inner primary coating and the surface of the optical glass fiber to ensure that the inner primary coating delaminates from the surface of the optical glass fiber during ribbon stripping. Similarly, both the adhesion between the ink coating and the outer primary coating, and the adhesion between outer primary coating and the inner primary coating, should be greater than the adhesion between the inner primary coating and the surface of the optical glass fiber to ensure that the inner primary coating delaminates from the surface of the optical glass fiber, as well as to provide a cohesive coating tube during ribbon stripping. Usually, the adhesion between the matrix material and the colored outer primary coating or ink coating, as well as the adhesion between each of the coating layers is sufficient to ensure delamination of the inner primary coating from the surface of the optical glass fiber during ribbon stripping because the matrix material and coating layers mainly comprise organic materials. In general, layers of materials having similar properties, such as an adjacent organic layer/organic layer bond, tend to bond more easily together than layers having dissimilar properties, such as an organic layer/inorganic layer bond.

FIG. 1 illustrates an optical glass fiber 7 coated with an inner primary coating 8 and a commercially available outer primary coating 9. The length of the inner primary coating in FIG. 1 shown at 20 has been selected to be 35 mm because this is a typical length of the coatings stripped from the ends of the optical glass fibers during ribbon stripping. When a typical ribbon stripping tool is applied to a ribbon assembly, pressure is applied to the ribbon assembly between heated plates. At the ends of the plates near the cut made in the matrix material and inner and outer primary coatings, the inner primary coating can form an initial delamination site on the optical glass fiber, shown at 27 and 28 (referred to as debond area). Because the areas 27 and 28 of the inner primary coating are delaminated, they must be subtracted from that area of the inner primary coating which is still bonded to the surface of the optical glass fiber when measuring the adhesive bonding area between the inner primary coating and the surface of the optical glass-fiber. The radius of the optical glass fiber is 62.5 microns, shown at 22. The radius of the outer surface of inner primary coating is 95 microns, shown at 24. The radius of the outer surface of the outer primary coating is 125 microns, shown at 26. From FIG. 1, the adhesive bonding area is equal to the glass surface area (13.744 mm$^2$) minus the debond area. The frictive area is the total glass surface area of the section to be stripped during ribbon stripping (13.744 mm$^2$).

Figure 2:
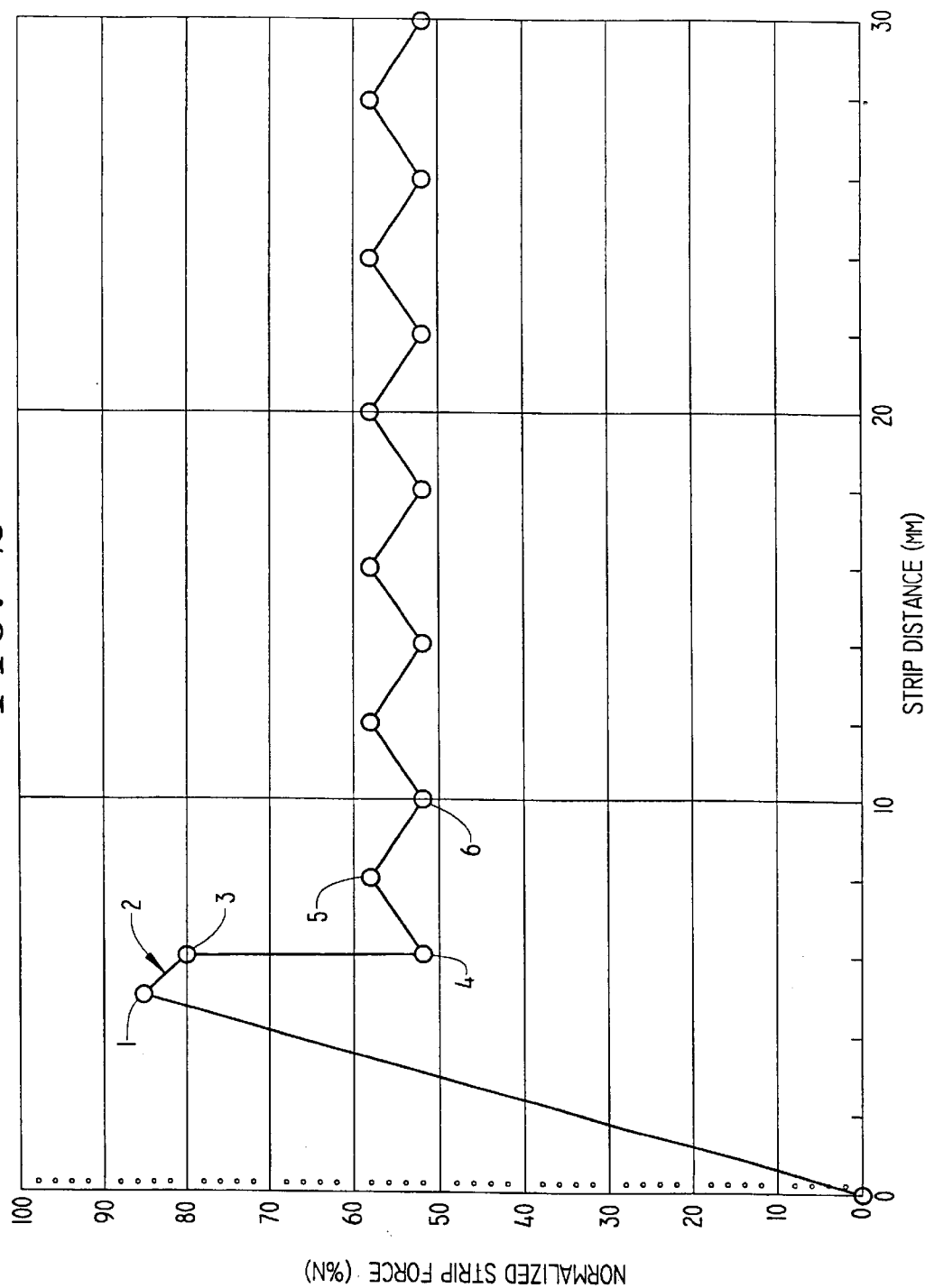
FIG. 2 illustrates a representative graph of the normalized strip force required to slide an optical fiber ribbon coating composite along the surface of an optical glass fiber.

It is believed that during ribbon stripping the inner primary coating may ratchet off the optical glass fiber, as shown in FIG. 2. FIG. 2 is a demonstration of the adhesive force and fiber friction force being overcome by the stripping force applied to the inner primary coating during the ribbon stripping process. As stripping force is applied from the stripping tool to the inner primary coating, the stripping force increases to a level at which the adhesive force between the inner primary coating and the surface of the optical glass fiber is overcome, which is shown at 1. At this level, the inner primary coating begins to delaminate from the surface of the optical glass fiber. Then, the stripping force decreases as the inner primary coating delaminates from the optical glass fiber, shown generally at 2. Once delamination has completed, shown at 3, the inner primary coating slides along the surface of the optical glass fiber and the stripping force decreases to the level shown at 4. As the inner primary coating is being slid off of the optical glass fiber the stripping force required to slide the inner primary coating against the optical glass fiber ratchets between the higher static fiber friction force and the lower kinetic fiber friction force.

The static fiber friction force is a function of the static coefficient of friction of the inner primary coating and the normal force of the inner primary coating against the optical glass fiber. The kinetic fiber friction force is a function of the kinetic coefficient of friction of the inner primary coating and the normal force of the inner primary coating against the optical glass fiber. The static fiber friction force resists initial sliding movement and the kinetic fiber friction force resists subsequent sliding movement. In other words, once the adhesive bond is broken and the static fiber friction force is overcome, shown at 3, the inner primary coating slides a set distance until the kinetic fiber friction force prevents further motion and the inner primary coating becomes momentarily stuck in place against the surface of the optical glass fiber, shown at 4. As the stripping force increases, and before the inner primary coating resumes its motion relative to the optical glass fiber, the potential energy is stored in the inner primary coating which produces a tensile force and a stripping force within the inner primary coating. The tensile force is opposed to the normal force and the stripping force is opposed to the fiber friction force.

The motion force ("$F_{motion}$") of the inner primary coating is a vector sum of the tensile force ("$F_{tensile}$") and the stripping force ("$F_{stripping}$"). The resistive force ("$F_{resistive}$") is a vector sum of the fiber friction force ("$F_{friction}$") and the normal force ("$F_{normal}$") on the inner primary coating against the surface of the optical glass fiber.

Once the motion force ("$F_{motion}$") exceeds the resistive force ("$F_{resistive}$") the inner primary coating begins to slide, shown at 5. The inner primary coating quickly slides a set distance and then becomes momentarily stuck, shown at 6. The distance the inner primary coating slides along the surface of the optical glass fiber between the points 5 and 6 in FIG. 2 is referred to as slip-stick distance. The slip-stick distance will vary and be dependent upon the materials used in the inner primary coating and optical glass fiber, and will also be dependent upon random probability due to non-homogeneity in the inner primary coating and optical glass fiber surface.

Figure 3:
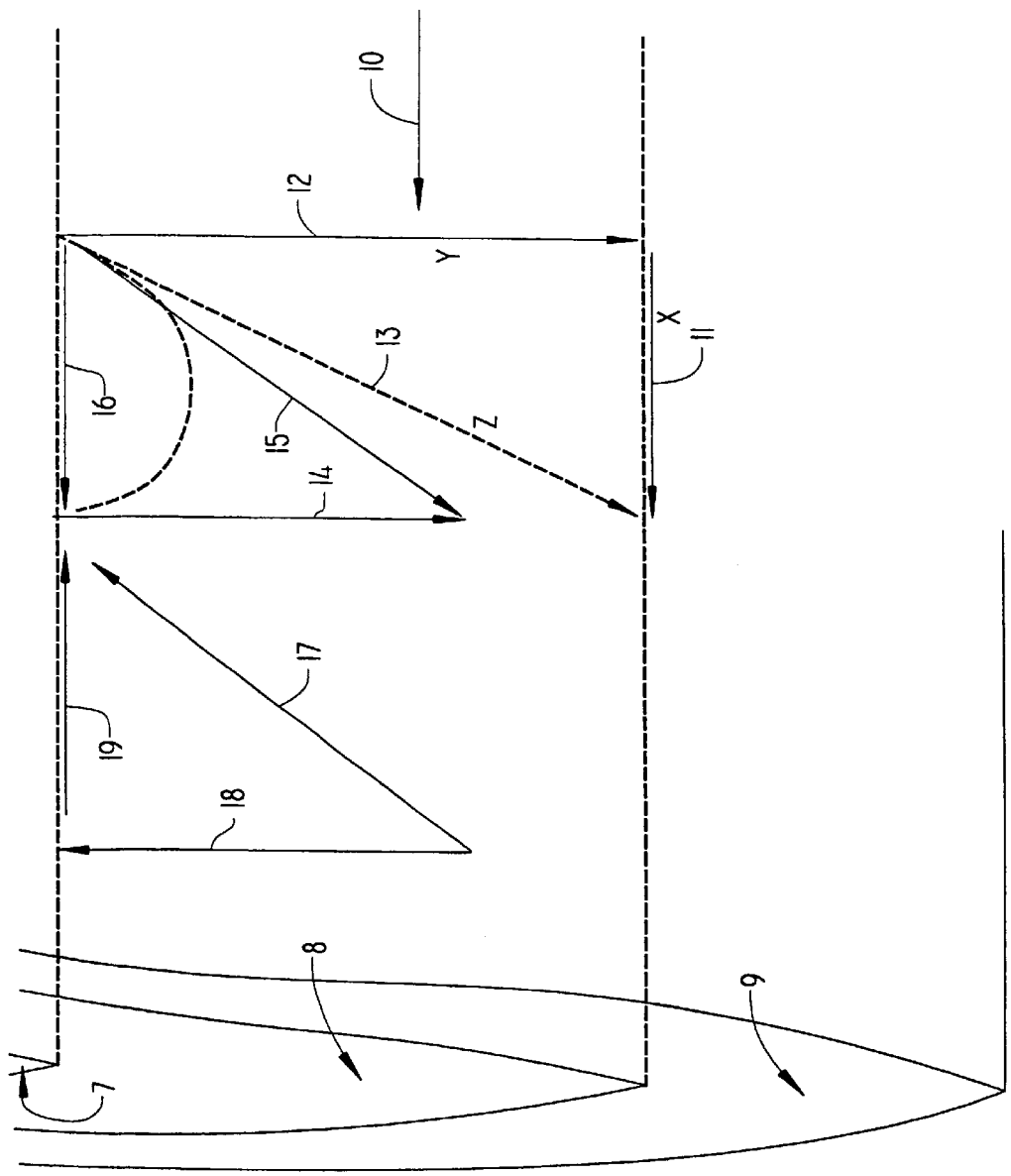
FIG. 3 illustrates the ratchet effect of an inner primary coating sliding off an optical glass fiber during ribbon stripping.

FIG. 3 further explains the ratcheting effect during ribbon stripping by way of example. As shown in FIG. 3, a partial longitudinal cross-section of an optical glass fiber is shown at 7. A two-dimensional vector explanation will be used herein for ease of explanation. However, it is understood that a coated optical glass fiber is a three-dimensional object and all of the described vectors need to be extended an additional dimension.

The optical glass fiber is coated with an inner primary coating shown at 8, and an outer primary coating shown at 9. The thickness "Y" of the inner primary coating is about 37.5 microns, shown at 12. As stripping force is indirectly applied to the inner primary coating in the direction shown at 10, the inner primary coating is deformed a pre-slip distance "X", shown at 11, at which point the inner primary coating delaminates and begins to ratchet along the surface of the optical glass fiber. The stripping force required to make the inner primary coating begin to ratchet along the surface of the optical glass fiber can be calculated as follows. The length of the tensile deformation of the deformed inner primary coating at the level of strip force required to make the inner primary coating begin to slide after being momentarily stuck to the surface of the optical glass fiber "Z" is shown at 13. The % elongation of the deformed inner primary coating can be calculated from the values Z and Y using the following equation (2):

$$(Z-Y)/Y = \% \text{ elongation} \tag{2}$$

From a stress/strain curve, one skilled in the art can readily use the % elongation to calculate the tensile force ($F_{tensile}$) required to initiate sliding of the inner primary coating from a static position.

The vector for the static fiber friction force $F_{friction}$ is shown at 19. When $F_{motion}$ is greater than $F_{resistive}$, the inner primary coating will begin to slide from a static position. $F_{motion}$, shown at 15, is the vector sum of $F_{tensile}$, shown at 14, and $F_{stripping}$, shown at 16. $F_{resistive}$ shown at 17, is the vector sum of $F_{friction}$ shown at 19, and $F_{normal}$, shown at 18.

If either of the vector components $F_{stripping}$ or $F_{tensile}$ is greater than the corresponding inner primary coating resistive vector components (shear strength and tensile strength, respectively), then the inner primary coating will cohesively fail during ribbon stripping leaving an undesirable residue of inner primary coating material on the surface of the optical glass fiber.

Similarly, if either of the vector components $F_{friction}$ or $F_{normal}$ is greater than the inner primary coating resistive vector components (shear strength and tensile strength, respectively), then the inner primary coating will cohesively fail during ribbon stripping leaving an undesirable residue of inner primary coating material on the surface of the optical glass fiber.

More generally, the inner primary coating will cohesively fail if $F_{resistive}$ is greater than the cohesive strength of the inner primary coating. Thus, to prevent such residue, the $F_{friction}$ and/or $F_{normal}$ should be so adjusted as to provide a $F_{resistive}$ that is less than the cohesive strength of the inner primary coating.

The term "cohesive strength" of the inner primary coating is used herein to mean the amount of force necessary to destroy the integrity of the inner primary coating. Thus, a higher cohesive strength will require a greater amount of force to destroy the integrity of the inner primary coating. The cohesive strength can be measured using any one of (1) the shear strength of the inner primary coating, (2) the tensile strength of inner primary coating, or (3) the crack propagation of the inner primary coating. Preferably, the cohesive strength is measured using the crack propagation. test, as described herein below.

This residue can interfere with the optical glass fiber ribbon mass fusion splicing operation, and therefore must be removed prior to splicing by wiping. The step of removing the residue can cause abrasion sites on the bare optical glass fiber, thus compromising the strength of the connection.

Once the adhesive bonds have been broken and the inner primary coating has been delaminated from the surface of the optical glass fiber, the ability of a ribbon assembly to strip cleanly during ribbon stripping and to provide bare optical glass fibers which are substantially free of residue can be understood using the following simplified equation (3):

$$F_{friction} = C_f \times F_{normal} \tag{3}$$

where $F_{friction}$ is the static frictive force between the inner primary coating and the optical glass fiber;

$C_f$ is the static coefficient of friction of the inner primary coating on the surface of the optical glass fiber, and $F_{normal}$ is the normal force of the inner primary coating against the surface of the optical glass fiber.

Hereinafter, the use of the term "fiber friction" in the specification and claims refers to the static fiber friction force.

In general, the lower the fiber friction, the lower the resistive force, and the easier the inner primary coating can be removed from the surface of the optical glass fiber without leaving a residue. From equation 3, it is evident that the fiber friction can be reduced by decreasing either or both the static coefficient of friction or the normal force.

Each inner primary coating has a specific cohesive strength which maintains the integrity of the inner primary coating. The greater the cohesive strength of the inner primary coating the greater the amount of energy required to break apart or fracture the inner primary coating. Thus, an inner primary coating having a higher cohesive strength can withstand greater stripping forces during ribbon stripping, without breaking apart and leaving residue on the surface of the optical glass fiber, than an inner primary coating having a lower cohesive strength.

From the above discussion, it is clear that if the fiber friction is at a level which provides a resistive force that is greater than the cohesive strength of the inner primary coating, then the inner primary coating will break apart leaving residue on the surface of the optical glass fiber. Thus, when selecting or formulating the inner and outer primary coatings, the fiber friction level should be adjusted taking into account the cohesive strength of the inner primary coating so that fiber friction provides resistive force that is less than the cohesive strength of the inner primary coating.

Minimizing the Normal Force

From the above equations, the fiber friction force between the optical glass fiber and inner primary coating can be lowered by reducing the normal force of the inner primary coating against the surface of the optical glass fiber. In general, the greater the normal force, the greater the fiber friction force between the optical glass fiber and the inner primary coating. In other words, the harder the inner primary coating is pressing against the surface of the optical glass fiber, the harder it will be to slide the inner primary coating against the surface of the optical glass fiber and the greater the chances of leaving residue from the inner primary coating on the surface of the optical glass fiber. Since the normal force is a component of the fiber friction, lowering the normal force will lower the fiber friction. The normal force should therefore be adjusted or selected so as to provide a normal force vector component and a fiber friction vector component that provides a vector sum (resistive force) which is less than the cohesive strength of the inner primary coating.

During ribbon stripping, the inner primary and outer primary coatings are heated, typically to about 90 C. to about 120 C. Because inner primary coatings usually have a lower Tg than that of outer primary coatings, inner primary coatings usually expand to a greater extent than the outer primary coatings during ribbon stripping. Thus, when the inner and outer primary coatings are heated, the inner primary coating expands to a greater extent than the outer primary coating causing a pressure build-up within the inner primary coating and between the surface of the optical glass fiber and the outer primary coating. This pressure buildup in the inner primary coating increases the normal force of the inner primary coating against the optical glass fiber, thereby increasing the fiber friction force between the inner primary coating and the surface of the optical glass fiber. Thus, the resistive force will be increased by an increase in the normal force vector component and an increase in the fiber friction vector component.

It is believed that the inner primary coating expands to a greater extent than the outer primary coating during ribbon stripping, at least in part due to the following reason. At temperatures below the Tg of the polymeric coating, the polymers present in the coating tend to act "glass-like", and therefore have a low coefficient of expansion. However, at temperatures above the Tg of the polymeric coating, the polymers tend to act "rubber-like" and therefore have a higher coefficient of expansion than when below the Tg of the polymeric coating. As the temperature of the ribbon assembly is raised during ribbon stripping the polymer present in the inner primary coating will usually be at a temperature above their Tg and be more "rubber-like" well before the polymers present in the outer primary coating reach their Tg. Thus, as the applied stripping temperature is raised, the "rubber-like" polymer present in the inner primary coating will expand to a much greater extent, than the "glass-like" polymer in the outer primary coating.

The Tg of the inner primary coating and that of the outer primary coating usually cannot be matched because the outer primary coating should have a higher Tg to provide the tough protective properties required of the outer primary coating. In general, the Tg of the outer primary coating is above 60° C., whereas the Tg of the inner primary coating is usually below 10° C., preferably below about 0° C., more preferably below about –10° C., and most preferably below about –20° C.

However, it has been found that the relative expansion characteristics of the inner and outer primary coatings can be adjusted without substantially affecting the Tg of the coatings. The expansion characteristics of the desired inner and outer primary coatings should first be measured as follows. The change in expansion from the ambient working temperature of the ribbon assembly to the ribbon stripping temperature measured in one plane "dL" is divided by an initial length of the one plane measured at the ambient working temperature Qf the ribbon assemble "L", hereinafter referred to as "(dL/L)". Ambient working temperatures of ribbon assemblies are usually about 0° C. to about 30° C. It will be appreciated that for most coating compositions the design ribbon stripping temperatures are usually about 90° C. to about 120° C., but may be different depending on the specific design parameters for the particular coating composition.

The inner and/or outer primary coatings should be selected or reformulated so as to maximize the (dL/L) of the outer primary coating and while minimizing the (dL/L) of the inner primary coating. Ideally, the (dL/L) of the outer primary coating should be greater than that of the inner primary coating whereby the outer primary coating will theoretically exert a normal force on the inner primary coating in a direction away from the optical glass fiber during ribbon stripping. However, such high (dL/L) values for the outer primary coating in combination with retention of the desired toughness properties of the outer primary coating are usually unattainable. Nevertheless, increasing the (dL/L) of the outer primary coating can significantly reduce the increase in normal force on the inner primary coating during ribbon stripping to provide a clean optical glass fiber which is substantially free of residue.

Figure 4:
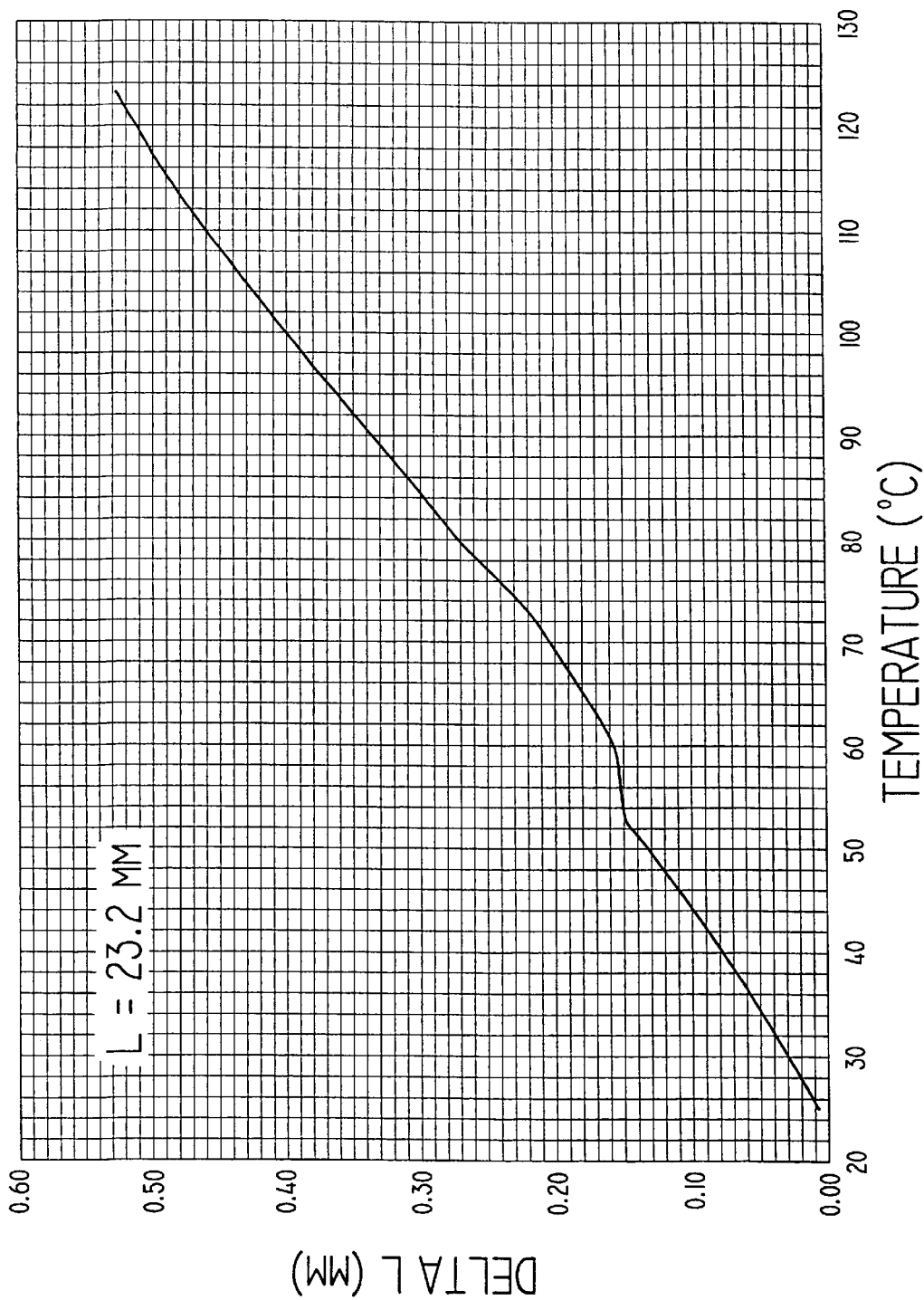
FIG. 4 is a graph of the change in length L ("dL") for a commercially available outer primary coating as the temperature is increased.

FIG. 4 is a graph of the change in L ("dL") for a commercially available outer primary coating as the temperature is increased. In particular, for an L of 23.2 mm, the dL for a temperature change from 25 C. (example of ambient temperature) to 100 C. (example of ribbon stripping temperature) can be calculated as follows:

$$dL/L = (\text{delta } L)/L$$
$$= (0.4)/23.2$$
$$= .01724$$

The dL/L value is independent of the length of the coating selected for the measurement. Thus, for different L values, the dL/L will be constant.

Figure 5:
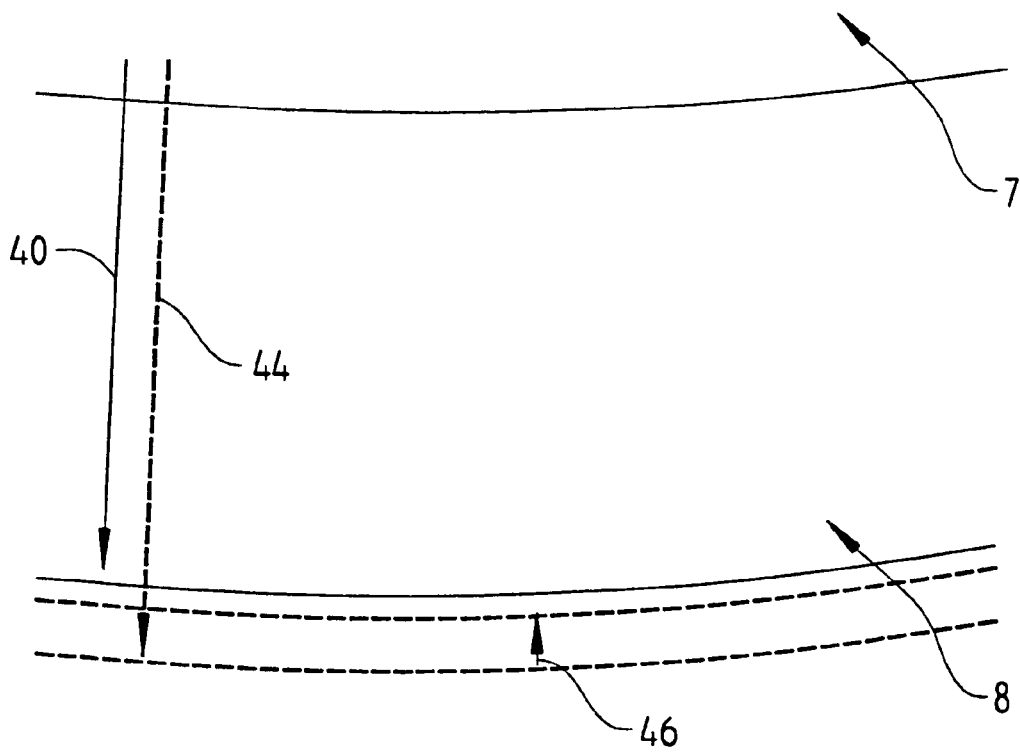
FIG. 5 illustrates a partial cross-sectional view of a coated optical glass fiber.
Figure 5:
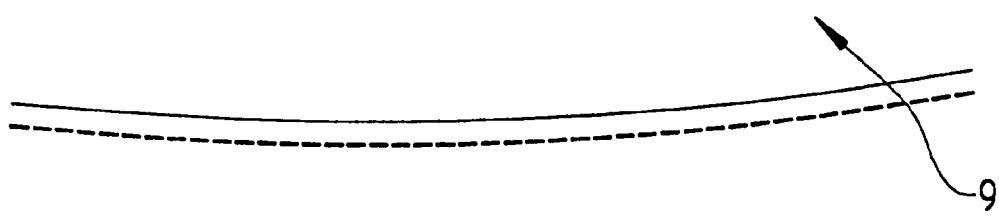

The normal force on the inner primary coating against the optical glass fiber, which is caused by the differential in expansion between the inner primary coating and outer primary coating during ribbon stripping, can be calculated as follows. FIG. 5 illustrates a cross-sectional view of a glass optical fiber 7, coated with an inner primary coating 8 and an outer primary coating 9. The outer primary coating 9 is the same as that in FIGS. 1 and 4. The radius of the outer surface of the inner primary coating at 25 C. is 95 microns, shown at 40. The radius of the inner surface of the outer primary coating at 25 C. is 95 microns, also shown at 40. As the temperature of the ribbon assembly is increased to 100 C. during ribbon stripping, the inner primary coating and outer primary coating expand.

The radius of the inner surface of the outer primary coating at 100 C. is 96.379 microns, shown at 42. This value was calculated as follows. The (dL/L) for the outer primary coating material heated from 25 C. to 100 C. is 0.01724, as calculated from FIG. 4. The radius of the inner surface of the outer primary coating at 25 C. (95 microns) is multiplied by (1+dL/L) for a temperature change of 25 C. to 100 C. (1.01724) which provides a radius of the inner surface of the outer primary coating at 100 C. of 96.638 microns. However, this value must be corrected to take into account the expansion in the thickness of the outer primary coating. The outer primary coating has as thickness of 30 microns at 25 C. To obtain the thickness at 100 C., the thickness at 25 C. (30 microns) is multiplied by (1+dL/L) for a temperature change of 25 C. to 100 C. (1.01724), which provides a thickness of 30.5172 microns. Thus, the thickness of the outer primary coating expands 0.5172 microns when heated from 25 C. to 100 C. One half of this expansion occurs in the direction of the inner primary coating. This assumes that the inner primary coating will not substantially resist the expansion of the outer primary. Thus, one half of 0.5172 must be subtracted from the value obtained above for the radius of inner surface of the outer primary coating at 100 C. (96.638 microns) to obtain a corrected value of 96.379 microns. The change in radius over the temperature change from 25 C. to 100 C. "dR" divided by the radius at 25 C. "R" is then calculated to provide the value (dR/R).

The above measurements can be performed on the inner primary coating selected to provide a value (dR/R) for the inner primary coating. The radius of the inner primary coating at 100 C. is shown at 44. The normal force on the inner primary coating against the optical glass fiber, which is caused by the differential in expansion between the inner primary coating and outer primary coating during ribbon stripping is shown at 46.

The % expansion of the inner primary coating can be calculated from the following:

$$((dR/R)_{inner\ primary} - (dR/R)_{outer\ primary}) \times 100\%$$

From a stress/strain curve, one skilled in the art can easily use the % expansion to calculate the pressure of the inner primary coating against the optical glass fiber, which is caused by the differential in expansion between the inner and outer primary coating during ribbon stripping. Multiplying the pressure by the surface area of the inner primary coating against the optical glass fiber provides the normal force of the inner primary coating against the surface of the optical glass fiber.

Preferably, the $(dR/R)_{inner\ primary}$ is decreased and/or the $(dR/R)_{outer\ primary}$ is increased to reduce the differential in expansion between the inner and outer primary coating during ribbon stripping, thereby reducing the normal force of the inner primary coating against the surface of the optical glass fiber.

Based on the above, it has been found that the normal force can be decreased by reducing the pressure increase of the inner primary coating during ribbon stripping, by reformulating the inner primary coating and/or outer primary coating to provide one or more of the following properties:

(1) decreasing the elastic modulus (at ribbon stripping temperature) of the outer primary coating so that it can stretch to a greater extent to relieve more of the pressure build-up of the inner primary coating during ribbon stripping, (2) increasing the (dL/L) of the outer primary coating so that the outer primary coating expands to a greater extent to allow for more expansion of the inner primary coating during ribbon stripping, and/or (3) decreasing the (dL/L) of the inner primary coating to reduce the pressure build-up of the inner primary coating.

The elastic modulus (at ribbon stripping temperature) of the outer primary coating can be decreased by reducing the crosslink density of the outer primary coating. The elastic modulus is determined by the Elastic Modulus Test method, as discussed in the DESCRIPTION OF TEST METHODS, below. Preferably, the elastic modulus of the outer primary coating is adjusted to be between about 10 to about 40 MPa, more preferably between about 10 to about 20 MPa, at the ribbon stripping temperature. Outer primary coatings having an elastic modulus in the range of between about 15 to about 40 MPa, more preferably between about 30 and 40 MPa, have also been found suitable as well as outer primary coatings having an elastic modulus of greater than about 25 MPa. While it has been found that the crosslink density of the outer primary coating can usually be reduced without causing undesirable effects, the Tg of the outer primary coating should remain high, to provide the outer primary coating with the necessary toughness related properties to protect the optical glass fiber. For example, to reduce the crosslink density of the outer primary coating without reducing the Tg to unacceptably low values, monofunctional monomers or oligomers, which when cured exhibit a high Tg, can be used. Monofunctional is understood herein as including monomers and oligomers having an average of about 1 functional group capable of polymerization upon exposure to actinic radiation. A high Tg is herein understood to be at least about 40 C., preferably at least about 50 C.

Examples of suitable high Tg producing monofunctional monomers and oligomers include, for example, isobornyl acrylate and vinylcaprolactam. Such monomers can be utilized in amounts of about 1% to about 80%, preferably about 10 to about 50% by weight of the total composition.

Very high Tg producing multifunctional monomers or oligomers, such as tris-hydroxyethylisocyanurate triacrylate can also be used in amounts up to about 30%, preferably up to about 20% by weight, because they are effective at greatly increasing the Tg of the outer primary coating without excessively increasing the crosslink density.

The (dL/L) of the outer primary coating can be significantly increased by incorporating a monomer or oligomer which when cured exhibits a high (dL/L). For example, a suitable (dL/L), at the desired ribbon stripping temperature, for the outer primary coating has been found to be at least about 0.017, preferably at least about 0.02, and most preferably at least about 0.023. These amounts can be expressed as percentage increases in the length by multiplying by 100. Therefore, the outer primary coating preferably increases in length over the change in temperature from ambient temperature to ribbon stripping temperature ("dL/L") of at least about 1.7%, more preferably at least about 2%, and most preferably at least about 2.3%. If the coefficient of friction of the inner primary coating and/or the dL/L of the inner primary coating are sufficiently low enough, the dL/L of the outer primary coating can be less than 1.7% and still provide a fiber friction and normal force that will result in a resistive force that is less than the cohesive strength of the inner primary coating.

The high (dL/L) producing monomer or oligomer should be added in an amount sufficient to provide a cured outer primary coating with the desired level of (dL/L). For example, the high (dL/L) monomer or oligomer can be added in an amount of about 10 to about 70% by weight, more preferably about 10 to about 50% by weight.

Examples of suitable high (dL/L) monomers or oligomers include isobornyl acrylate, vinylcaprolactam, tricyclodecane dimethanol diacrylate, and the adduct of 2 moles of hydroxyethylacrylate and 1 mole of isophorone diisocyanate.

The (dL/L) of the inner primary coating can be decreased by increasing the crosslink density of the inner primary coating. However, when reformulating the inner primary coating to increase the crosslink density, the Tg of the inner primary coating should remain low to provide the optical glass fiber with adequate protection from microbending. It has been found that the crosslink density can be increased by using multifunctional monomers and oligomers. Examples of suitable multifunctional monomers and-oligomers include, hexanedioldiacrylate, trimethyolpropane triacrylate, and tripropyleneglycol diacrylate.

The ratio of the dL/L (inner primary) to the dL/L (outer primary) at the desired ribbon stripping temperature should be low enough to provide a fiber friction and normal force that results in a resistive force between the inner primary coating and the optical glass fiber that is less than the cohesive strength of the inner primary coating. In general, the lower the ratio of dL/L (inner primary) to dL/L (outer primary) the less the normal force that will be applied to the inner primary coating against the surface of the optical glass fiber. Thus, the ratio of the dL/L (inner primary) to dL/L (outer primary) required to provide a fiber friction force that results in a resistive force lower than the cohesive strength of the inner primary coating will depend upon the coefficient of friction of the inner primary coating. The lower the coefficient of friction of the inner primary coating, the greater the ratio of dL/L (inner primary) to dL/L (outer primary) that can be tolerated and still provide a fiber friction and normal force which results in a resistive force that is less than the cohesive strength of the inner primary coating.

It has been found that a suitable ratio for the dL/L (inner primary) to the dL/L (outer primary) at the desired ribbon stripping temperature is less than about 2, preferably less than about 1.7, and most preferably less than about 1.5.

The outer primary coating can also exert a force on the inner primary, which is caused by shrinkage of the outer primary coating during radiation curing of the outer primary coating. Thus, to reduce this force oligomers and monomers can be selected to provide a radiation-curable composition that exhibits reduced shrinkage during radiation-curing.

If an ink coating is present, the ink coating can also exert a normal force on the inner primary coating in a manner similar to the normal force exerted by the outer primary coating. However, the force exerted by the ink coating will generally be significantly less than the force exerted by the outer primary coating because the ink coating is generally about an order of magnitude thinner than the outer primary coating. The thickness of the ink layer is usually only about 3 to about 8 microns.

If desired, the normal force exerted by the ink coating can be adjusted in a similar manner as adjusting the normal force exerted by the outer primary coating, because the ink coating in general is also formed from monomers and oligomers similar to those used to form the outer primary coating. In particular, the (dL/L) of the ink coating can be adjusted to be closer to the (dL/L) of the inner primary coating by reformulating the ink coating to utilize monomers and/or oligomers that result in a coating having a (dL/L) closer to the (dL/L) of the inner primary coating, as described herein above in reference to the outer primary coating.

The invention will be further explained by the following non-limiting example.

COMPARATIVE EXAMPLES A-1 to A-2

The compositions shown in Table 1 represent commercially available coating compositions. Comparative Example A-1 is an example of an outer primary coating and Comparative Example A-2 is an example of an inner primary coating.

TABLE 1

| | Comp. Example A-1 | Comp. Example A-2 |
|---|---|---|
| Component (Amount in % by weight of total composition) | | |
| Oligomer H-(T-PTMG650)$_{1\ 14}$-T-H | 39 | |
| Oligomer H-(I-PTGL2000)$_2$-I-H | | 51.41 |
| Bisphenol A Diglycidylether Diacrylate | 29 | |
| Isobornyl Acrylate | 10 | 6.86 |
| Hexanediol Diacrylate | 8.5 | |
| Phenoxyethyl Acrylate | 10 | |
| Lauryl Acrylate | | 5.95 |
| Ethoxylated Nonylphenol Acrylate | | 20.91 |
| Tripropyleneglycol Diacrylate | | 5.81 |
| Vinyl Caprolactam | | 6.11 |
| Diethylamine | | .1 |
| Gamma Mercaptopropyl Trimethoxy Silane | | 1 |
| Thiodiethylene bis(3,5-di-tert-butyl-4-hydroxy) hydrocinnamate | .5 | .31 |
| 2,4,6-Trimethylbenzoyl diphenyl phosphine oxide | 2 | 1.54 |
| 1-Hydroxycyclohexylphenyl Ketone | 1 | |

The oligomers were formed by reacting the following components:
H = Hydroxyethyl Acrylate
T = Toluene Diisocyanate
I = Isophorone Diisocyanate
PTGL2000 = 2000 molecular weight polymethyltetrahydrofurfuryl/polytetrahydrofurfuryl copolymer diol (Mitsui, NY)
PTMG650 = 650 molecular weight polytetramethyleneglycol diol (Dupont)

The compositions were suitably cured by exposure to UV light from a Fusion D lamp. The dL/L for each coating was measured over the temperature range of 25 C., (ambient temperature) to 125 C. (highest usual stripping temperature).

For Comparative Example A-1, the dL/L for a temperature change from ambient temperatures (25 C.) to ribbon stripping temperatures (100 C.) was 1.42%.

For Comparative Example A-2, the dL/L for a temperature change from ambient temperatures (25 C.) to ribbon stripping temperatures (100 C.) was 2.3%.

Thus, the ratio of the dL/L (inner primary) to dL/L (outer primary) was about 1.6, which would be acceptable if the coefficient of friction of the inner primary coating was low enough. However, the inner primary coating exhibited too high of a coefficient of friction, because the fiber friction estimated by using the fiber pull-out friction method described herein below was too great. The fiber pull-out friction was 39 g/mm, which resulted in a resistive force that was greater than the cohesive strength of the inner primary coating. Therefore, substantial amounts of inner primary coating residue were left on the optical glass fiber after ribbon stripping using the above inner and outer primary coatings.

Coefficient of Friction of Inner Primary Coating

From the above equations, fiber friction between the optical glass fiber and inner primary coating can also be adjusted by reducing the coefficient of friction of the inner primary coating against the surface of the optical glass fiber. By reducing the coefficient of friction of the inner primary coating, the "rubber-like" drag of the inner primary coating on the optical glass fiber is reduced.

Preferably, the coefficient of friction of the inner primary coating is reduced without reducing the adhesion of the inner primary coating to the surface of the optical glass fiber. If the adhesion is reduced, then undesirable delamination of inner primary coating from the surface of the optical glass fiber can occur.

It has been found that the fiber friction can be adequately adjusted to a value which provides resistive force below the cohesive strength of the inner primary coating by adjusting the coefficient of friction of the inner primary coating with the use of one or more of the novel slip additives described herein. Surprisingly, the coefficient of friction can be reduced to such a level without substantially reducing the adhesion of the inner primary coating to the optical glass fiber as follows.

Preferably, the ratio of the dL/L (inner primary) to the dL/L (outer primary) is adjusted in combination with adjusting the coefficient of friction of the inner primary coating to provide a fiber friction value which results in a resistive force that is less than the cohesive strength of the inner primary coating.

In practice, ribbon assemblies are generally stripped using a heated stripping tool. However, using the inventive concepts described herein, the present invention includes ribbon assemblies which surprisingly can be ribbon stripped at much lower temperatures, such as ambient temperatures, to provide bare optical glass fibers which are substantially free-of residue. It has been found that if the fiber friction between the inner primary coating and the surface of the optical glass fiber and/or the normal force is adjusted to a level which provides a resistive force lower than the cohesive strength of inner primary coating, the ribbon assembly will be ribbon strippable. Therefore, if a ribbon assembly which is adapted to provide ribbon strippability at ambient temperatures is desired, the fiber friction can be adjusted to a level to provide a resistive force that is less than the cohesive strength of the inner primary coating using slip agents as discussed herein. Alternatively, if the ribbon assembly is adapted to provide ribbon strippability at temperatures greater than ambient temperatures, the resistive force can be adjusted to a level lower than the cohesive strength of the inner primary coating by adjusting the ratio of the dL/L (inner primary) to the dL/L (outer primary) to provide a lower normal force and fiber friction, and/or adjusting the coefficient of friction of the inner primary coating using slip agents to provide a lower fiber friction.

Novel Radiation-curable, Silicone-silane Oligomer

This invention also provides a novel type of radiation-curable oligomer that can be used to adjust the fiber friction between the inner primary coating and the surface of the optical glass fiber. The radiation-curable oligomer comprises a glass coupling moiety, a slip agent moiety, and a radiation curable moiety, each moiety being linked to a single composite oligomer molecule through covalent bonding to provide a composite oligomer. Such linkage of all three moieties is heretofore unknown. Linkage of these moieties can be direct so that no intermediate linking group between the oligomer and the moiety is required. Alternatively, however, the linkage can be indirect by using intermediate linking groups.

A variety of glass coupling, slip agent, and radiation curable moieties are known in the art. The present invention can be practiced with use of various embodiments using different combinations of these moieties to produce a composite oligomer. A person skilled in the art will easily be able to prepare combinations of these various moieties from the present disclosure and general knowledge in the art.

Radiation-curing can occur by reaction of the composite oligomer's radiation-curable moieties with themselves or with radiation-curable moieties bound to other components of a formulation. In general, curing of the composite oligomer occurs in concert with other radiation-curable components. Radiation-curing, in the present invention, is associated with reaction of the radiation-curable moiety, not with the glass coupling or slip agent moieties. For example, although the glass coupling moiety will be reactive, and is often sensitive to hydrolysis and condensation reactions, these types of reactions are not the principal cure mechanism.

The molecular weight of the oligomer is not limited. In general, however, the molecular weight of the oligomer in its uncured state is usually between about 200 and about 10,000, preferably between about 500 and about 5,000. Molecular weight as used throughout this disclosure generally means number average molecular weight when measured, or the theoretical calculated molecular weight based on the reactants and reaction conditions used to make the composite oligomer.

There is no particular limitation on the molecular architecture of the composite oligomer, although in general, linear or substantially linear oligomeric structures are used rather than non-linear, cyclic, or branched structures. To the extent that the inventive concept can be practiced, however, branched or other non-linear structures are also envisioned and are not excluded. A substantially linear structure means that there is a single, dominant linear oligomeric backbone which is "capped" at the two ends of the backbone. The amount of branching units in the backbone is generally less than about 10 mole %, and preferably, less than about 5 mole %. The linear backbone may contain one or more types of repeat units, although preferably, one major type of repeat unit is used. Nevertheless, block or random copolymeric structures can be used if necessary. With a substantially linear backbone, the number of branch points in the backbone will be kept to a minimum, and preferably, will not be used. Synthetic simplicity in the oligomer structure is preferred to the extent that cost-performance can be achieved.

The term "glass coupling moiety" can be readily understood by a person skilled in the art and is understood to mean a functional group which is known or has the ability to improve adhesion to an inorganic surface or at an inorganic-organic interface, and in particular, a glass surface or at a glass-polymer interface. Such glass coupling moieties are associated with conventional coupling agents or adhesion promoters, as known to those skilled in the art. These conventional coupling agents generally have (1) an organic functional group which bonds with, or is at least associated with, the organic material at the interface, and (2) an inorganic component which bonds, usually covalently, to the inorganic material at the interface. Although the complexities of such bonding are not fully understood, usually, bonding to the inorganic surface occurs following hydrolysis and/or condensation reactions.

Exemplary conventional silane coupling agents are disclosed in E. P. Plueddemann's *Silane Coupling Agents*, Plenum Press (1982), the complete disclosure of which is hereby incorporated by reference. Non-silane types of coupling agents are also known and include, for example, chromium, orthosilicate, inorganic ester, titanium, and zirconium systems. Although the present invention is preferably practiced with use of silane glass coupling moieties, the invention is not so restricted, and a person skilled in the art is enabled by the present disclosure to use these other systems as well.

In the present invention, the glass coupling moieties are not part of a conventional coupling agent, but are incorporated covalently into the oligomer in a manner which preserves their coupling function to the inorganic surface or at the inorganic-organic interface. In a preferred embodiment, for example, the organic component of a conventional coupling agent is linked covalently, either directly or indirectly, with the composite oligomer together with the slip agent and radiation curable moieties. After this linkage, the glass coupling moiety will still have its inorganic component effective for bonding with the inorganic surface or at the inorganic-organic interface. However, the invention is not so limited, and the glass coupling moiety is not necessarily linked to the composite oligomer by reaction of the organic functional group of a conventional coupling agent.

Silane coupling moieties are preferred. These moieties can be created by covalently linking a conventional coupling agent or adhesion promoter with the oligomer. Representative types of silane coupling moieties have been disclosed in the aforementioned Plueddemann reference and the product information publication from Union Carbide entitled "UNION CARBIDE® Organofunctional Silanes Products and Applications" (1991, 1992), the complete disclosure of which is hereby incorporated by reference. The inorganic component of the conventional silane coupling agent is generally represented by the formula:

$$—Si(OR)_3$$

where R is a conventional lower, and preferably, a $C_1$–$C_4$, alkyl group such as methyl or ethyl which imparts at least some hydrolyzability to the silane. Other types of R groups are also known in the art, however, and the invention is not particularly limited by the particular R group or silane structure to the extent that glass coupling can occur. Generally, at least one hydrolyzable "—Si—O—R" linkage will be present in the glass coupling moiety to facilitate coupling to the surface of the optical glass fiber. Preferably, there is more than one such linkage. Hydrolyzable means that this linkage is sensitive to reaction with water to generate "—Si—OH" linkages. In turn, "—Si—OH" linkages are believed to condense to form "—Si—O—Si—" linkages. In many cases, hydrolysis may even begin to occur with exposure to atmospheric moisture. Hydrolysis of silanes and glass surfaces in the context of optical fiber coatings is discussed in, for example: (i) the chapter entitled "Coating and Jackets", Chapter 10, Blyler et al. *Optical Fiber Telecommunications*, 1979, pgs. 299–341, and (ii) S. Wu, *Polymer Interface and Adhesion*, Marcel Dekker, 1982, pgs. 406–434, the complete disclosures of which are hereby incorporated by reference.

Common organic functionalities of the silane coupling agents include, for example, amino, epoxy, vinyl, methacryloxy, isocyanato, mercapto, polysulfide, and ureido. Using synthetic methods known in the art, the organic functionality can be reacted with the oligomer to yield a covalent linkage between the glass coupling moiety and the oligomer. In a preferred embodiment, for example, mercaptopropyl silane is linked with an oligomer containing an isocyanate group to form a thiourethane adduct between the mercapto group and the isocyanate group. Although a strong linkage is preferred, the present invention encompasses the possibility that although a covalent linkage is formed, the covalent linkage may not be strong and may, for example, be sensitive to disruption with the application of heat. However, as long as the glass coupling moiety produces the desirable effect of promoting adhesion, the covalent linkage is sufficient. If necessary, catalysts may be used to promote linkage formation.

Slip agents when used to practice this invention do not substantially affect the adhesion of the inner primary coating to the surface of the optical glass fiber. Instead, the slip agents reduce the sliding force of the inner primary coating against the surface of the optical glass fiber, once the bonds between the surface of the optical glass fiber and inner primary coating are broken (i.e. after the inner primary coating has been delaminated).

Slip agents are also known in the art as, among other things, release, antiblocking, antistick, and parting agents. Slip agents are commonly oligomeric or polymeric and are usually hydrophobic in nature, with the most common examples including silicones (or polysiloxanes), fluoropolymers, and polyolefins. If desired, the slip agent moiety can include silicones, fluoropolymers, and/or polyolefins in combination with polyesters, polyethers and polycarbonates. Slip agents are disclosed in, for example, the article entitled "Release Agents" published in the *Encyclopedia of Polymer Science*, 2nd Ed., Vol. 14, Wiley-Interscience, 1988, pgs. 411–421, the complete disclosure of which is hereby incorporated by reference. Although slip agents operate over a wide variety of interfaces, the present invention is particularly concerned with an interface of a glass surface, and in particular, a glass-organic coating interface between the inner primary coating and the surface of the optical glass fiber. A slip agent can be covalently incorporated into the composite oligomer as a slip agent moiety.

In a preferred embodiment, the slip agent moiety is the principal component of the oligomer in terms of weight percent because the slip agent moiety itself is usually oligomeric in nature, and the glass coupling and radiation-curable moieties are usually of lower molecular weight. For example, the slip moiety can be up to about 95 wt. % of the total composite oligomer weight when the three moieties are directly linked together. However, when an oligomeric backbone is present, the slip agent usually can be up to about 85 wt. % of the composite oligomer weight. As with the molecular weight of the composite oligomer of the present invention, the molecular weight of the slip agent moiety is not strictly limited, but will generally be between about 150 and about 9,500, preferably, between about 400 and about 4500.

As with the molecular architecture of the oligomer, there is no particular limitation on the molecular architecture of the slip agent moiety, although in general, substantially linear structures can be used. Non-linear or branched structures, however, are not excluded. Oligomeric slip agent moieties, when present, may contain different kinds of repeat units, although preferably, there is one main type of repeat unit.

Oligomeric silicone slip agent moieties are preferred, and oligomeric silicones comprising substantial portions of methyl side groups are particularly preferred. The side groups preferably impart hydrophobic character to the silicone. Other preferred side groups include ethyl, propyl, phenyl, ethoxy, or propoxy. In particular, dimethylsiloxane repeat units represented by the formula, "—OSi(CH$_3$)$_2$—" are preferred.

In a preferred embodiment, the end groups on a substantially linear silicone oligomer can be linked with a radiation curable moiety at one end and a slip agent moiety at the other end. Such linkage can involve intermediate linkage groups. Although linkage at the silicone oligomer end group is preferred, the silicone moiety can be tailored for linkage with slip agent and radiation-curable moieties at other points in the oligomer molecule besides the end groups. For example, functional groups can be incorporated throughout the molecular structure of the silicone oligomer that are linked with the radiation-curable and slip agent moieties. Examples of functionalized silicones which can be incorporated into the oligomer include polyether, polyester, urethane, amino, and hydroxyl.

Other types of slip agent moieties including those made from fluorinated slip agents can also be used. Examples of suitable fluorinated slip agents include FC-430, FX-13, and FX-189 (Minnesota Mining and Manufacturing), Fluorolink E (Ausimont), and EM-6 (Elf Atochem).

Generally, the composite oligomer of the present invention is surface active because of the glass coupling moieties, and in particular, may tend to concentrate at coating interfaces, such as the glass-coating interface, if not bound in the inner primary coating. However, the covalent binding of the composite oligomer after cure, due to the radiation-curable moiety, may retard such surface activity or migration. Surface activity means that the composite oligomer, when placed in a formulation, tends to migrate to the surface of the formulation rather than be dispersed evenly throughout the formulation.

The radiation-curable moiety should help ensure that the composite oligomer is covalently linked within a radiation-curable coating so that the composite oligomer cannot be extracted or volatilized from the cured coating without breaking covalent bonds.

The radiation-curable moiety can include any functional group capable of polymerizing under the influence of, for example, ultraviolet or electron-beam radiation. One type of radiation-curable functionality is, for example, an ethylenic unsaturation, which in general is polymerized through radical polymerization, but can also be polymerized through cationic polymerization. Examples of suitable ethylenic unsaturation are groups containing acrylate, methacrylate, styrene, vinylether, vinyl ester, N-substituted acrylamide, N-vinyl amide, maleate esters and fumarate esters. Preferably, the ethylenic unsaturation is provided by a group containing acrylate, methacrylate or styrene functionality. Most preferably, the ethylenic unsaturation is provided by a group containing acrylate functionality.

Another type of functionality generally used is provided by, for example, epoxy groups, or thiol-ene or amine-ene systems. Epoxy groups, in general, can be polymerized through cationic polymerization, whereas the thiol-ene and amine-ene systems are usually polymerized through radical polymerization. The epoxy groups can be, for example, homopolymerized. In the thiol-ene and amine-ene systems, for example, polymerization can occur between a group containing allylic unsaturation and a group containing a tertiary amine or thiol.

The amount or number of glass coupling, slip agent, and radiation curable moieties in the composite oligomer is not particularly limited provided that advantages of the present invention can be achieved and the inventive concept is practiced. Thus, a single molecule of the composite oligomer can contain multiple numbers of glass coupling, slip agent, or radiation-curable moieties, although in a preferred embodiment, a single oligomeric molecule contains one glass coupling, one slip agent, and one radiation-curable moiety.

The glass coupling, slip agent, and radiation curable moieties should be covalently linked together in the oligomer. There is no particular limitation to how this linkage is effected provided that advantages of the present invention are achieved and the inventive concept practiced. Linkage may entail direct linkage to the oligomer, or alternatively, indirect linkage to the oligomer. Intermediate linking groups will generally operate by way of two functional groups on a linking compound which can link, for example, the radiation-curable moiety with the slip agent moiety, or link the glass coupling moiety with the slip agent moiety.

Representative linking compounds include diisocyanate compounds, wherein linkage occurs by formation of urethane, thiourethane; or urea links by reaction of hydroxyl, thiol, and amino groups respectively, with isocyanate. Such diisocyanate compounds are well-known in the polyurethane and radiation curable coating arts. Aromatic or aliphatic diisocyanates can be used, although aliphatic diisocyanates are preferred. Other linkages can be through, for example, carbonate, ether and ester groups. Preferably, urethane, urea or thiourethane groups are used as the linking groups.

The oligomer, therefore, preferably comprises within its structure at least one linkage represented by

—NH—CO—X— wherein X is an oxygen, sulfur, or nitrogen atom. Urethane and thiourethane groups are most preferred. Urethane groups, for example, can hydrogen bond.

Although the present invention is not limited to one particular molecular architecture for the composite oligomer, in a preferred embodiment which makes use of intermediate linking groups, the composite oligomer can be represented by the following generic structure:

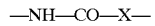

wherein A represents the slip agent moiety,

R represents a radiation-curable moiety,

C represents the glass coupling moiety, and

L$_1$ and L$_2$ represent linking groups.

L$_1$ and L$_2$ can be independently any group capable of providing a covalent link between the "R" moiety and the "A" moiety or between the "C" moiety and the "A" moiety. Based on the disclosure provided herein, one skilled in the art will easily be able to understand what linking groups are suitable for the particular "A", "C" and "R" groups selected.

In particular, urethane and thiourethane groups are preferred. Urethane and thiourethane linking groups are formed by, for example, (i) linking a hydroxyl end-capped oligomer with a low molecular weight diisocyanate compound at both oligomer ends without extensive coupling of the oligomer, (ii) linking the isocyanate end-capped oligomer with a low molecular weight hydroxyacrylate compound, or (iii) linking the isocyanate end-capped oligomer with a low molecular weight mercapto compound.

The linking groups, however, are considered optional. In other words, the oligomer also can be represented by the following generic structures:

R—L$_1$—A—C,

R—A—L$_2$—C, or

R—A—C.

Although the present invention is disclosed in terms of the aforementioned groups or moieties, other groups can in principle be incorporated into the molecular structure to the extent that the advantages of the present invention can be achieved and the inventive concept practiced.

A preferred embodiment of the present invention is the preparation of a composite oligomer with use of the following ingredients: a silicone oligomer having two hydroxyl end groups (slip agent moiety), isophorone diisocyanate (linkage), hydroxyethyl acrylate (radiation-curable moiety), and mercaptopropyl silane (glass coupling moiety). Isophorone diisocyanate (IPDI) serves to end-cap both ends of the silicone diol oligomer and provide a linking site with the hydroxyethyl acrylate at one end of the silicone oligomer and with the mercaptopropyl silane at the other end.

A preferred application for the composite oligomer is as an oligomeric additive, or even as a main oligomeric component, in a radiation-curable coating, and in particular, an inner primary, optical glass fiber coating. The amount of oligomeric additive incorporated into the radiation curable matrix is not particularly limited but will be sufficient or effective to achieve the specific performance objectives of the particular application. In general, however, a suitable amount will be between about 0.5 wt. % and about 90 wt. %, preferably, between about 0.5 wt. % and about 60 wt. %, and more preferably, between about 0.5 wt. % and about 30 wt. % with respect to the total weight of the radiation-curable coating formulation. In general, higher molecular weight composite oligomers will be present in a radiation-curable coating in greater weight percentages than lower molecular weight composite oligomers.

The composite oligomer functions to tailor the properties of formulations which exhibit too great a coefficient of friction or too low adhesion. Specifically, the composite oligomer can increase the adhesion if the adhesion is unacceptably low, and in particular unacceptably low in the presence of moisture. Alternatively, the composite oligomer can reduce the coefficient of friction of a coating. Conventional coupling additives and slip agents cannot perform this dual function.

If desired, although a reduction in the number of additives is desirable, the composite oligomer can be used in conjunction with conventional coupling and slip agents to improve absolute performance or cost-performance. In a preferred embodiment, for example, the composite oligomeric can be used in conjunction with a functional organosilane compound such as, for example, mercaptopropyl silane. For example, a hydroxybutylvinylether adduct with OCN—(CH$_2$)$_3$Si(OCH$_3$)$_3$ can also be used together with the composite oligomer.

The composite oligomer can be incorporated into a wide variety of radiation-curable formulations. There are no particular limitations provided that the inventive concept is practiced and advantages accrue. One skilled in the art of formulating radiation-curable coatings will easily be able to incorporate the composite oligomer therein to provide the desired properties.

In optical glass fiber coating applications, for example, other formulation components generally include:

(i) at least one multi-functional radiation-curable oligomer, which is a different oligomer than the composite oligomer of the present invention, to provide a cross-linked coating;

(ii) at least one reactive diluent to adjust the viscosity to a level acceptable for application to optical glass fibers, and (iii) at least one photoinitiator.

Additives such as antioxidants, and as already noted, coupling and slip agents may also be utilized.

Radiation-curing is generally rapidly effected with-use of ultraviolet light, although the present invention is not so limited, and a person of skill in the art can determine the best cure method. Radiation-curing results in polymerization of at least some of the radiation-curable moieties present in the composite oligomer which covalently links the composite oligomer to itself or, more preferably, other radiation-curable components in the formulation. The chemical processes which occur upon mixing and curing formulations are in some cases complex and may not be fully understood. The present invention, however, is not limited by theory and can be readily understood and practiced by persons of skill in the art. The formulations of the present invention, just like the composite oligomer, can be in pre-cured, partially cured, and in cured states. The term component, which defines additives and compounds used to prepare the formulations, generally refers to starting materials before mixing. After mixing, interactions or even reactions between the components may occur.

The composite oligomer can be incorporated into inner primary coating compositions, outer primary coating compositions, ink compositions and matrix forming compositions. The composite oligomer also can be incorporated into so-called single coating systems.

In general, the coating substrate will be an inorganic or glass substrate, although in principle, other substrates such as polymeric substrates may also be effectively used. The substrate preferably has the capacity to couple with the glass coupling moiety of the oligomeric additive. In a preferred application, the coating substrate is an optical glass fiber, and in particular, a freshly drawn, pristine optical glass fiber. Freshly prepared optical glass fiber is known in the art to be responsive to glass coupling agents. Exemplary methods of coating optical fibers are disclosed in, for example, U.S. Pat. Nos. 4,474,830 and 4,913,859, the complete disclosures of which are hereby incorporated by reference.

The present inventions will be further explained by use of the following non-limiting examples.

EXAMPLE 2-1

Comparative Examples B-1 and B-2

Synthesis of Novel Composite Oligomer

A 1,000 mL four-necked flask was charged with isophorone diisocyanate (55.58 g). 2,6-di-tertbutyl-4-methylphenol (0.12 g) and dibutyltin dilaurate (0.24 g) were added to the flask. 14.51 grams of Hydroxyethyl acrylate was added over a 90 minute period while maintaining the temperature below 40 C. At the end of 90 minutes, the temperature was increased to 40 C., and the mixture was stirred at 40 C. for one hour. The temperature was allowed to decrease to about 30 C. Mercaptopropyl silane (28.13 g of an 87.1% pure product) was added over 90 minutes during which time the temperature was maintained below 40 C. After the addition of mercaptopropyl silane, the temperature was increased to 40 C., and the reaction mixture was stirred at 40 C. for 17–18 hours. 300 g of a 50% ethoxylated polydimethylsiloxane diol of 1200 equivalent weight Q4-3667 (Dow Corning) was then added, and the temperature was increased to 70 C. After about six hours, the isocyanate content was measured to be about zero percent. The temperature was decreased to 50 C.

Based on the reaction conditions and reactants, a composite silicone silane acrylate oligomer was formed having the following structure:

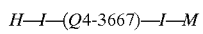

wherein:

H=hydroxyethylacrylate,

I=isophorone diisocyanate,

Q4-3667=the above described silicone diol, and

M=mercaptopropyl silane

Preparation of Pre-cured Formulation

The components shown in Table 2 were combined, except for the composite oligomer and the silane coupling agent. The components were heated to about 60 C. and mixed to form homogeneous mixtures. The composite oligomer and silicone coupling agent were mixed therein and the mixture was heated for approximately 15 minutes at 60 C. to form an improved radiation-curable, inner primary, optical glass fiber coating composition, Example 2-1. The mixtures for Comparative Examples B-1 and B-2 were prepared similarly. Drawdowns of the compositions were made and then suitably cured by exposure to UV light to form cured coatings. The cured coatings were tested for resistance to delamination and fiber pull-out residue using the following methods.

Water Soak Delamination Test

A drawdown of each inner primary coating composition was made to form a 75 micron film of the inner primary coating composition on microscope slides and then cured by exposure to 1.0 J/sq cm, from a Fusion D lamp, 120 W/cm, under a nitrogen atmosphere. Then, a drawdown of each outer primary coating was made to form a 75 micron film of the outer primary coating composition over the cured 75 micron inner primary film, and then cured in the same manner as the inner primary coating.

Deionized water was placed in a 500 ml beaker and the coated microscope slides were soaked in the water. The beaker containing the coated slides was then placed in a 60 C. hot water bath. The films were observed for delamination periodically. The time when the first signs of delamination appeared were recorded.

Fiber Pull-out Residue Test

The operation of stripping coatings from optical fibers to leave a bare glass surface was simulated by pulling four bare glass fibers out of a layer of cured inner primary coating. Microscopic examination of the pulled-out fibers at low magnification (e.g., 10x) clearly revealed the presence or absence of debris on the glass surface. If debris was present, the amount of debris was noted. The results of these tests are provided in Table 2.

TABLE 2

| | Ex. 2-1 | Comp. Ex B-1 | Comp. Ex B-2 |
|---|---|---|---|
| Component (Amount is % by weight based on total weight of composition) | | | |
| Urethane acrylate oligomer | 53.2 | 56 | 53.87 |
| Isodecyl Acrylate | 13.3 | 14 | 13.47 |
| Ethoxylated-nonylphenol Monoacrylate | 24.22 | 25.5 | 24.53 |
| Silicone Silane Oligomer H-I-Q4-3667-I-A189 | 5 | 0 | 0 |
| Q4-3667 (Dow Corning) | 0 | 0 | 3.8 |
| Photoinitiator | 2.85 | 3 | 2.89 |
| Antioxidant | 0.47 | 0.5 | 0.48 |
| y-Mercapto-propyl Trimethoxy-Silane | 0.95 | 1.0 | 0.96 |
| Fiber Pull-out Residue Test | no residue | lot of residue | no residue |
| Delamination, if any, after the hot water soak* | none | none | delam. After 1 hour at 60° C. |

The oligomers were formed by reacting the following monomers:
H = Hydroxyethyl Acrylate
I = Isophorone Diisocyanate
Q4-3667 = ethoxylated polydimethylsiloxane diol, MW of 1200 (Dow Corning)
*Samples were aged for 4 hours at 60° C. Then the water bath was shut-off for about 70 hours. The temperature was then brought back to 60° C. for an additional 48 hours.

Comparative Example B-1 was a formulation which did not contain the composite oligomer of the present invention, but which contained a silane coupling agent. However, poor results were obtained in the pull-out test because adhesion was too strong.

Comparative Example B-2 was a formulation which contained a conventional silicone slip agent. The silicone slip agent improved the results of the pull-out test compared to Comparative Example A, but only at the expense of hydrolytic interfacial adhesion.

Example 2-1 was a formulation that contained the composite oligomer of the present invention. The composite oligomer remarkably improved the results of the pull-out test but not at the expense of hydrolytic interfacial adhesion.

Examples 2-2 and 2-3

Comparative Examples B-3 and B-4

These Examples and Comparative Examples were conducted to demonstrate the effect of the composite oligomer on glass plate adhesion. The formulations shown in Table 3 were prepared in the same manner as in Example 2-1 and Comparative Examples B-1 and B-2. The silicone silane acrylate oligomer was prepared in the same manner as in Example 2-1, except that a silicone diol HSi-2111 (Tego Chemie) was used instead of Q4-3667 (Dow Corning).

Films of the coating materials (75 microns thick) were prepared on microscope slides and then cured by exposure to UV light. A commercially available outer primary coating was formed on top of the coatings. The films were soaked in water at 60 C. and then examined for delamination. In addition, dry and wet adhesion was measured at 50% and 95% relative humidity (RH), respectively. The results are summarized in Table 3.

Dry (50% RH) and wet (95% RH) adhesion can be measured by recognized test methods. For example, as explained in U.S. Pat. Nos. 5,336,563 (Coady et al.) and 5,384,342 (Szum), the wet and dry adhesion was tested on cured film samples prepared by drawing down, with a Bird Bar, a 75 micron film of the coating compositions on glass microscope slides and cured by exposure to 1.0 J/sq cm, from a Fusion D lamp, 120 W/cm, under a nitrogen atmosphere, as noted above in Example 2-1.

The samples were then conditioned at a temperature of 23±2° C. and a relative humidity of 50±5% for a time period of 7 days. A portion of the film was utilized to test dry adhesion. Subsequent to dry adhesion testing, the remainder of the film to be tested for wet adhesion was further conditioned at a temperature of 23±2° C. and a relative humidity of 95% for a time period of 24 hours. A layer of polyethylene wax/water slurry was applied to the surface of the further conditioned film to retain moisture.

The adhesion test was performed utilizing apparatus which included a universal testing instrument, e.g., an Instron Model 4201 commercially available from Instron Corp., Canton, Mass., and a device, including a horizontal support and a pulley, positioned in the testing instrument.

After conditioning, the samples that appeared to be uniform and free of defects were cut in the direction of the draw down. Each sample was 6 inches long and 1 inch wide and free of tears or nicks. The first one inch of each sample was peeled back from the glass. The glass was secured to the horizontal support with the affixed end of the specimen adjacent the pulley. A wire was attached to the peeled-back end of the sample, run along the specimen and then run through the pulley in a direction perpendicular to the specimen. The free end of the wire was clamped in the upper jaw of the testing instrument which was then activated. The test was continued until the average force value, in grams force/inch, became relatively constant. The preferred value for wet adhesion is at least about 5 g/in.

TABLE 3

|  | Ex. 2-2 | Ex.2-3 | Comp. Ex. B-3 | Comp. Ex. B-4 |
|---|---|---|---|---|
| Component (Amount is parts by weight) |  |  |  |  |
| Oligomer C H-I-(PTHF2000-I)$_2$-H | 49.22 | 49.22 | 49.22 | 49.22 |
| Ethoxylated nonylphenol Acrylate | 24.76 | 24.76 | 24.76 | 24.76 |
| Lauryl Acrylate | 16.64 | 16.64 | 16.64 | 16.64 |
| 2,4,6-trimethylbenzoylDiphenyl Phosphine Oxide | 3.0 | 3.0 | 3.0 | 3.0 |
| Thiodiethylene bis (3,5-di-Tert-Butyl-4-Hydroxy)hydrocinnamate | 0.46 | 0.46 | 0.46 | 0.46 |
| gamma-Mercaptopropyl Trimethoxy Silane | 0.92 | — | 0.92 | — |
| Silicone Silane Acrylate Oligomer H-I-HSi2111-I-M | 5 | 5 | — | — |
| Adhesion at 50% RH (g/in) | 45 | 14 | 27 | 9 |
| Adhesion at 95% RH (g/in) | 34 | 12 | 20 | 4 |
| 60 C Water Soak | No Delamination After 24 Hours | Slight Delamination After 15 Minutes | No Delamination After 8 Hours; Slight Delamination After 24 Hours | Delamination After 15 Minutes |

The oligomers were formed by reacting the following monomers:
H = Hydroxyethyl Acrylate
I = Isophorone Diisocyanate
M = Mercapto Silane
PTHF2000 = 2000 molecular weight Polytetramethylene Ether Glycol (BASF)
HSi2111 = a silicone dial having a MW of 1000 (Tego Chemie)

The results in Table 3 indicate that the composite oligomer is not only able to improve adhesion to the glass surface, but is also able to act synergistically with a conventional silane coupling agent.

EXAMPLE 2-4

The formulation shown in Table 4 was prepared in the same manner as in Example 2-1. The silicone silane acrylate oligomer was the same as that prepared in Example 2-1.

A film of the coating material (75 micron thick) was prepared on glass plates and then cured by exposure to UV light in the same manner as above. The tensile strength, elongation and modulus were measured.

A 75 micron film of the coating material was also prepared and suitably cured. The crack propagation was then measured. A fiber pull-out friction test was also conducted, as described herein. The predicted ribbon strip cleanliness was calculated. The results are shown in Table 4.

TABLE 4

|  | Example 2-4 |
|---|---|
| Component (Amount in % by weight of total composition) |  |
| H-I-(PTGL2000-I),-H | 49.24 |
| Ethoxylated Nonylphenol Acrylate Ester | 25.46 |
| Diphenyl (2,4, 6-trimethylbenzoyl) Diphenyl Phosphine Oxide and 2-Hydoxy-2-Methyl-1-Phenyl-l-Propanone blend | 3 |
| Lauryl Acrylate | 16 |
| Thiodiethylene bis (3,5-di-Tert-Butyl-4-Hydroxy)hydrocinnamate | 0.5 |
| H-I-HSi2111-I-M | 5 |
| Mercaptopropyl trimethoxy silane | 0.8 |
| Test Results |  |
| Viscosity, mPa.s at 25 C. | 7000 |
| Tensile Strength, MPa | 0.8 |
| Elongation, % | 230 |
| Modulus, MBa | 1 |
| Dose@95% Modulus, J/cm$^2$ | 0.64 |
| E'=100 MPa, ° C. | −66 |
| E'=100 MPa, ° C. | −50 |
| Peak TAN Delta ° C. | −40 |
| E$_0$, MPa | 1.3 |
| Strip Cleanliness Predicted | 3 |
| Crack Propagation, mm | 1.49 |
| Fiber Pull-out Friction, g/mm | 18.5 |

The oligomers were formed by reacting the following components:
H = Hydroxyethyl Acrylate
I = Isophorone Diisocyanate
M = Mercaptopropyl trimethoxy silane
PTGL2000 = 2000 molecular weight polymethyltetrahydrofurfuryl/polytetrahydrofurfuryl copolymer diol (Mitsui, NY)
HSi2111 = a silicone diol having a MW of 1000 (Tego Chemie, or Gold Schmidt Chemical Corp.)

From the above test data, surprisingly, the novel silicon silane acrylate oligomer can be used to provide an inner primary coating having a fiber friction that provides a resistive force that is less than the cohesive strength of the inner primary coating. This finding is based on the predicted strip cleanliness being about 3. A value of about 3 or less is very good and will usually provide a bare optical glass fiber which is suitable for connection to another optical glass fiber or component of a light transmission assembly, without having to wipe residue from the bare optical glass fiber.

Description of Test Methods Used Herein
Predicted Strip Cleanliness Test Method

The predicted strip cleanliness is the predicted degree of cleanliness of a bare optical glass fiber after the inner primary coating has been removed during ribbon stripping. A lower number is better.

Surprisingly, it has been found that the degree of cleanliness of a bare optical glass fiber of a selected ribbon assembly can be predicted by measuring the following two properties of the inner primary coating:

(1) fiber pull-out friction; and
(2) crack propagation.

The crack propagation is a measure of the cohesive strength of the inner primary coating. The greater the cohesive strength of the inner primary coating the greater the amount of energy required to break apart the inner primary coating. Thus, an inner primary coating having a higher cohesive strength can withstand greater stripping forces during ribbon stripping without breaking apart and leaving residue on the surface of the optical glass fiber, than an inner primary coating having a lower cohesive strength.

The crack propagation can be measured as follows. First make a 75 micron thick drawdown of the inner primary composition and then cure the film by exposing it to 1.0 J/cm$^2$ of UV from a Fusion D lamp under a nitrogen atmosphere. Cut three test strips of dimensions 35 mm long, 12 mm wide, and 75 micron thick. A cut 2.5 mm long is made in the side of each strip. A strip is mounted in a RSA-II rheometer, the temperature brought to 90 C. (representative ribbon stripping temperature), and a constant extension rate of 0.1 mm/second is applied to the test strip. The measure of cohesive strength is the increase in length L before the crack propagates across the width of the test strip. The gauge length is constant at 23.2 mm. The value reported is currently the average of three measurements.

The fiber pull-out friction of the inner primary coating is an estimate of the fiber friction between the inner primary coating and the bare optical glass fiber. In general, the lower the fiber pull-out friction of the inner primary coating the lower the fiber friction between the optical glass fiber and the inner primary coating, the lower the resistive force, and the easier the inner primary coating will slide off of the optical glass fiber. Also, the lower the fiber friction, the less force that will be applied to the inner primary coating to conduct ribbon stripping. The less the force being applied to the inner primary coating, the lower the chance that the cohesiveness of the inner primary coating will fail, thus leaving inner primary coating residue on the surface of the optical glass fiber.

The fiber pull-out friction test can be performed as follows. The sample consists of a bare, clean optical fiber, one end of which has been embedded in a 250 micron thick sheet of cured inner primary coating to be tested. This assembly is mounted in a suitable instrument such as a Rheometrics RSA-II rheometer, and the temperature raised to a representative ribbon stripping temperature (such as 90° C.), and the fiber pulled slowly out of the sheet at a rate of 0.1 mm/sec. The instrument records and plots force vs distance. The plots typically show a linear region of negative slope, which is the result of a decreasing area of contact between fiber and coating, as the fiber is being withdrawn. The slope is measured, and is the output of the test. Low slope values correspond to a low fiber pull-out friction, and vice versa. Three test samples should be performed and their average used as the final output of the test.

Prior to using the information from the crack propagation and coefficient of friction measurements as a prediction method, calibration is required. Calibration consists of obtaining test data on at least five inner primary coatings of known cleanliness performance, and fitting the data to a three-dimensional surface using statistical procedures in a suitable statistical/plotting computer program. A convenient two-dimensional representation of the three-dimensional surface is a contour plot, in which each contour represents a fixed value of the cleanliness rating, and the vertical and horizontal axes are output values of the fiber pull-out friction and crack propagation tests, respectively.

The cleanliness ratings should be expressed on a quantitative scale, for example, a scale of 1 to 5. An example of a suitable quantitative scale is the "Mill's" test described in the background section herein above, the complete disclosure of which is incorporated herein by reference. When referring to strip cleanliness and predicted strip cleanliness herein, the numerical values correspond to those of the Mill's test.

After the calibration contour plot has been obtained, a point is plotted on it, using data from crack propagation and fiber pull-out friction measurements of an inner primary coating formulation for which a cleanliness prediction is desired. A prediction of cleanliness is obtained by noting the position of the point relative to the contour lines closest to it.

The following hypothetical example illustrates the calibration step, and the use of the contour plot thus produced, to obtain a predicted ribbon-stripping cleanliness. Eight inner primary coatings A through H, are prepared, and coated on an optical fiber in the usual manner, all having the same outer primary coating over the respective inner primary coatings. Coated fiber representing each of the eight inner primary coatings are then coated with an ink layer, and then assembled into a ribbon assembly. The type of ink and matrix material for ribbon assembly should be identical for all eight specimens. Three ribbon assemblies of each sample can be stripped at the desired ribbon stripping temperature. The cleanliness of each sample is evaluated using the Mill's test, in which 1 is best and 5 is worst. The final rating for each of the eight specimens is the average of the ratings of the three replicates. The hypothetical results are shown in Table 5.

TABLE 5

(HYPOTHETICAL)

| Coating | Fiber Friction (g/mm) | Crack Propagation (mm) | Rating |
|---------|----------------------|------------------------|--------|
| A | 2 | 1.1 | 1.6 |
| B | 30 | 0.8 | 5 |
| C | 35 | 1.6 | 3.7 |
| D | 20 | 1.7 | 2.8 |
| E | 7 | 2.3 | 1.8 |
| F | 25 | 2.0 | 1.5 |
| G | 4 | 1.6 | 1.6 |
| H | 22 | 1.0 | 3.9 |

Figure 6:
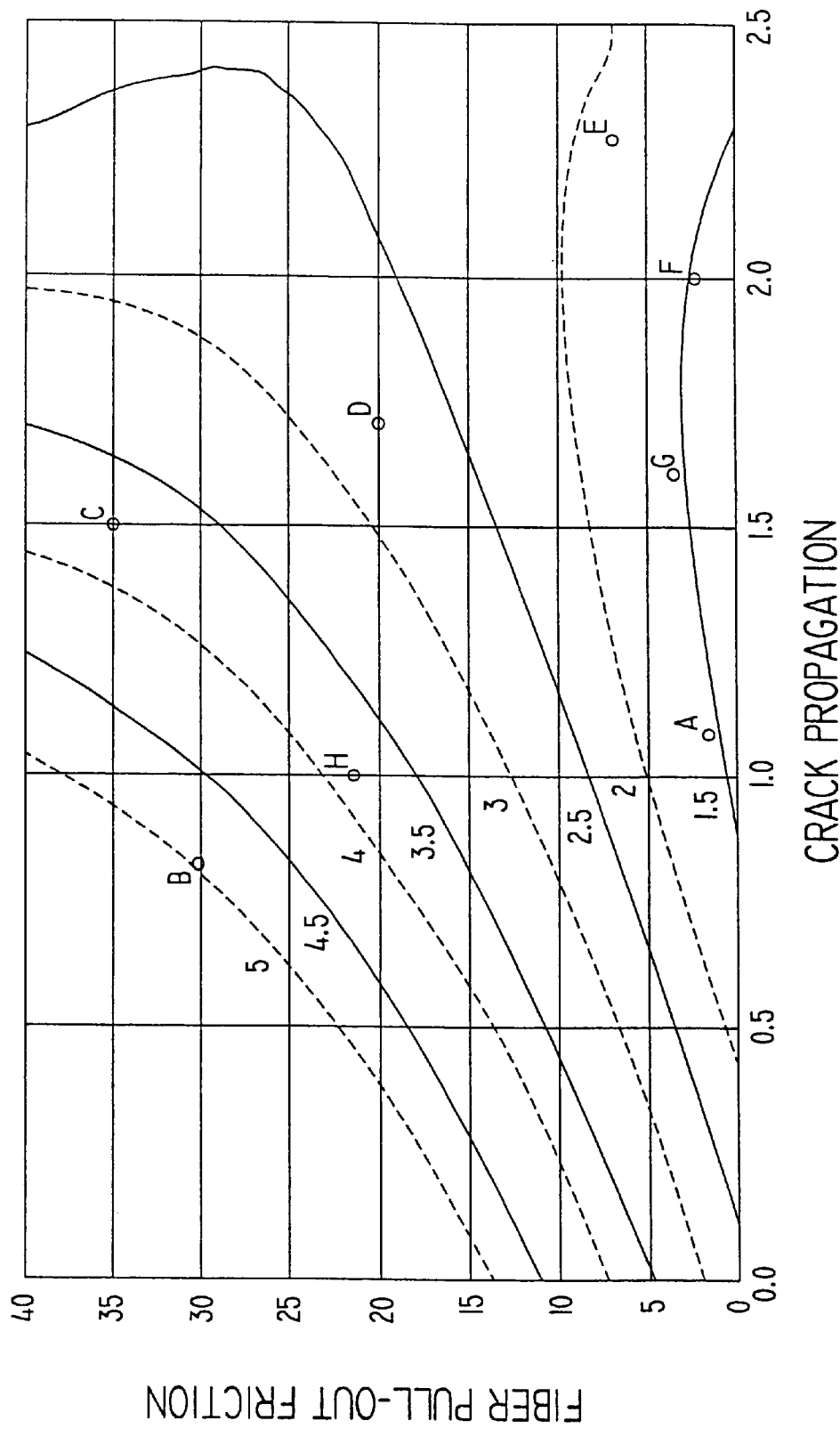
FIG. 6 illustrates a hypothetical contour plot for determining the predicted strip cleanliness.

Next, samples for fiber pull-out friction and crack propagation are prepared from the inner primary coating made from the selected inner primary composition, and output values for each test obtained, by the methods described herein. At this point, there are three data values associated with each of the eight samples. Hypothetical values, chosen to be typical of actual cases, are recorded in Table 5. The contour plot produced by a statistical software program is shown in FIG. 6.

This contour plot is used as follows. For example, a sample of an experimental inner primary coating is measured by the Fiber Pull-Out Friction and Crack Propagation tests, and the resulting data values were 10 and 1 respectively. The point corresponding to those values is located on the contour plot, and it is seen to fall between the contour values of 2.5 and 3. From its location relative to the two lines, the predicted cleanliness rating is estimated to be about 2.7.

A value of about 3 or less is considered acceptable for optical glass fiber connections.

Viscosity Test Method

The viscosity was measured using a Physica MC10 Viscometer. The test samples were examined and if an excessive amount of bubbles was present, steps were taken to remove most of the bubbles. Not all bubbles need to be removed at this stage, because the act of sample loading introduces some bubbles.

The instrument was set up for the conventional Z3 system, which was used. The samples were loaded into a disposable aluminum cup by using the syringe to measure out 17 cc. The sample in the cup was examined and if it contains an excessive amount of bubbles, they were removed by a direct means such as centrifugation, or enough time was allowed to elapse to let the bubbles escape from the bulk of the liquid. Bubbles at the top surface of the liquid are acceptable.

The bob was gently lowered into the liquid in the measuring cup, and the cup and bob were installed in the instrument. The sample temperature was allowed to equilibrate with the temperature of the circulating liquid by waiting five minutes. Then, the rotational speed was set to a desired value which will produce the desired shear rate. The desired value of the shear rate is easily determined by one of ordinary skill in the art from an expected viscosity range of the sample.

The instrument panel read out a viscosity value, and if the viscosity value varied only slightly (less than 2% relative variation) for 15 seconds, the measurement was complete. If not, it is possible that the temperature had not yet reached an equilibrium value, or that the material was changing due to shearing. If the latter case, further testing at different shear rates will be needed to define the sample's viscous properties. The results reported are the average viscosity values of three test samples.

Tensile Strength, Elongation and Modulus Test Method

The tensile strength, elongation and modulus of cured samples was tested using a universal testing instrument, Instron Model 4201 equipped with a personal computer and software "Series IX Materials Testing System." The load cells used were 2 and 20 pound capacity. The ASTM D638M was followed, with the following modifications.

A drawdown of each material to be tested was made on a glass plate and cured using a UV processor. The cured film was conditioned at 22 to 24° C. and 50±5% relative humidity for a minimum of sixteen hours prior to testing.

A minimum of eight test specimens, having a width of 0.5±0.002 inches and a length of 5 inches, were cut from the cured film. To minimize the effects of minor sample defects, sample specimens were cut parallel to the direction in which the drawdown of the cured film was prepared. If the cured film was tacky to the touch, a small amount of talc was applied to the film surface using a cotton tipped applicator.

The test specimens were then removed from the substrate. Caution was exercised so that the test specimens were not stretched past their elastic limit during the removal from the substrate. If any noticeable change in sample length had taken place during removal from the substrate, the test specimen was discarded.

If the top surface of the film was talc coated to eliminate tackiness, then a small amount of talc was applied to the bottom surface of test specimen after removal from the substrate.

The average film thickness of the test specimens was determined. At least five measurements of film thickness were made in the area to be tested (from top to bottom) and the average value used for calculations. If any of the measured values of film thickness deviates from the average by more than 10% relative, the test specimen was discarded. All specimens came from the same plate.

The appropriate load cell was determined by using the following equation:

$$[A \times 145] \times 0.0015 = C$$

Where: A=Product's maximum expected tensile strength (MPa);
 145=Conversion Factor from MPa to psi;
 0.00015=approximate cross-sectional area ($in^2$) of test specimens; and
 C=lbs.

The 2 pound load cell was used for materials where C=1.8 lbs. The 20 pound load cell was used for materials where 1.8<C<18 lbs. If C>19, a higher capacity load cell was required.

The crosshead speed was set to 1.00 inch/min (25.4 mm/min), and the crosshead action was set to "return at break". The crosshead was adjusted to 2.00 inches (50.8 mm) jaw separation. The air pressure for the pneumatic grips was turned on and adjusted as follows: set approximately 20 psi(1.5 $Kg/cm^2$) for primary optical fiber coatings and other very soft coatings; set approximately 40 psi(3 $Kg/cm^2$) for optical fiber single coats; and set approximately 60 psi(4.5 $Kg/cm^2$) for secondary optical fiber coatings and other hard coatings. The appropriate Instron computer method was loaded for the coating to be analyzed.

After the Instron test instrument had been allowed to warm-up for fifteen minutes, it was calibrated and balanced following the manufacturer's operating procedures.

The temperature near the Instron Instrument was measured and the humidity was measured at the location of the humidity gage. This was done just before beginning measurement of the first test specimen.

Specimens were only analyzed if the temperature was within the range 23±1.0 C. and the relative humidity was within 50±5%. The temperature was verified as being within this range for each test specimen. The humidity value was verified only at the beginning and the end of testing a set of specimens from one plate.

Each test specimen was tested by suspending it into the space between the upper pneumatic grips such that the test specimen was centered laterally and hanging vertically. Only the upper grip was locked. The lower end of the test specimen was pulled gently so that it has no slack or buckling, and it was centered laterally in the space between the open lower grips. While holding the specimen in this position, the lower grip was locked.

The sample number was entered and sample dimensions into the data system, following the instructions provided by the software package.

The temperature and humidity were measured after the last test specimen from the current drawdown was tested. The calculation of tensile properties was performed automatically by the software package.

The values for tensile strength, % elongation, and (secant or segment) modulus were checked to determine whether any one of them deviated from the average enough to be an "outlier." If the modulus value was an outlier, it was discarded. If there were less than six data values for the tensile strength, then the entire data set was discarded and repeated using a new plate.

Elastic Modulus Test Method

The elastic modulus (E'), the viscous modulus (E"), and the tan delta (E"/E'), which is an indication of the material's Tg, of the examples were measured using a Rheometrics Solids Analyzer (RSA-11), equipped with: 1) A personal computer having MS-DOS 5.0 operating system and having Rhios® software (Version 4.2.2 or later) loaded; 2) A liquid nitrogen controller system for low-temperature operation.

The test samples were prepared by casting a film of the material, having a thickness in the range of 0.02 mm to 0.4 mm, on a glass plate. The sample film was cured using a UV processor. A specimen approximately 35 mm (1.4 inches) long and approximately 12 mm wide was cut from a defect-free region of the cured film. For soft films, which tend to have sticky surfaces, a cotton-tipped applicator was used to coat the cut specimen with talc powder.

The film thickness of the specimen was measured at five or more locations along the length. The average film thickness was calculated to ±0.001 mm. The thickness cannot vary by more than 0.01 mm over this length. Another specimen was taken if this condition was not met. The width of the specimen was measured at two or more locations and the average value calculated to ±0.1 mm.

The geometry of the sample was entered into the instrument. The length field was set at a value of 23.2 mm and the measured values of width and thickness of the sample specimen were entered into the appropriate fields.

Before conducting the temperature sweep, moisture was removed from the test samples by subjecting the test samples to a temperature of 80 C. in a nitrogen atmosphere for 5 minutes. The temperature sweep used included cooling the test samples to about −60 C. or about −80 C. and increasing the temperature at about 1/minute until the temperature reached about 60 C. to about 70 C. The test frequency used was 1.0 radian/second.

Soluble Wax

Wax can be added as a slip agent to adjust the fiber friction between the inner primary coating and the surface of the optical glass fiber to a value that results in a resistive force that is less than the cohesive strength of the inner primary coating. However, conventional waxes exhibit incompatibility problems with inner primary coatings. Many waxes do not dissolve well in inner primary coatings and therefore they tend to separate out from solution. Furthermore, conventional waxes tend to cause the resulting inner primary coating to be hazy in appearance, which is undesirable. The term "soluble wax" is used herein to designate those waxes which are sufficiently soluble in the inner primary coating composition at the concentration required to provide the desired level of fiber friction. The term "wax" is understood to include waxes as defined in Hawley's "Condensed Chemical Dictionary", 11th edition, the said definition being incorporated herein by reference.

It has been found that by selecting modified waxes or by modifying the waxes, the incompatibility problems can be substantially avoided. In selecting a modified wax, the solubility of the modified wax in the desired inner primary composition should first be considered. Usually, waxes tend to be insoluble in inner primary coating compositions. The solubility of the wax in the inner primary coating will depend mainly upon the following:

(1) the relative polarity of the wax and the polarity of the monomers and oligomers present in the inner primary composition,
(2) the respective types of functional groups present in the wax and the monomers and oligomers present in the inner primary composition, and
(3) the similarity between the molecular structure of the wax and the oligomers or monomers present in the inner primary composition, such as aliphatic/aromatic, unsaturated/saturated, linear/branched, etc., entities.

For example, the solubility of the wax can be increased by incorporating functional groups which are similar to those present in the oligomers or monomers present in the inner primary composition. If the inner primary composition contains monomers or oligomers having ester groups, then ester groups can be incorporated into the molecular backbone structure of the wax or the ester groups can be grafted onto the backbone of the wax. Alternatively, wax-like, long-chain fatty esters can be used. Commercial examples of suitable fatty esters include:

Laneto-50 and 100 (PEG-75 lanolin),
Laneto-AWS (PPG-12-PEG-50 lanolin),
Ritacetyl (acetylated lanolin),
Ritahydrox (hydroxylated lanolin),
Ritasol (isopropyl lanolate),
Ritalan (lanolin oil),
Ritalan AWS (PPG-12-PEG-65-lanolin oil),
Ritawax (lanolin alcohol),
Supersat (hydrogenated lanolin),
Forlan C-24 (choleth-24 and Ceteth-24),
Ritachol 1000 (cetearyl alcohol, polysorbate 60, PEG-150-stearate, and steareth-20),
Ritapro 100 (cetearyl alcohol, steareth-20, and steareth-10),
Pationic ISL (sodium isostearoyl lactylate),
Pationic CSL (calcium stearoyl lactylate),
Pationic SSL (sodium stearoyl lactylate),
Pationic SBL (sodium behenoyl lactylate),
Pationic 138C (sodium lauroyl lactylate),
Pationic 122A (sodium caproyl lactylate),
Pationic SCL (sodium cocoyl lactylate),
Ritox 36 (laureth-23),
Ritox 52 (PEG-40 stearate),
Rita CA (cetyl alcohol),
Rita SA (stearyl alcohol), and
Rita Cetearyl Alcohol 70/30, (RITA Corp.). Preferably, the fatty ester modified wax is isocetyl stearate.

If the inner primary composition contains monomers or oligomers having alkoxy or hydroxy groups, then to increase the solubility of the wax, alkoxy or hydroxy groups can be incorporated into the molecular backbone structure of the wax or the alkoxy groups can be grafted onto the backbone of the wax. Commercial examples of such modified waxes include the Unilin™ series of alcohol modified waxes from Petrolite, and Ritawax (lanolin alcohol), Ritachol 1000 (cetearyl alcohol, polysorbate 60, PEG-150-stearate, and steareth-20),
Ritapro 100 (cetearyl alcohol, steareth-20, and steareth-10),
Rita CA (cetyl alcohol),
Rita SA (stearyl alcohol), and
Rita Cetearyl Alcohol 70/30, (RITA Corp.). Preferably, the alkoxy modified wax is polypropyleneglycol$_{12}$polyethyleneglycol$_{50}$lanolin.

As another example, if the inner primary composition contains monomers or oligomers having amine groups, then to increase the solubility of the wax, amine groups can be incorporated into the molecular backbone structure of the wax or the amine groups can be grafted onto the backbone of the wax. An example of such a modified wax is the Armeen™ series of amine modified waxes (Armak), such as Armeen TD (tallowamine),
Armeen O, OL or OD (oleylamines),
Armeen SD (soyaamine),
Armeen 18 (octadecylamine),
Armeen HT, HTD or 2HT (hydrogenated tallow),
Armeen T or TM-97 (tallowamine),
Armeen 12D (dodecylamine),
Armeen C or CD (cocoamine), Armeen 16D (hexadecylamine),
Armeen 2C (dicocoamine),
Armeen M2C (methyldicocoamine),
Armeen DM12D (dimethyldodecylamine),
Armeen DMCD or DMMCD (dimethylcocoamine),
Armeen DM14D (dimethyltetradecylamine),
Armeen DM16D (dimehylhexadecylamine),
Armeen DM18D (dimethyloctadecylamine),
Armeen DMHTD (dimethyl(hydrogenatedtallow)amine,
Armeen DMTD (dimethyltallow amine),
Armeen DMSD (dimethylsoyamine) or
Armeen DMOD (dimethyltallow amine). Preferably, the amine substituted wax is methyl di(hydrogenated tallow) amine.

An example of a further functional group that can be incorporated into the wax includes carboxylic acids. Suitable examples of saturated modified waxes include capric acid, lauric acid, myristic acid, palmitic acid, and stearic acid. Examples of suitable unsaturated waxes include oleic acid, ricinoleic acid, linoleic acid, and linolenic acid.

The functional groups present on the modified wax do not necessarily have to be identical with those present in the oligomers or monomers of the inner primary coating composition in order to achieve increased solubility. Functional groups having similar properties, such as hydrogen bonding, polarity, etc., can be mixed and matched as desired to increase solubility.

The solubility of the wax can also be increased by modifying a wax or selecting a wax having a similar molecular structure to that of the monomers and oligomers present in the inner primary composition. For example, if the monomers and oligomers contain aromatic groups, the wax can be selected or modified to contain aromatic groups. If the monomers or oligomers contain substantial amounts of unsaturation, then the wax can be modified or selected to contain substantial amounts of unsaturation. Furthermore, if the monomers or oligomers are substantially linear, then a substantially linear wax can utilized. Commercial examples of substantially linear waxes include Polymekon, Ceramer 67 and 1608, and Petrolite C-400, CA-11, WB-5, WB-11, and WB-17 (Petrolite).

Based on the teachings provided herein, one skilled in the art will be able to modify or select the desired wax, and to use the selected wax in an amount to provide the desired level of fiber friction between the inner primary coating and the surface of the optical glass fiber. The amount of the wax present in the inner primary composition will depend on (1) the ability of the wax to impart the desired reduction in the fiber friction between the inner primary coating and the surface of the optical glass fiber, and (2) the solubility of the wax in the inner primary composition. The greater the solubility of the wax in the inner primary composition, the greater the amount of wax that can be present. The greater the ability of the wax to reduce fiber friction, the less wax that will be required. Preferably, the amount of wax present is about the minimum amount necessary to provide a level of fiber friction necessary to result in a resistive force that provides a clean, residue free optical glass fiber after ribbon stripping. As discussed above, the fiber friction level that results a resistive force level which will provide a clean, optical glass fiber after ribbon stripping depends on the cohesive strength of the inner primary coating. The greater the cohesive strength of the inner primary coating, the greater the amount of resistive force that can be tolerated and still provide a clean, bare optical glass fiber after ribbon stripping. The amount of wax necessary to provide a fiber friction that results in such a level of resistive force can be readily determined by one skilled in the art by making test samples of ribbon assemblies having different concentrations of the selected wax in the inner primary coating. The amount of wax required should be determined using complete ribbon structures because, as discussed hereinabove, the presence of the outer primary coating will have an effect on the strippability of the inner primary coating.

Suitable amounts of wax can also be closely approximated by using the fiber pull-out friction and crack propagation test methods described herein, in which the amounts of wax that provide a predicted strip cleanliness of less than about 3 are preferred.

It has been found that suitable amounts of modified wax include from about 0.01% to about 10% by weight of the total inner primary composition, more preferably about 0.01% to about 5%, and most preferably about 0.01% to about 2%.

If desired, the wax can be further modified to include a radiation-curable functional group that can copolymerize with radiation-curable monomers and oligomers present in the inner primary composition. An example of such a radiation-curable functional wax is stearyl acrylate. The radiation-curable functional group in general does not have to be an acrylate group, but can be any known radiation-curable functional group, including those described herein.

The invention will be further explained by the following non-limiting examples illustrating the use of waxes.

Examples 3-1 through 3-4

The components shown in Table 6 were combined to form four inner primary coating compositions. Drawdowns of the inner primary coating compositions were made and then cured by exposure to UV light from a Fusion D lamp, under a nitrogen atmosphere. The crack propagation and fiber friction for each of the films were tested in the same manner as above, and the predicted strip cleanliness was calculated. The results are shown in Table 6.

TABLE 6

|  | Example 3-1 | Example 3-2 | Example 3-3 | Example 3-4 |
|---|---|---|---|---|
| COMPONENT (Amount in % by weight of total composition) | | | | |
| Linear Urethane Acrylate Oligomer Having a Weight Average Molecular Weight of 5000, | 23 | — | — | — |
| Urethane Acrylate Oligomer H-I-PTGL2000-I-PTGL2000-I-H | — | 51.9 | 42.3 | 42.3 |
| Lauryl Acrylate | — | 16 | — | — |

TABLE 6-continued

|  | Example 3-1 | Example 3-2 | Example 3-3 | Example 3-4 |
|---|---|---|---|---|
| Ethoxylated Nonylphenol Acrylate | 64.4 | 25.6 | 46.2 | 46.2 |
| Glyceryl Propoxy Triacrylate | 8 | — | — | — |
| Phenoxyethyl Acrylate | — | — | 5 | 5 |
| 2,4,6,-Trimethyl PhenylbenzoylDiphenyl Phosphine Oxide | 3 | 3 | 3 | 3 |
| Thiodiethylene bis (3,5-di-tert-butyl-4-hydroxy) hydrocinnamate | .5 | 0.5 | 0.5 | 0.5 |
| Polyethylene/maleic anhydride copolymer wax (ceramer 1608) | .1 | — | — | — |
| Methyl di (hydrogenated tallow) Amine | — | 2 | — | — |
| Isocetyl Stearate | — | — | 2 | — |
| PPG$_{12}$PEG$_{50}$ Lanolin | — | — | — | 2 |
| Mercaptopropyl Trimethoxy Silane | 1 | 1 | 1 | 1 |
| Test results |  |  |  |  |
| Clarity | Clear | Clear | Clear | Clear |
| Viscosity (mPa.s, 25 C.) |  | 7650 | 6760 | 7390 |
| Fiber Friction (g/mm) |  | 7.7 | 11.4 | 7.2 |
| Crack Propagation (mm) |  | 1.53 | 1.56 | 1.69 |
| Predicted Strip Cleanliness |  | 2.1 | 2.5 | 1.9 |
| Fiber Pull-out Residue Test | 2.3 |  |  |  |

The oligomers were formed by reacting the following components:
H = Hydroxyethyl Acrylate
I = Isophorone Diisocyanate
PTGL2000 = 2000 molecular weight polymethyltetrahydrofurfuryl/polytetrahydrofurfuryl copolymer diol (Mitsui, NY), the methyl group provides branching which reduces the orientation of the polymers formed from the oligomer The fiber pull-out residue test was the same test as used previously except that the evaluation was quantified on a scale of 0 to 10, where 0 is the best (no visible residue under 10×magnification) and 10 is the worst (lots of visible residue without use of magnification).

The test results in Table 6 demonstrate that modified waxes can be used to adjust the fiber friction to a level that provides a resistive force less than the cohesive strength of the inner primary coating, which is shown by the excellent predicted strip cleanliness values of less than about 3.

Radiation-curable, Silicone Containing Oligomers and Use of Non-radiation-curable Silicone Compounds Radiation-curable, silicone containing monomers and oligomers can also be used to adjust the level of fiber friction and thereby improve ribbon strippability of the inner primary coating. The radiation-curable, silicone oligomer comprises a silicone compound to which at least one radiation-curable functional group is bound. Preferably, two or more radiation-curable functional groups are connected to the silicone entity.

Preferably the radiation-curable functional group is capable of copolymerizing with the radiation-curable monomers and oligomers present in the inner primary composition when exposed to suitable radiation. Therefore, the selection of the functional group will depend on the monomer or oligomer present in the inner primary composition. One skilled in the art will readily be able to determine which functional groups will cross-link with the monomer or oligomer present in the inner primary composition. While not being limited thereto, examples of suitable functional groups are groups containing vinyl, acrylate, methacrylate, maleate, vinyl ether, or acrylamides, as well as those described herein above.

Examples of commercially available silicone compounds containing a radiation-curable functional group are silicone acrylates Ebecryl 350 and Ebecryl 1360 (Radcure Industries), Tego Rad 2100, 2200, 2500, and 2600 (Tego Chemie), and Coat-O-Sil 3503 (OSI Specialties).

Alternatively, based on the teachings herein, one skilled in the art will be able to modify known silicone compounds to include the required radiation-curable functionality. For example, a silicone compound provided with hydroxy functionality can be reacted with a diisocyanate compound and a compound containing a hydroxy and a radiation-curable functionality to provide a radiation-curable functionality to said silicone compound. Specific examples include reacting a silicone compound containing a hydroxy functionality with a diisocyanate and hydroxyethylacrylate to provide an acrylate functionality on the silicone compound, or isocyanate and hydroxybutylvinylether to provide a vinyl ether functionality on the silicone compound. Example of suitable silicone compound containing hydroxyl functionality include: polydimethylsiloxane diol of 1200 equivalent weight Q4-3667, DC 193 and DC 1248 (Dow Corning), HSi2111 (Tego Chemie), and Coat-O-Sil 3500 and 3505 (Osi Specialties).

Alternatively, non-radiation-curable silicone compounds (hereinafter referred to as "non-reactive silicone") can be used to adjust the fiber friction and thereby improve ribbon strippability of the inner primary coating.

U.S. Pat. No. 4,496,210, which is incorporated herein by reference, discloses examples of suitable non-reactive silicones that can be used. Non-reactive silicones can be used separately or in conjunction with the radiation-curable silicone oligomers described herein.

The radiation-curable silicone oligomer and/or non-reactive silicone should be present in an amount to provide a fiber friction that results in a resistive force that is less than the cohesive strength of the inner primary composition. The amount of radiation-curable silicone oligomer and/or non-reactive silicone is preferably the minimum amount required to provide a fiber friction that results in a resistive force less than the cohesive strength of the inner primary composition. Such minimum amount can easily be determined by making test runs of inner primary compositions in which the amount of radiation-curable silicone oligomers and/or non-reactive silicones present is varied. The lowest amount of radiation-curable silicone oligomers and/or non-reactive silicones present which provides a fiber friction that results in a resistive force that is less than the cohesive strength of the inner primary coating is the preferred amount.

A long chain silicone compound containing on average about one radiation-curable functional group (monofunctional) bound near a terminus of the silicone compound can provide further advantages. The end of the long silicone chain furthest from the radiation-curable functional group can be mechanically bound in the inner primary coating. However, upon heating during ribbon stripping, it is believed that the end of the long silicone chain farthest from the radiation-curable functional group can become unbound and diffuse toward the optical glass fiber/inner primary coating interface which is in the direction the heat is propagating. This diffusion of silicone increases at the critical moment during ribbon stripping to facilitate the clean removal of the entire coating system. The silicone acts as a lubricant between the surface of the optical glass fiber and the inner primary coating.

The thickness of an inner primary coating usually varies from about 10 microns to about 35 microns. Thus, a monofunctionalized silicone fluid having a molecular chain length of about 50,000 to about 350,000 Daltons can diffuse toward the glass/inner primary coating interface during ribbon stripping.

Suitable amounts of radiation-curable silicone oligomers and/or non-reactive silicones can also be closely approximated by using the friction and crack propagation test methods described herein, in which the amounts of radiation-curable silicone oligomers and/or non-reactive silicones that provide a predicted strip cleanliness of less than about 3 are preferred.

The amount of radiation-curable silicone oligomer and/or non-reactive silicones will also depend on the selection of the inner primary composition, in particular the initial fiber friction of the selected inner primary coating composition. Generally, the higher the initial fiber friction (no slip additive), the greater the amount of radiation-curable silicone oligomer and/or non-reactive silicone that will be required to lower the fiber friction to a level that provides a resistive force lower than the cohesive strength of the inner primary coating.

In general, the radiation-curable silicone oligomers can be used in greater amounts than non-reactive silicones because it is believed that the radiation-curable silicone oligomer will become bound in the inner primary coating during curing, whereas the non-reactive silicone is free to migrate throughout the cured inner primary coating. Alternatively, the radiation-curable silicone oligomer can be the main oligomer used for forming the inner primary coating. It has been found that suitable amounts of radiation-curable silicone oligomer are between about 0.1 to about 90% by weight, preferably about 0.1 to about 60% by weight, and more preferably about 0.1 to about 30% by weight. In general, higher molecular weight radiation-curable silicone oligomers will be present in a radiation-curable coating in greater weight percentages than lower molecular weight composite oligomers.

Suitable amounts of mono-functionalized monomers have been found to be about 0.1 to about 20% by weight, more preferably about 0.1 to about 10% by weight, and most preferably about 0.1 to about 5%.by weight.

Suitable amounts of non-reactive silicone are between about 0.01 to about 10% by weight, preferably about 0.01 to about 5% by weight, and more preferably about 0.01 to about 1% by weight.

The invention will be further explained by the following non-limiting examples illustrating the use of silicone entities.

EXAMPLE 4-1

The components shown in Table 7 were combined to form an inner primary coating composition. A film of the coating material (75 micron thick) was prepared on glass slides and then cured by exposure to UV light in the same manner as above. The tensile strength, elongation and modulus were measured.

A 75 micron film of the coating material was also prepared and suitably cured. The crack propagation was then measured. A friction test was also conducted, as described herein. The predicted ribbon strip cleanliness was calculated. The results are shown in Table 7.

TABLE 7

|  | Example 4-1 |
|---|---|
| Component (Amount is % by weight of total composition) | |
| Oligomer H-DesW-PTHF2900-DesW-H | 47.5 |
| Ethoxylated Nonylphenol Acrylate | 29 |
| Lauryl Acrylate | 14.2 |
| 2,4,6-Trimethyl Phenylbenzoyl Diphenyl Phosphine Oxide | 3 |
| Silicone Oligomer H-I-HSi2111-I-H | 5 |
| y-Mercaptopropyltrimethoxy Silane | .8 |
| Thiodiethylene Bis (3,5-di-tert-Butyl-4-Hydoxy) Hydocinnamate | .5 |
| Test Results | |
| Viscosity, mPa.s (25 C.) | 6040 |
| Tensile Strength, Mpa | 1 |
| Elongation, % | 140 |
| Modulus, Mpa | 1.4 |
| Dose at 95%, Modulus, J/Sq CM | .38 |
| Crack Propagation (mm) | 1.7 |
| Fiber Pull-Out Friction (g/mm) | 17.1 |
| Predicted Strip Cleanliness | 2.5–3 |

The oligomers were formed by reacting the following components:
H = Hydroxyethyl Acrylate
DesW = bis 4,4-(isocyanatocyclohexyl)methane
I = Isophorone Diisocyanate
PTHF2900 = 2900 molecular weight Polytetramethylene Ether (BASF)
HSi2111 = a silicone diol having a MW of 1000 (Tego Chemie)

EXAMPLES 4-2 THROUGH 4-10

The components shown in Table 8 were combined to form 11 different inner primary coating compositions. The viscosity and clarity of the compositions was determined.

Films of the coating materials (75 micron thick) were prepared on microscope slides and then cured by exposure to UV light in the same manner as above. The tensile strength, elongation and modulus were measured.

Additional films of the coating materials were also prepared and suitably cured. The crack propagation was then measured. A friction test was also conducted, as described herein. The predicted ribbon strip cleanliness was calculated. The results are shown in Table 8.

TABLE 8

| Component (Amount is % by weight of total composition) | Ex. 4-2 | Ex. 4-3 | Ex. 4-4 | Ex. 4-5 | Ex. 4-6 | Ex. 4-7 | Ex. 4-8 | Ex. 4-9 | Ex. 4-10 |
|---|---|---|---|---|---|---|---|---|---|
| Oligomer H-I-PTHFCD2000-I-PTHFCD2000-I-H | 45.67 | | | | | | | | |
| Oligomer H-(I-PPG1025) 1.06-(-PERM) 1.14-I-H | | 54.86 | | | | | | | |
| Oligomer H-I-PTGL2000-I-H | | | | | 60.65 | | | | |
| Oligomer H-I-PTG2010-I-PPG2010-I-H | | | 67.5 | 70 | | | | | |
| Oligomer H-I-PTGL2000-I-PTGL2000-I-H | | | | | | 51.02 | 49.23 | | 43 |
| Oligomer (H-I)$_3$-TPE4542 | | | | | | | | 78 | |
| Ethoxylated Nonylphenol Acrylate Ester | 34.48 | | 24.99 | | 32.85 | 20.14 | 24.75 | 16 | 50.5 |
| Lauryl Acrylate | 14.35 | | 13.72 | | | 6.92 | 16.64 | | |
| Isodecyl Acrylate | | | | | | | | | |
| Phenoxyethyl Acrylate | | | | | | 16.62 | | | |
| 2.5 Mole Propoxylated Nonyl Phenol Acrylate | | 25.00 | | 23.5 | | | | | |
| 25:75 weight/weight of Bis (2,6-Dimethoxybenzoyl) (2,4,4-Trimethylpentyl) Phosphine Oxide and 2-Hydroxy-2-Methyl-1-Phenyl Propanone | | | 2.94 | 3 | | | | | |
| 2,4,6-trimethylbenzoyl Diphenyl Phosphine Oxide | 3 | | | | 2.5 | 3 | 3 | 1 | 3 |
| 1-Hydroxycyclohexyl Phenyl Ketone | | 4 | | | | | | 2 | |
| Octadecyl 3,5-Bis (1,1-Dimethylethyl)-4-Hyroxybenzenepropanone | .5 | .5 | | | | | | | |
| Thiodiethylene bis (3,5-di-Tert-Butyl-4-Hydroxy) hydrocinnamate | | | .49 | | .5 | .3 | | | .5 |
| Ditridecylthiodipropionate | | 1 | | 1 | | | | | |
| Free Silicone, DC-193 (Dow Corning) | | 1 | 2 | 1 | | | | 2 | 2 |
| Free Silicone, DC-190 (Dow Corning) | 1 | | | | | | | | |
| Teograd 2100 silicone acrylate | | | | | 2.5 | 1 | 5 | | |
| L-77 Polyethylene oxide modified Dimethylsiloxane | | | | | | | | | |
| 1-Propanethiol,3-(Trimethoxysilyl) | 1 | 1 | .98 | 1 | 1 | 1 | .92 | 1 | 1 |
| Clarity When Made | clear | clear | clear | clear | | | | clear | |
| Clarity After 24 Hours at 4 C. | clear | | clear | clear | | | | | |
| Clarity After 24 Hours at −20 C. | clear | | clear | clear | | | | | |
| Clarity After 3 Days at 60 C. | clear | | clear | clear | | | | | |
| Viscosity (mPa · s, 25 C.) | 8700 | | 5600 | 8000 | 9520 | 7170 | 6240 | 8200 | |
| Dose @ 95% Modulus (J/sq. cm) | .77 | .46 | .45 | .32 | .36 | .45 | | .2 | |
| Tensile Strength (MPa) | | .4 | | | 1.5 | .6 | 1.1 | | |
| Elongation (%) | | 50 | | | 100 | 140 | 180 | | |
| Modulus (Mpa) | | 1.2 | | | 2.7 | 1.1 | 1.3 | 2.4 | |
| Fiber Friction (g/mm) | 3.1 | 4.9 | 2.7 | 4.4 | 21 | 18.4 | 18.5 | 3 | 3.4 |
| Fiber Friction (g/mm) After 7 days, 60 C., dose 95% of dose required for complete cure | | | 1 | 1.4 | | | | | |

TABLE 8-continued

|  | Ex. 4-2 | Ex. 4-3 | Ex. 4-4 | Ex. 4-5 | Ex. 4-6 | Ex. 4-7 | Ex. 4-8 | Ex. 4-9 | Ex. 4-10 |
|---|---|---|---|---|---|---|---|---|---|
| Crack Propagation (mm) | 2.1 | 1.49 | 1 | 1.4 | 1.21 | 1.82 | 1.47 | 1.1 | 1.9 |
| Crack propagation (mm) after 7 days, 60 C., dose 95 of dose required for complete cure |  |  | 1.1 |  |  |  |  |  |  |
| Predicted Strip Cleanliness | 1.5–2 | 1.5 | 2.2 | 1.5 | 3.6 | 3 | 3 | 1.5 | 1.5 |

The oligomers were formed by reacting the following components:
H = Hydroxyethyl Acrylate
I = Isophorone Diisocyanate
PTHFCD2000 = is PolyTHF containing some carbonate linkages
PPG1025 = is Polypropyleneoxidediol having an average molecular weight of 1000 (Arco)
PPG2010 = is Polypropyleneoxidediol having an average molucular weight of 2000 (BASF)
PTGL2000 = 2000 molecular weight polymethyltetrahydrofurfuryl/polytetrahydrofurfuryl copolymer diol (Mitusi, NY)
TPE4542 = polypropylene glycol ethylene oxide endcapped triol (BASF)
Perm = Permanol KM10-1733 polycarbonate/polyether copolymer diol The test results in Table 8 demonstrate that the radiation-curable silicone oligomers and non-reactive silicones can be used to adjust the fiber friction to a level that provides a resistive force less than the cohesive strength of the inner primary coating, which is shown by the predicted strip cleanliness values of about 3 or less.

Radiation-curable Fluorinated Oligomers and Fluorinated Materials

The fiber friction between the inner primary coating and the surface of the optical glass fiber can also be significantly reduced by incorporating radiation-curable fluorinated oligomers, monomers and/or non-radiation curable fluorinated materials into the inner primary coating composition. The radiation-curable, fluorinated oligomer or monomer comprises a fluorinated compound to which at least one radiation-curable functional group is bound. Preferably, two or more radiation-curable functional groups are connected to the fluorinated entity.

Preferably the radiation-curable functional group is capable of copolymerizing with the radiation-curable monomers and oligomers present in the inner primary composition when exposed to suitable radiation. Therefore, the selection of the functional group will depend on the monomer or oligomer present in the inner primary composition. One skilled in the art will easily be able to determine which functional groups will cross-link with the monomer or oligomer present in the inner primary composition. While not being limited thereto, examples of suitable radiation-curable functional groups are groups containing vinyl, acrylate, methacrylate, maleate, vinyl ether, or acrylamides, as well as those described herein above.

Examples of commercially available fluorinated compounds containing at least one radiation-curable functional group include
perfluoro ethyl acrylate (DuPont), 2-(N-Ethylperfluoro Octane Sulfonamido) Ethyl Acrylate (3M), 1H, 1H-pentadecafluoroctyl acrylate (Oakwood Research Chemicals), as well as methacrylate or N butyl acrylate versions of these.

Based on the teachings herein, one skilled in the art will be able to modify a fluorinated compound to include the required radiation-curable functionality. For example, a fluorinated compound provided with hydroxy functionality can be reacted with a diisocyanate compound and a compound containing a hydroxy and a radiation-curable functionality to provide a radiation-curable functionality to said fluorinated compound. Specific examples include reacting a fluorinated compound containing a hydroxy functionality with a diisocyanate and hydroxyethylacrylate to provide an acrylate functionality on the fluorinated compound, or isocyanate and hydroxybutylvinylether to provide a vinyl ether functionality on the fluorinated compound. Examples of suitable fluorinated compounds containing hydroxyl functionality include Fluorolink E (Ausimont), 2-methyl-4,4,4-trifluorobutanol, 1H,1H-pentadecafluoro-1-octanol, 1H,1H-pentafluoropropanol-1, and 1H,1H,12H,12H-perfluoro-1,12-dodecanediol (Oakwood Research Chemicals).

Alternatively, non-radiation-curable fluorinated compounds (hereinafter referred to simply as "fluorinated compounds") can be used to adjust the fiber friction and thereby improve ribbon strippability of the inner primary.

The fluorinated compounds can be used separately or in conjunction with the radiation-curable silicone oligomers or monomers described herein.

The radiation-curable fluorinated oligomer or monomer and/or fluorinated compounds should be present in an amount to provide a fiber friction that results in a resistive force that is less than the cohesive strength of the inner primary composition. The amount of radiation-curable fluorinated oligomer and/or fluorinated compound is preferably the minimum amount required to provide a fiber friction that results in a resistive force less than the cohesive strength of the inner primary composition. Such minimum amount can easily be determined by making test runs of inner primary compositions in which the amount of radiation-curable fluorinated oligomers or monomers and/or fluorinated present is varied. The lowest amount of radiation-curable fluorinated oligomers or monomers and/or fluorinated compounds present which provides a fiber friction that results in a resistive force less than the cohesive strength of the inner primary coating is the preferred amount.

Suitable amounts of radiation-curable fluorinated oligomers or monomers and/or fluorinated compounds can also be closely approximated by using the friction and crack propagation test methods described herein, in which the amounts of radiation-curable fluorinated oligomers or monomers and/or fluorinated compounds that provide a predicted strip cleanliness of less than about 3 are preferred.

The amount of radiation-curable fluorinated oligomer or monomers and/or fluorinated compounds will also depend on the selection of the inner primary composition, in particular the initial fiber friction of the selected inner primary coating composition. Generally, the higher the initial fiber friction (no slip additive), the greater the amount of radiation-curable fluorinated oligomer or monomer and/or fluorinated compounds that will be required to lower the fiber friction to a level that provides a resistive force lower than the cohesive strength of the inner primary coating.

In general, the radiation-curable fluorinated oligomers or monomers can be used in greater amounts than non-reactive fluorinated compounds because it is believed that the radiation-curable fluorinated oligomers or monomers will become bound in the inner primary coating during curing, whereas the non-reactive fluorinated compounds are free to migrate throughout the cured inner primary coating. Alternatively, the radiation-curable fluorinated oligomer or monomer can be the main oligomer used for forming the inner primary coating. It has been found that suitable amounts of radiation-curable fluorinated oligomer or monomer are between about 0.1 to about 90% by weight, preferably about 0.1 to about 60% by weight, and more preferably about 0.1 to about 30% by weight. In general, larger molecular weight oligomers can be used in greater amounts than lower molecular weight oligomers or monomers.

Suitable amounts of fluorinated compounds have been found to be between about 0.01 to about 10% by weight, preferably about 0.01 to about 5% by weight, and more preferably about 0.01 to about 1% by weight.

The invention will be further explained by the following non-limiting examples illustrating the use of fluorinated materials.

EXAMPLES 5-1 THROUGH 5-3

The components shown in Table 9 were combined to form 5 different inner primary coating compositions. The viscosity and clarity of the compositions were determined.

Films of the coating materials (75 micron thick) were prepared on glass slides and then cured by exposure to UV light in the same manner as above. The tensile strength, elongation and modulus were measured.

Additional films of the coating materials were also prepared and suitably cured. The crack propagation was then measured. A friction test was also conducted, as described herein. The predicted ribbon strip cleanliness was calculated. The results are shown in Table 9.

TABLE 9

| | Ex. 5-1 | Ex. 5-2 | Ex. 5-3 |
|---|---|---|---|
| Component (% by weight based on total composition) | | | |
| Oligomer H-(I-PPG1025)$_{1.06}$-(-PERM)$_{1.14}$-I-H | 54.32 | | 55.58 |
| Oligomer H-(I-PPG2010)$_2$-I-H | | 67.75 | |
| Ethoxylated Nonylphenol Acrylate Ester | 24.74 | | 25.31 |
| Isodecyl Acrylate | 13.58 | | 13.9 |
| 2.5 Mole Propoxylated Nonyl Phenol Acrylate | | 25 | |
| 25:75 weight/weight of Bis(2,6-Dimethoxybenzoyl) (2,4,4-Trimethylpentyl) Phosphine Oxide and 2-Hydroxy-2-Methyl-1-Phenyl Propanone | 2.91 | | 3 |
| 1-Hydroxycyclohexyl Phenyl Ketone - | 4 | | |
| Octadecyl 3,5-Bis(1,1-Dimethylethyl) -4-HyroxybenzeneprOpanofle | | 0.50 | |
| Thiodiethylene bis(3,5-di-tert-butyl-4-hydroxy) Hydrocinnainate | .48 | | .5 |
| Ditridecyithiodipropicnate | | 1.00 | |

TABLE 9-continued

| | Ex. 5-1 | Ex. 5-2 | Ex. 5-3 |
|---|---|---|---|
| Foralkyl EM-6 | 3.00 | | |
| Tridecafluorooctyl Mecaptan (Elf Autochem) | | | |
| Fluorosulfonamide (3M) | | 0.75 | .75 |
| mercaptopropyl trimethoxy silane | 0.97 | 1 | 1 |
| Clarity as made | Clear | Clear | Clear |
| Clarity after 24 hours at 4° C. | | | Clear |
| Clarity after 24 hours at -20° C. | | | Clear |
| Clarity after 3 days at 60° C. | | | Very Few Incom pat's |
| Viscosity (mPa.s, 25 C.) | | | 6200 |
| Dose @ 95% Modulus (J/sq.cm) | .77 | 0.50 | .47 |
| Tensile Strength (MPa) | | 0.50 | |
| Elongation (%) | | 88 | |
| Modulus (MPa) | | 1.20 | |
| Fiber Friction (g/mm) | 25.5 | 8.2 | 10.5 |
| Fiber Friction (g/mm) After 7 days, 60 C., at dose of 95% of dose for complete cure | | | 1.1 |
| Crack Propagation (mm) | 1.32 | 1.54 | 1.1 |
| Crack Propagation (mm) after 7 days, 60 C., at dose of 95% of dose for complete cure | | | 1 |
| Predicted Strip Cleanliness | 3.0 | 2.0 | 2.6 |

Table Notes:
The oligomers were formed by reacting the following components:
H = Hydroxyethyl Acrylate; I = Isophorone Diisocyanate
PP1025 = is Polypropyleneoxidediol having an average molecular weight of 1000 (Arco)
PPG2010 = is Polypropylenediol having an average molecular weight of 2000 (BASF)
PTGL2000 = 2000 molecular weight polymethyltetrahydrofurfuryl/polytetrahydrofurfuryl copolymer diol (Mitsui, NY)
Perm = Permanol KM10-1733 polycarbonate/polyether copolymer diol Solid Lubricants Surprisingly, it has been found that solid lubricants can be added to the inner primary composition to reduce the fiber friction between the inner primary coating and the surface of the optical glass fiber. The term "solid lubricant" is used herein to mean that the lubricant is substantially insoluble in the inner primary composition and that the particle or flake shape of the solid lubricant is substantially maintained after curing of the inner primary coating composition.

Usually the solid lubricant is non-reactive with the components of inner primary coating composition. Examples of suitable non-reactive solid lubricants are the following, but not limited thereto:

solid organic lubricants including organic polysaccharides such as sodium alginate, polyolefins, polyvinyl alcohol, nylon such as Orgasol (Elf Atochem), solid Teflon particles, and hard waxes such as Rad Wax; solid inorganic lubricants including molybdenum disulfide, graphite, silicates such as talc, clays such as kaolin and mica, silica, and boron nitride.

However, if desired, a reactive solid lubricant can be used. Reactive solid lubricants contain a radiation-curable functional group. Preferably, the radiation-curable functional group is capable of copolymerizing with the radiation-curable monomers or oligomers present in the inner primary composition. The radiation-curable functional group can be, for example, any of the radiation-curable functional groups described herein. Specific examples of suitable reactive solid lubricants include zinc acrylate, molybdenum acrylate, aluminum acrylate, barium acrylate, and chromium acrylate.

The particle size is preferably small enough to avoid microbending caused by the solid particles exerting stresses on the surface of the optical glass fiber during use. Furthermore, the particle size is preferably small enough to avoid causing the inner primary coating to be hazy in appearance. Examples of suitable particle sizes have been found to be about 10 microns or less, preferably about 5 microns or less, and most preferably less than about 2 microns.

Alternatively to the particle size, the hardness of the solid lubricant is preferably low enough to avoid microbending caused by the solid particles exerting stresses on the surface of the optical glass fiber during use. In general, a softer solid lubricant will be less likely to cause such microbending.

Based on the teachings provided herein, one skilled in the art will easily be able to use the selected solid lubricant in an amount to provide the desired level of fiber friction between the inner primary coating and the surface of the optical glass fiber. The amount of the solid lubricant present in the inner primary composition will depend on the ability of the solid lubricant to impart the desired reduction in the fiber friction between the inner primary coating and the surface of the optical glass fiber, and the amount the fiber friction must be reduced to provide a fiber friction level that results in a resistive force less than the cohesive strength of the inner primary coating. In general, the greater the ability of the solid lubricant to reduce fiber friction, the less solid lubricant that will be required. Preferably, the amount of solid lubricant present is about the minimum amount necessary to provide a level of fiber friction necessary to provide a clean, residue free optical glass fiber after ribbon stripping. As discussed above, the fiber friction level that will provide a clean, optical glass fiber after ribbon stripping will depend on the cohesive strength of the inner primary coating. The greater the cohesive strength of the inner primary coating, the greater the amount of fiber friction, and resulting resistive force, that can be tolerated and still provide a clean, bare optical glass fiber after ribbon stripping. The amount of solid lubricant necessary to provide such a level of fiber friction can be easily determined by one skilled in the art by making test samples of ribbon assemblies having different concentrations of the selected solid lubricant in the inner primary coating. The amount of solid lubricant required should be determined using complete ribbon structures because, as discuss herein above, the presence of the outer primary coating will have an effect on the strippability of the inner primary coating.

Suitable amounts of solid lubricant can also be closely approximated by using the fiber pull-out friction and crack propagation test methods described herein, in which the amounts of solid lubricant that provides a predicted strip cleanliness of less than about 3 are preferred.

It has been found that suitable amounts of solid lubricant include from about 0.1% to about 20% by weight of the total inner primary composition, more preferably about 0.1% to about 10%, and most preferably about 0.1% to about 5%.

Preferably, a surfactant is used in combination with the solid lubricant. Examples of a suitable surfactants include: fluorosulfonamide surfactant (3M), 3,6-dimethyl-4-octyne-3,6-diol (Air Products), linear copolymer of vinylpyrolidone and long chain alpha olefin (International Specialty Products), Solsperse high MW polymeric dispersing agents (Zeneca), and other well-known anionic, cationic and non-ionic surfactants.

The invention will be further explained by the following non-limiting examples.

EXAMPLES 6-1 THROUGH 6-3

The components shown in Table 10 were combined to form 8 different inner primary coating compositions. The viscosity and clarity of the compositions was determined.

Films of the coating materials (3 mil) were prepared on microscope slides and then cured by exposure to UV light in the same manner as above. The tensile strength, elongation and modulus were measured.

75 mm films of the coating materials were also prepared and suitably cured. The crack propagation was then measured. A fiber pull-out friction test was also conducted, as described herein. The predicted ribbon strip cleanliness was calculated. The results are shown in Table 10.

TABLE 10

| | Ex. 6-1 | Ex. 6-2 | Ex. 6-3 |
|---|---|---|---|
| Component (Amount is % by weight of total composition) | | | |
| Oligomer H-(I-PTGL2000)$_2$-I-H | 36.1 | 42.3 | 36.1 |
| Ethoxylated Nonylphenol Acrylate | 44.4 | 46.1 | 43.9 |
| Phenoxyethyl Acrylate | 5 | 5 | 5 |
| 2,4,6-trimethylbenzoyl Diphenyl Phosphine Oxide and 2-Hydoxy-2-Methyl-1-Phenyl-1-Propanone blend | 3 | 3 | 3 |
| Thioethylene bis(3,5-di-tert-butyl-4-Hydroxy) Hydrocinnamate | .5 | .5 | .5 |
| γ-Mercaptopropyltrimethoxy Silane | 1 | 1 | 1 |
| Rad Wax 62EB (33% PE wax in epoxy acrylate) | 10 | | |
| Fluorosulfonamide Surfactant FC-430 (3M) | | .1 | .5 |
| Fluoro A (Micronized PTFE) | | 2 | 10 |
| Test results | | | |
| Clarity (opaque?) | yes | yes | yes |
| Color | white | white | white |
| Viscosity, mPa.s at 25° | 5440 | 7960 | 7520 |
| Film Opacity, 3 mil | opaque | cloudy | cloudy |
| Fiber Friction (g/mm) | 15.2 | 8.2 | 6.6 |
| Crack Propagation (mm) | | 1.96 | 2.2 |
| Predicted Strip Cleanliness | | 2.2 | 2.4 |

The oligomers were formed by reacting the following components:
H = Hydroxyethyl Acrylate
I = Isophorone Diisocyanate
PTGL2000 = 2000 molecular weight polymethyltetrahydrofurfuryl/polytetrahydrofurfuryl copolymer diol (Mitsui, NY)
Perm = Permanol KM10-1733 polycarbonate/polyether copolymer diol The test results in Table 10 demonstrate that solid lubricants can be used to reduce the friction to a level that results in a resistive force less than the cohesive strength of the inner primary coating, which is shown by the predicted strip cleanliness values of about 3 or less.

Use of Novel Slip Agents

The above described novel slip agents can be used alone, in combinations of novel slip agents, as novel slip agents with conventional slip agents, and as novel slip agents in combination with the adjusting the normal force as desired to provide the desired level of fiber friction.

Based on the above experimental data, the composition of the inner primary coating can surprisingly be formulated or selected to provide a fiber friction of about 40 (g/mm) or less, preferably about 30 (g/mm) or less, and more preferably about 20 (g/mm), and most preferably about 10 (g/mm) or less at the desired ribbon stripping temperature, in combination with a crack propagation of the inner primary coating which is greater than about 0.7 mm, preferably greater than about 1 mm, more preferably greater than about 1.5 mm, and most preferably greater than about 2 mm, at the desired/design ribbon stripping temperature, such as 90° C. Table 11 and example 11-1 illustrates a practice according to this invention.

TABLE 11

| Component<br>(% weight based on total weight of composition) | Example 11-1 |
|---|---|
| Oligomer H-(I-PTGL2000)$_2$-I-H | 50.3 |
| Isobornyl Acrylate | 10 |
| Ethoxylated Nonylphenol Acrylate Ester | 15.1 |
| Thiodiethylene bis (3,5-di-tert-butyl-4-Hydroxy) Hydrocinnamate | 0.5 |
| Phenoxy Ethyl Acrylate | 20 |
| 2,4,6-Trimethylbenzoyl Diphenyl Phosphine Oxide | 3 |
| Silicone Fluid[1] | 0.1 |
| gamma-Mercaptopropyl Trimethoxy Silane | 1 |
| Test Results | |
| Predicted Strip Cleanliness | 2.5 |
| Fiber Friction (g/mm) | 18.5 |
| Crack Propagation (mm) | 2.07 |

The oligomers and monomers were formulated from the following components:
H = Hydroxyethylacrylate
I = Isophoronediisocyanate
PTGL2,000 = polymethyltetrahydrofurfuryl/polytetrahydrofurfuryl copolymer diol having the molecular weight (2,000), (Mitsui, NY)
Silicone Fluid = Byk333 (BYK Chemie) which is polydimethylsiloxane with terminal polyethylene oxide groups Linear Oligomers If desired, ribbon strippability can also be improved by increasing the ability of the inner primary coating to transmit force applied during ribbon stripping. In general, the more efficient the inner primary coating is at transmitting the force applied during the ribbon stripping operation, the less stripping force that need be applied to remove the inner primary coating.

It has now also been found that the use of linear oligomers can improve the effectiveness, and consequently the efficiency, of the inner primary coating to transmit the ribbon stripping forces applied during ribbon stripping operations. In general, to the extent that the molecular structure of the oligomer is designed to be more linear, the more densely the oligomers will pack together when forming the inner primary coating. It has been found that as the oligomers become more densely packed, the more efficiently the inner primary coating can transmit the stripping force applied during ribbon stripping.

The ability of a ribbon assembly to strip cleanly during ribbon stripping can be further improved if the polymers bound in the outer primary coating have the ability to orient upon heating.

Examples of linear, radiation-curable oligomers according to the present invention that provide enhanced strippability can be illustrated by the following formula (4):

$$R^1\text{—}L\text{—}[R^2\text{—}L]_n\text{—}R^3 \quad (4)$$

wherein: $R^1$ and $R^3$ are organic groupings having radiation-curable functional groups as defined herein, and $R^2$ is an optional organic radical;

L is a linking group, providing a bridging group such as a urethane, thio-urethane, urea or ester grouping, as defined herein, preferably urethane;

$R^2$ is a substantially linear carbon-containing entity; and n is about 1 to about 40, preferably about 1 to about 20, and most preferably about 1 to about 10, wherein the molecular weight of $[R^2\text{—}L]_n$ is about 500 to about 20,000, preferably about 1,000 to about 10,000, and most preferably about 1,500 to about 6,000.

When n is 1, $[R^2\text{—}L]$ can contain, for example, a polyolefin, polyether, polycarbonate, or polyester structure having a molecular weight of about 500 to about 20,000. When n is from about 2 to about 5, $[R^2\text{—}L]$ can include a polyolefin, polyether, polycarbonate, or polyester having a molecular weight of about 500 to about 10,000. When n is from about 5 to about 30, $[R^2\text{—}L]$ can represent a polyolefin, polyether, polycarbonate, or polyester having a molecular weight of about 500 to about 4,000.

The linear oligomers according to this invention can be used in an amount suitable to provide the desired level of ribbon stripping performance. The desired amount can easily be found and determined by one skilled in the art by testing different amounts of the selected linear oligomer(s) in an inner primary coating, and optionally in an outer primary coating as well, on optical glass fibers encased in a ribbon assembly. It has generally been found that the linear oligomers according to this invention can be used in amounts of about 0.1 to about 90 wt. %, preferably about 5 to about 80 wt. %, more preferably about 5 to about 60 wt. %, based on the total weight of the inner primary or outer primary composition.

EXAMPLE 7-1 THROUGH 7-2

The components shown in Table 12 were combined to form an inner primary coating composition. The compositions were cured and the fiber pull-out friction of the cured coating was measured, as defined herein. The test results are shown in Table 12.

TABLE 12

| Component<br>(Amount is % by weight of total composition) | Example 7-1 | Example 7-2 |
|---|---|---|
| Oligomer H-(I-PTHF2000)$_2$-I-H | 52.26 | 52.26 |
| Ethoxylated Nonylphenol Acrylate | 15.7 | 15.67 |
| Lauryl Acrylate | 15.19 | 16.19 |
| n-Vinyl Formamide Isobornyl Acrylate | 11.8 | 0 |
| n-Vinyl Formamide Ethylhexyl Acrylate | 0 | 10.8 |
| 25:75 weight/weight of Bis(2,6-Dimethoxybenzoyl) (2,4,4-Trimethylpentyl) Phosphine Oxide and 2-Hydroxy-2-Methyl-1-Phenyl Propanone | 3.7 | 3.7 |
| gamma-Mercaptopropyl Trimethyoxy Silane | 0.92 | 0.92 |
| Thioethylene Bis(3,5 di-tert-butyl-4-hydroxyl) Hydrocinnamate (antioxidant) | .46 | .46 |
| Test Results | | |
| Fiber Pull-Out Residue Test | 0.875 | 1.25 |

The oligomer was formed by reacting the following components:
H = Hydroxyethyl Acrylate
I = Isophorone Diisocyanate
PTHF2000 = 2000 molecular weight Polytetramethylene Ether Glycol (BASF)

Terminal Linear Moieties

It has been found that the use of radiation-curable oligomers containing at least one terminal linear moiety can also improve the efficiency of the inner primary coating to transmit the stripping force applied during the ribbon stripping operation.

Examples of radiation-curable oligomers according to the present invention that provide enhanced strippability can be illustrated by the following formula:

$$R^4\text{—x—}L\text{—x—}[R^5\text{—x—}L\text{—x}]_n\text{—}R^6$$

wherein
$R^4$ is a substantially linear long chain alkyl terminating in at least one hydroxyl group;

each L represents, independently, a molecular bridging group, preferably derived from a diisocyanate precourser reactant;

each x represents a resulting reacted linking group, such as, inter alia, a urethane, thio-urethane, or urea entity. Alternatively, ester linkages can also be utilized;

$R^5$ is a linear or a branched or cyclic hydrocarbon or polyether moiety derived from a a diol and having a molecular weight of from 150 to 10,000, preferably from 500 to 5,000, and most preferably from 1,000 to 2,000 Daltons;

$R^6$ is an end group carrying a radiation-curable functional group as defined herein, preferably an acrylate or methacrylate; and also having an hydroxyl linkage to the L entity.

$R^4$ preferably has at least about 80%, more preferably at least about 90%, of its carbon atoms in a straight chain; and, n may represent a number from zero to 30.

Preferably, $R^4$ is an alkyl radical with of from about $C_9$ to about $C_{20}$, since longer carbon chains may decrease the resistance against oil. Suitable examples of alkyls are lauryl, decyl, isodecyl, tridecyl, and stearyl. Most preferred is lauryl.

$R^5$ can contain a branched or cyclic aliphatic group having about 6 to about 15 carbon atoms. In particular $R^5$ can be the aliphatic component of a diisocyanate compound such as isophorone diisocyanate, DesW, TMDI, and HXDI. If $R^5$ is a branched component, preferably, the extent of branching units is at least about 10 mole %, and more preferably at least about 20 mole %, based on the total number of carbon atoms in $R^5$.

The oligomers according to above formula can be made, for example, by reacting in a first reaction one mole of a diisocyanate compound (for forming $R^5$) with (1) one mole of a long chain alkyl containing a hydroxy group (for forming $R^4$)or (2) one mole of a compound containing a hydroxy functional group and a radiation-curable functional group (for forming $R^6$). The urethane linking group "x" attached to "L" is formed by the reaction of the isocyanate group with a hydroxyl group. In a second reaction, the remaining isocyanate group is reacted with the other as yet unreacted hydroxyl group of the compound. Reactions of hydroxy functional compounds with isocyanate functional molecules are well known in the art, and can be catalyzed if needed, with known catalysts. Suitable examples of reactants containing a radiation-curable functional group and a hydroxy group are hydroxyethylacrylate or 2-hydroxypropylacrylate. Suitable examples of linear long chain alkyls include lauryl alcohol, decyl alcohol, isodecyl alcohol, tridecyl alcohol, and stearyl alcohol.

The resulting radiation-curable oligomer can be used in optical glass fiber coatings, in particular in inner primary coatings, as a monomer that enhances the strippability of the final coating, and that yields a coating composition which may have a high cure speed.

The radiation-curable oligomers according to this invention can accordingly be used in amounts suitable to provide the desired level of ribbon stripping performance. The desired amount can easily be determined by one skilled in the art by simple testing of different amounts of the selected linear oligomer(s) in an inner primary coating, and optionally in an outer primary coating as well, on optical glass fibers encased in a ribbon assembly. It has been found that the oligomers provided by this invention can generally be used in amounts of about 1 to about 90 wt. %, preferably about 5 to about 80 wt. %, and most preferably about 5 to about 60 based on the total weight of the inner primary or outer primary composition.

EXAMPLE 8-1

Comparative Examples H-1 through H-3

The components shown in Table 13 were combined to inner primary coating compositions.

75 micron thick films of the coating materials were prepared and suitably cured. The fiber pull-out friction test was conducted, as described herein, and the test results are shown in Table 13.

TABLE 13

| | Comp. Example H-1 | Comp. Example H-2 | Comp. Example H-3 | Example 8-1 |
|---|---|---|---|---|
| Component (Amount is % by weight of total composition) | | | | |
| Oligomer H-(I-PTHF2000)$_2$-I-H | 52.26 | 52.26 | 52.56 | 52.56 |
| Ethoxylated Nonylphenol Acrylate | 15.67 | 15.67 | 15.67 | 15.67 |
| Lauryl Acrylate | 3.39 | 10.79 | 10.79 | 7.15 |
| n-Vinyl Formamide Isobornyl Acrylate | 23.6 | 0 | 0 | 0 |
| n-Vinyl Formamide Ethylhexyl Acrylate | 0 | 16.2 | 21.6 | 0 |
| n-Vinyl Formamide Butyl Acrylate | 0 | 0 | 0 | 19.84 |
| 25:75 weight/weight of Bis(2,6-Dimethoxybenzoyl) (2,4,4-Trimethylpentyl) Phosphine Oxide and 2-Hydroxy-2-Methyl-1-Phenyl Propanone | 3.7 | 3.7 | 3.7 | 3.7 |
| gamma-Mercaptopropyl Trimethyoxy Silane | 0.92 | 0.92 | 0.92 | 0.92 |
| Thioethylene Bis(3,5 di-tert-butyl-4-hydroxyl) Hydrocinnamate (antioxidant) | 0.46 | 0.46 | 0.46 | 0.46 |
| Test Results | | | | |
| Fiber Pull-Out Residue Test | 1.5 | 0.75 | 1 | 0.65 |

The oligomer was formed by reacting the following components:
H = Hydroxyethyl Acrylate
I = Isophorone Diisocyanate
PTHF2000 = 2000 molecular weight Polytetramethylene Ether Glycol (BASF)

The test results in Table 13 demonstrate that as the length of the linear moiety is increased, the fiber pull-out friction decreases.

Aromatic Groups

Ribbon strippability can also be enhanced by incorporating a high concentration of aromatic groups in the oligomers and monomers used to form the inner primary coating. It will be appreciated that coating compositions comprising about 0.1 or more moles of aromatic groups per 100 grams of total composition, calculated using the molecular weights of the compositional components, are regarded as having a high concentration of aromatic groups. It is believed that the planarity of the phenyl ring next to the surface of the optical glass fiber may allow for the good slidability of the inner primary coating off the optical glass fiber during ribbon stripping.

EXAMPLE 9-1

The components shown in Table 14 were combined to form an inner primary coating composition.

A 75 micron thick film of the coating material was prepared and suitably cured. The crack propagation was then measured. A friction test was also conducted, as described herein. The results are shown in Table 14.

TABLE 14

|  | Example 9-1 |
|---|---|
| Component (Amount is % by weight of total composition) |  |
| Oligomer H-I-(PTGL2000-I)$_2$-H | 51.54 |
| Ethoxylated Nonylphenol Acrylate | 20.86 |
| Phenoxyethyl Acrylate | 16.8 |
| Lauryl Acrylate | 7 |
| 25:75 weight/weight of Bis(2,6-Dimethoxybenzoyl) (2,4,4-Trimethylpentyl) Phosphine Oxide and 2-Hydroxy-2-Methyl-1-Phenyl Propanone | 2.5 |
| Thiodiethylene Bis(3,5-di-tert-butyl-gamma-hydroxy) Hydrocinnamate | 0.3 |
| gamma-Mercaptopropyl Trimethoxy Silane | 1 |
| Test Results |  |
| Crack Propagation (mm) | 1.49 |
| Fiber Pull-Out Friction (g/mm) | 10 |
| Predicted Strip Cleanliness | 2 |

The oligomer was formed by reacting the following components:
H = Hydroxyethyl Acrylate
I = Isophorone Diisocyanate
PTGL2000 = 2000 molecular weight polymethyltetrahydrofurfuryl/polytetrahydrofurfuryl copolymer diol (Mitsui, NY)

High Molecular Weight Polymeric Blocks and Reduced Concentration of Urethane

Radiation-curable, inner primary optical glass fiber coating compositions (hereinafter referred to as "inner primary compositions") are now well known in the art. Such inner primary compositions usually contain at least one radiation-curable oligomer, and optionally reactive diluents, photoinitiators, and additives, as described herein above.

It has now been found that by reformulating the radiation-curable oligomer used in the inner primary composition, an inner primary coating can be formed having a significantly increased crack propagation in combination with a significantly decreased fiber friction. Furthermore, it has been found that the crack propagation can be increased and the fiber friction decreased to levels which provide the inner primary coating with the ability to strip cleanly from the surface of an optical glass fiber during ribbon stripping, without the use of substantial amounts of slip agents in the inner primary coating. In some instances, the use of slip agents can be substantially avoided. The term slip agents includes components which are separate and distinct from the radiation-curable oligomer as well as slip agent moieties that can be bound to the radiation-curable oligomer. The use of slip agents may cause undesirable delamination of the inner primary coating during use of the ribbon assembly in hot and wet environments, such as tropical environments, which can lead to microbending and attenuation of the signal transmission. Thus, by substantially avoiding the use of slip agents to provide a ribbon-strippable inner primary coating, the present invention can provide a ribbon-strippable inner primary coating which exhibits enhanced resistance to such undesirable delamination.

Radiation-curable, oligomers comprising a carbon containing backbone to which at least one radiation-curable functional group is bound are well known in the art. Usually, the carbon containing backbone of the radiation-curable oligomer contains one or more polymeric blocks each having a molecular weight up to about 2000 and being connected together via coupling groups. Thus, an oligomer having a molecular weight of about 6000, will usually contain three polymeric blocks each having a molecular weight of about 2000 which are connected via coupling groups. The radiation-curable functional groups are also usually connected to the carbon-containing backbone via coupling groups.

By extensive experimentation, it has now been found that as the molecular weight of the polymeric blocks is increased, the crack propagation of the inner primary coating increases and the fiber friction of the inner primary coating decreases. The molecular weight of the polymeric blocks should be adjusted up to level which provides an inner primary coating having a fiber friction and crack propagation that are suitable for ribbon stripping. For example, the molecular weight of the polymeric block can be adjusted upward to level which provides an inner primary coating having a combination of fiber friction and crack propagation that provides a predicted strip cleanliness of about 3 or less, and preferably about 2 or less. Alternatively, the molecular weight of the polymeric block can be adjusted upward to level which provides an inner primary coating having a fiber friction of about 30 g/mm or less at a rate of 0.1 mm/sec in combination with a crack propagation of at least about 1.3 mm at a rate of 0.1 mm/sec, at a ribbon stripping temperature. Preferably, the fiber friction is about 25 g/mm or less and more preferably about 20 g/mm or less. Preferably, the crack propagation is at least about 1.5 mm and more preferably at least about 2 mm. The crack propagation is usually below about 4, but can be higher.

It has been found that by using polymeric blocks having a molecular weight greater than 2000, preferably at least about 2500, and most preferably at least about 3000, inner primary coatings having a fiber friction and a crack propagation as described above can be provided. The molecular weight of said polymeric block is usually less than about 10,000, preferably less than about 8,000.

The coupling groups can be any group capable of providing a link between polymer blocks and/or between radiation-curable functional groups and polymer blocks. Examples of suitable coupling groups are urethane, urea and thiourethane. For purposes of practicing the present invention, which relates to adjusting the crack propagation and fiber friction using the molecular weight of the polymeric blocks and/or urethane concentration, the following groups are not considered coupling groups when determining the molecular weight of the polymeric blocks: carbonate, ether, and ester groups. Thus, when determining the molecular weight of the polymeric block, ether groups, carbonate groups, and ester groups are considered part of the polymeric block. Polymeric compounds separated by urethane, thiourethane and urea groups are considered separate polymeric blocks. Urethane is the preferred coupling group.

Usually, urethane groups are used as the coupling groups in the radiation-curable oligomer. For example, if an oligomer having a number average molecular weight about 6000 comprising 3 polymer blocks, each having a number average molecular weight of about 2000, and containing 2 radiation-curable functional groups, will have four urethane linkages. Two of the urethane linkages connect the radiation-curable groups to the polymeric blocks and two of the urethane linkages connect the three polymeric blocks together.

It has now been found that as the concentration of urethane linkages present in the inner primary composition is decreased, the crack propagation of the inner primary coating increases and the fiber friction of the inner primary coating decreases. Thus, the term urethane concentration represents the weight percentage of all urethane linkages present in the inner primary coating composition, based on the total weight of the inner primary coating composition.

Based on this discovery, the urethane concentration should be adjusted downward to a level which provides an inner primary coating having a fiber friction and crack propagation that are suitable for ribbon stripping the desired ribbon assembly. For example, the urethane concentration can be adjusted downward to a level which provides an inner primary coating having a combination of fiber friction and crack propagation that provides a predicted strip cleanliness of about 3 or less, and preferably about 2 or less. It has been found that if the concentration of urethane linkages is about 4% by weight or less, inner primary coatings having a fiber friction and a crack propagation that exhibit a predicted strip cleanliness of about 3 or less can be provided. Preferably, the urethane concentration is about 3.5% by weight or less, more preferably about 2.5% or less by weight, and most preferably about 2% or less by weight. The urethane concentration effect on fiber friction and crack propagation is more pronounced for higher molecular weight oligomers, such as about 3,000 to about 10,000, more preferably about 3,500 to about 8,000. Thus, preferably the urethane oligomer has a molecular weight of about 3,000 to about 10,000 in combination with a urethane concentration of about 4% by weight or less, more preferably, a molecular of about 3,500 to about 8,000 in combination with a urethane concentration of about 3.5% or less, and most preferably, a molecular weight of about 3,500 to about 8,000 in combination with a urethane concentration of about 3% or less.

The polymeric blocks can comprise for example polyethers, polyolefins, polycarbonates, polyesters, polyamides or copolymers thereof. Preferably, the polymeric blocks comprise polyethers.

The radiation-curable functional groups used can be any functional group capable of polymerization when exposed to actinic radiation. Suitable radiation-curable functional groups are now well known and within the skill of the art.

Commonly, the radiation-curable functionality used is ethylenic unsaturation, which can be polymerized through radical polymerization or cationic polymerization. Specific examples of suitable ethylenic unsaturation are groups containing acrylate, methacrylate, styrene, vinylether, vinyl ester, N-substituted acrylamide, N-vinyl amide, maleate esters, and fumarate esters. Preferably, the ethylenic unsaturation is provided by a group containing acrylate, methacrylate, or styrene functionality, and most preferably acrylate or methacrylate.

Another type of radiation-curable functionality generally used is provided by, for example, epoxy groups, or thiol-ene or amine-ene systems. Epoxy groups can be polymerized through cationic polymerization, whereas the thiol-ene and amine-ene systems are usually polymerized through radical polymerization. The epoxy groups can be, for example, homopolymerized. In the thiol-ene and amine-ene systems, for example, polymerization can occur between a group containing allylic unsaturation and a group containing a tertiary amine or thiol.

The radiation-curable oligomer can be easily formed by reacting a polymeric polyol, a compound containing a radiation-curable functional group and a hydroxyl group, and a polyisocyanate. The general reaction of isocyanate functional groups with hydroxyl groups to form urethane linkages is well known in the art. Thus, one skilled in the art will be able to make the improved oligomer according to the present invention based on the disclosure provided herein.

Examples of suitable polymeric polyols that can be used to form the radiation-curable oligomer include polyether diols, polyolefin diols, polyester diols, polycarbonate diols, and mixtures thereof. Polyether and polycarbonate diols, or combinations thereof, are preferred. The polymeric block is the residue of the polymeric polyol after reaction to form the radiation-curable oligomer.

If a polyether diol is used, preferably the polyether is a substantially non-crystalline polyether. Preferably, the polyether comprises repeating units of one or more of the following monomer groups:

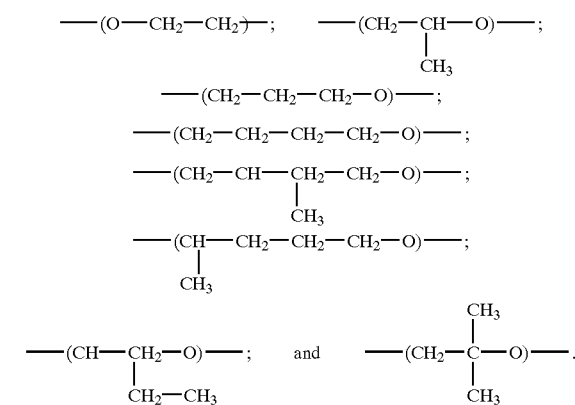

Thus, suitable polyethers can be made from epoxy-ethane, epoxy-propane, tetrahydrofuran, methyl-substituted tetrahydrofuran, epoxybutane, and the like. Commercial examples of a suitable polyether polyols that can be used are PTGL2500, PTGL3000, PTGL3500, and PTGL4000 (Hodogaya Chemical Company).

If a polyolefin diol is used, the polyolefin is preferably a linear or branched hydrocarbon containing a plurality of hydroxyl end groups. The hydrocarbon provides a hydrocarbon backbone for the oligomer. Preferably, the hydrocarbon is a non-aromatic compound containing a majority of methylene groups (—$CH_2$—) and which can contain internal unsaturation and/or pendent unsaturation. Examples of suitable hydrocarbon diols include, for example: hydroxyl-terminated;

fully or partially hydrogenated 1,2-polybutadiene; copolymers of 1,4-polybutadiene;

copolymers of 1,2-polybutadiene;

polyisobutylene polyol;

mixtures thereof, and the like. Preferably, the hydrocarbon diol is a substantially, fully hydrogenated 1,2-polybutadiene-ethene copolymer or 1,2-polybutadiene-ethene copolymer.

Examples of polycarbonate diols are those conventionally produced by the alcoholysis of diethylene carbonate with a diol.

Examples of polyester diols include the reaction products of saturated polycarboxylic acids, or their anhydrides, and diols. Commercial examples are the polycaprolactones, commercially available from Union Carbide under the trade designation Tone Polyol series of products, for example, Tone 0200, 0221, 0301, 0310, 2201, and 2221. Tone Polyol 0301 and 0310 are trifunctional.

Any organic polyisocyanate, alone or in admixture, can be used as the polyisocyanate. Examples of suitable diisocyanates include: isophorone diisocyanate (IPDI);
toluene diisocyanate (TDI);
diphenylmethylene diisocyanate;
hexamethylene diisocyanate;
cyclohexylene diisocyanate;
methylene dicyclohexane diisocyanate;
2,2,4-trimethyl hexamethylene diisocyanate;
m-phenylene diisocyanate;

4-chloro-1,3-phenylene diisocyanate;
4,4'-biphenylene diisocyanate;
1,5-naphthylene diisocyanate;
1,4-tetramethylene diisocyanate;
1,6-hexamethylene diisocyanate;
1,10-decamethylene diisocyanate;. 1,4-cyclohexylene diisocyanate; and
polyalkyloxide and polyester glycol diisocyanates such as polytetramethylene ether glycol terminated with TDI and polyethylene adipate terminated with TDI, respectively. Preferably, the isocyanates are TDI or IPDI.

If other oligomers, monomers, and/or additives containing urethane linkages are used in admixture with the above described radiation-curable oligomer to form an inner primary composition, the concentration of urethane linkages present in each other oligomer, monomer or additive should be included in the urethane concentration calculation. Examples of common monomers containing urethane linkages include:
trimethyl-olpropane triacrylate,
the triacrylate or methacrylate from hexane-2,4,6 triol, or from glycerol, ethoxylated glycerol, or propoxylated glycerol,
hexanediol diacrylate,
1,3-butylene glycol diacrylate,
neopentyl glycol diacrylate,
1,6-hexanediol diacrylate,
neopentyl glycol diacrylate,
polyethylene glycol-200 diacrylate,
tetraethylene glycol diacrylate,
triethylene glycol diacrylate,
pentaerythritol tetraacrylate,
tripropylene glycol diacrylate,
ethoxylated bisphenol-A diacrylate,
trimetylolpropane diacrylate,
di-trimethylolpropane tetraacrylate,
triacrylate of tris(hydroxyethyl)isocyanurate,
dipentaerythritol hydroxypentaacrylate,
pentaerythritoltriacrylate,
ethoxylated trimethylolpropane triacrylate,
triethylene glycol dimethacrylate,
ethylene glycol dimethacrylate,
tetraethylene glycol dimethacrylate,
polyethylene glycol-2000 dimethacrylate,
1,6-hexanediol dimethacrylate,
neopentyl glycol dimethacrylate,
polyethylene glycol-600 dimethacrylate,
1,3-butylene glycol dimethacrylate,
ethoxylated bisphenol-A dimethacrylate, trimethylolpropane trimethacrylate,
diethylene glycol dimethacrylate,
1,4-butanediol diacrylate,
diethylene glycol dimethacrylate,
pentaerythritol tetramethacrylate,
glycerin dimethacrylate,
trimethylolpropane dimethacrylate,
pentaerythritol trimethacrylate,
pentaerythritol dimethacrylate,
pentaerythritol diacrylate, and the like and mixtures thereof.
Mono(meth)acrylates such as cyclohexyl(meth)acrylate, isobornyl(meth)acrylate,
lauryl(meth)acrylate,
alkoxylated phenolacrylate,
isooctyl-acrylate,
2-ethylhexyl-acrylate,
hydroxyethyl acrylate, and
tetrahydrofurfuryl(meth)-acrylate.

The Invention will be further explained by the following non-limiting examples illustrating the use of block polymeric formulations.

EXAMPLES 10-1 THROUGH 10-14

Comparative Examples J-1 through J-11

Inner primary compositions were made by combining the components shown in Tables 15 and 16, in the same manner as described herein above. The viscosity of the compositions was measured as described above, and the results are shown in Tables 15 and 16. The inner primary compositions were cured by exposure to UV radiation and the fiber friction and crack propagation properties were measured, in the same manner as described herein above. The test results are shown in Tables 15 and 16.

TABLE 15

|  | Ex. 10-1 | Ex. 10-2 | Ex. 10-3 | Ex. 10-4 | Ex. 10-5 | Ex. 10-6 | Ex. 10-7 |
|---|---|---|---|---|---|---|---|
| Component (% by weight of total composition) | | | | | | | |
| Oligomer H-I-PPG3025-I-H | 49.38 | 0 | 0 | 0 | 0 | 0 | 0 |
| Oligomer H-I-PPG4025-I-H | 0 | 49.38 | 0 | 0 | 0 | 0 | 0 |
| Oligomer H-I-PTGL3000-I-H | 0 | 0 | 64.38 | 0 | 0 | 49.38 | 0 |
| Oligomer H-I-PTGL3500-I-H | 0 | 0 | 0 | 64.38 | 0 | 0 | 49.38 |
| Oligomer H-I-PTGL4000-I-H | 0 | 0 | 0 | 0 | 64.38 | 0 | 0 |
| Oligomer H-(I-PTGL2000)$_2$-I-H | 0 | 0 | 0 | 0 | 0 | 0 | 0 |
| Phenoxy Ethyl Acrylate | 0 | 0 | 0 | 0 | 0 | 0 | 0 |
| Ethoxylated Nonylphenol Acrylate Ester | 40.32 | 40.32 | 25.32 | 25.32 | 25.32 | 40.32 | 40.32 |
| Isobornyl Acrylate | 0 | 0 | 0 | 0 | 0 | 0 | 0 |
| Lauryl Acrylate | 6 | 6 | 6 | 6 | 6 | 6 | 6 |
| Thiodiethylene bis (3,5-di-tert-butyl-4-Hydroxy) Hydrocinnamate | .3 | .3 | .3 | .3 | .3 | .3 | .3 |
| 2,4,6-Trimethylbenzoyl Diphenyl Phosphine Oxide and 2-Hydroxy-2-Methyl-1-Phenyl-1-Propanone | 3 | 3 | 3 | 3 | 3 | 3 | 3 |

TABLE 15-continued

| | | | | | | | |
|---|---|---|---|---|---|---|---|
| 2-Hydroxy-2-Methyl-1-Phenyl-1-Propanone | 0 | 0 | 0 | 0 | 0 | 0 | 0 |
| Bis (2,6-Dimethoxybenzyl) (2,4,4-Trimethylpentyl) Phosphine Oxide | | | | | | | |
| gamma-Mercaptopropyl Trimethoxy Silane | 1 | 1 | 1 | 1 | 1 | 1 | 1 |
| Test Results | | | | | | | |
| Viscosity mPa · s (25 C.) | 1200 | 1190 | 25350 | 321350 | 16840 | 9380 | 17680 |
| Urethane Concentration (%)[1] | 2.01 | 1.76 | 2.99 | 2.65 | 2.24 | 2.29 | 2.03 |
| Fiber Pull-Out Friction (g/mm) | 19.3 | 10.8 | 23.23 | 21.27 | 27.63 | 21.84 | 14.04 |
| Crack Propagation (mm) | 1.5 | 2.18 | 1.66 | 1.63 | 1.82 | 1.76 | 2.32 |

| | Ex. 10-8 | Ex. 10-9 | Ex. 10-10 | Ex. 10-11 | Ex. 10-12 | Ex. 10-13 | Ex. 10-14 |
|---|---|---|---|---|---|---|---|
| Component (% by weight of total composition) | | | | | | | |
| Oligomer H-I-PPG3025-I-H | 0 | 0 | 0 | 0 | 0 | 0 | 0 |
| Oligomer H-I-PPG4025-I-H | 0 | 0 | 0 | 0 | 0 | 0 | 0 |
| Oligomer H-I-PTGL3000-I-H | 0 | 0 | 0 | 0 | 0 | 0 | 0 |
| Oligomer H-I-PTGL3500-I-H | 0 | 0 | 39.38 | 45.23 | 45.23 | 65.33 | 64.68 |
| Oligomer H-I-PTGL4000-I-H | 49.38 | 0 | 0 | 0 | 0 | 0 | 0 |
| Oligomer H-(I-PTGL2000)$_2$-I-H | 0 | 50.54 | 0 | 0 | 0 | 0 | 0 |
| Phenoxy Ethyl Acrylate | 0 | 14 | 0 | 25.13 | 20.1 | 20.1 | 17.91 |
| Ethoxylated Nonylphenol Acrylate Ester | 40.32 | 15.16 | 50.21 | 25.13 | 20.1 | 0 | 0 |
| Isobornyl Acrylate | 0 | 10 | 0 | 0 | 10.5 | 10.5 | 6.97 |
| Lauryl Acrylate | 6 | 6 | 5.99 | 0 | 0 | 0 | 5.97 |
| Thiodiethylene bis (3,5-di-tert-butyl-4-Hydroxy) Hydrocinnamate | .3 | .3 | .3 | .3 | .3 | .3 | .3 |
| 2,4,6-Trimethylbenzoyl Diphenyl Phosphine Oxide and 2-Hydroxy-2-Methyl-1-Phenyl-1-Propanone | 3 | 0 | 0 | 0 | 0 | 0 | 0 |
| 2-Hydroxy-2-Methyl-1-Phenyl-1-Propanone | 0 | 3 | 3 | 3 | 3 | 3 | 3 |
| Bis(2,6-Dimethoxybenzyl) (2,4,4-Trimethylpentyl) Phosphine Oxide | | | | | | | |
| gamma-Mercaptopropyl Trimethoxy Silane | 1 | 1 | 1 | 1 | 1 | 1 | |
| Test Results | | | | | | | |
| Viscosity mPa · s (25 C.) | 7050 | 5570 | 4530 | 7220 | 5540 | 10670 | 9440 |
| Urethane Concentration (%)[1] | 1.72 | 2.67 | 1.62 | 1.86 | 1.86 | 2.69 | 2.66 |
| Fiber Pull-Out Friction (g/mm) | 16.15 | 25.3 | 13.4 | 15.8 | 15.2 | 25.6 | 21.6 |
| Crack Propagation (mm) | 2.31 | 2.04 | 2.6 | 2 | 2.9 | 1.6 | 1.8 |

[1]The urethane concentration can be calculated from (1) the amount of NCO present in the urethane linkages of the oligomer, (2) the molecular weight of the oligomer, which can be measured by conventional methods, and (3) the amount of oligomer in the composition. The polyol molecular weights in Table I are estimated rather than measured molecular weights.

TABLE 16

| | Comp. Ex. J-1 | Comp. Ex. J-2 | Comp. Ex. J-3 | Comp. Ex. J-4 | Comp. Ex. J-5 | Comp. Ex. J-6 | Comp. Ex. J-7 | Comp. Ex. J-8 | Comp. Ex. J-9 | Comp. Ex. J-10 | Comp. Ex. J-11 |
|---|---|---|---|---|---|---|---|---|---|---|---|
| Component (% by weight based on total weight of composition) | | | | | | | | | | | |
| Oligomer H-I-PTGL2000-I-H | 0 | 83.7 | 68.7 | 79.7 | 79.7 | 74.7 | 69.7 | 67.7 | 79.7 | 49.38 | 64.38 |
| Oligomer H-(I-PERM1000)$_{1.4}$-(I-PPG1025)$_{1.06}$-I-H | 56 | 0 | 0 | 0 | 0 | 0 | 0 | 0 | 0 | 0 | 0 |
| isodecyl acrylate | 14 | | | | | | | | | | |
| HI | 0 | 0 | 0 | 0 | 0 | 5 | 10 | 15 | 0 | 0 | 0 |
| Phenoxy Ethyl Acrylate | 0 | 0 | 5 | 0 | 10 | 10 | 7 | 0 | 0 | 0 | 0 |

TABLE 16-continued

| | Comp. Ex. J-1 | Comp Ex. J-2 | Comp Ex. J-3 | Comp Ex. J-4 | Comp Ex. J-5 | Comp Ex. J-6 | Comp Ex. J-7 | Comp Ex. J-8 | Comp Ex. J-9 | Comp. Ex. J-10 | Comp. Ex. J-11 |
|---|---|---|---|---|---|---|---|---|---|---|---|
| Ethoxylated Nonylphenol Acrylate Ester | 25.5 | 6 | 21 | 0 | 0 | 0 | 0 | 0 | 0 | 40.32 | 25.32 |
| Isobornyl Acrylate | 0 | 0 | 0 | 5 | 10 | 0 | 0 | 0 | 10 | 0 | 0 |
| Lauryl Acrylate | 0 | 6 | 6 | 6 | 6 | 6 | 6 | 6 | 6 | 6 | 6 |
| Thiodiethylene bis (3,5-di-tert-butyl-4-Hydroxy) Hydrocinnamate | .5 | .3 | .3 | .3 | .3 | .3 | .3 | .3 | .3 | .3 | .3 |
| 2,4,6-Trimethylbenzoyl Diphenyl Phosphine Oxide and 2-Hydroxy-2-Methyl-1-Phenyl-1-Propanone | 0 | 3 | 3 | 3 | 3 | 3 | 3 | 3 | 0 | 3 | 3 |
| 2-Hydroxy-2-Methyl-1-Phenyl-1-Propanone Bis (2,6-Dimethoxybenzyl) (2,4,4-Trimethylpentyl) Phosphine Oxide | 3 | 0 | 0 | 3 | 3 | 3 | 3 | 3 | 3 | 0 | 0 |
| gamma-Mercaptopropyl Trimethoxy Silane | 1 | 1 | 1 | 1 | 1 | 1 | 1 | 1 | 1 | 1 | 1 |
| Test Results | | | | | | | | | | | |
| Viscosity mPa · s (25 C.) | 6000 | | | | | | | | | 5050 | 10310 |
| Urethane Concentration (%) | 4.9 | 5.38 | 4.42 | 5.12 | 5.12 | 5.31 | 5.49 | 5.87 | 5.12 | 3.53 | 4.30 |
| Fiber Pull-Out Friction (g/mm) | 44 | 41.97 | 34.84 | 41.8 | 40.2 | 44.6 | 40.4 | 39.9 | 44.9 | 34.84 | 41.17 |
| Crack Propagation (mm) | 1 | 1.32 | 1.45 | 1.21 | 1.25 | 1.05 | 1.2 | 1.17 | 1.2 | 1.45 | 1.32 |

The oligomers in Tables 15 and 16 were formulated from the following components:
H = Hydroxyethylacrylate
I = Isophoronediisocyanate
HI = Hexane diisocyanate
PTGL2000 = polymethyltetrahydrofurfuryl/polytetrahydrofurfuryl copolymer diol having the molecular weight of 2000 (Mitsui, NY)
PPG1025 = polypropyleneoxide diol having an average molecular weight of 1025, (BASF)
Perm 1000 = Permanol KM10-1733 polycarbonate/polyether copolymer diol having an average molecular weight of 1000

As can be seen from Examples 10-6 through 10-8, and Comparative Example J-10, as the concentration of urethane decreases, the crack propagation increases and the fiber friction decreases. Furthermore, as the molecular weight of the polymeric blocks increases, the crack propagation increases and the fiber friction decreases.

Similarly, as can be seen from Examples 10-3 through 10-5, and Comparative Example J-11, as the concentration of urethane decreases, the crack propagation increases and the fiber friction decreases. Furthermore, as the molecular weight of the polymeric blocks increases, the crack propagation increases and the fiber friction decreases. Examples 10-3 through 10-5 used significantly more of the radiation-curable oligomer than Examples 10-6 through 10-8, and the same trend in fiber friction and crack propagation was clearly demonstrated. Based on this experimental evidence, the trend in fiber friction and crack propagation is dependent mainly upon the oligomer. Furthermore, these Examples used a polyether polymeric block.

Examples 10-1 and 10-2 demonstrate that when a polypropylene oxide polymeric block is used as a polyether polymeric block, the crack propagation and fiber friction are still dependent upon the molecular weight of the polymeric block and/or the concentration of urethane if used. In particular, as the concentration of urethane decreases, the crack propagation increases and the fiber friction decreases. Furthermore, as the molecular weight of the polymeric blocks increases, the crack propagation increases and the fiber friction decreases.

Examples 10-4, 10-7 and 10-10 through 10-14 used different amounts of the same radiation-curable oligomer. The experimental results demonstrate that the trend in crack propagation and fiber friction is based on the molecular weight of the polymeric block and/or the concentration of urethane.

The test results in Table 15 demonstrate that the above-described trends regarding crack propagation and fiber friction based on molecular weight and/or urethane concentration are independent of the type of oligomers and is generally consistent among the different types of oligomers.

Figure 7:
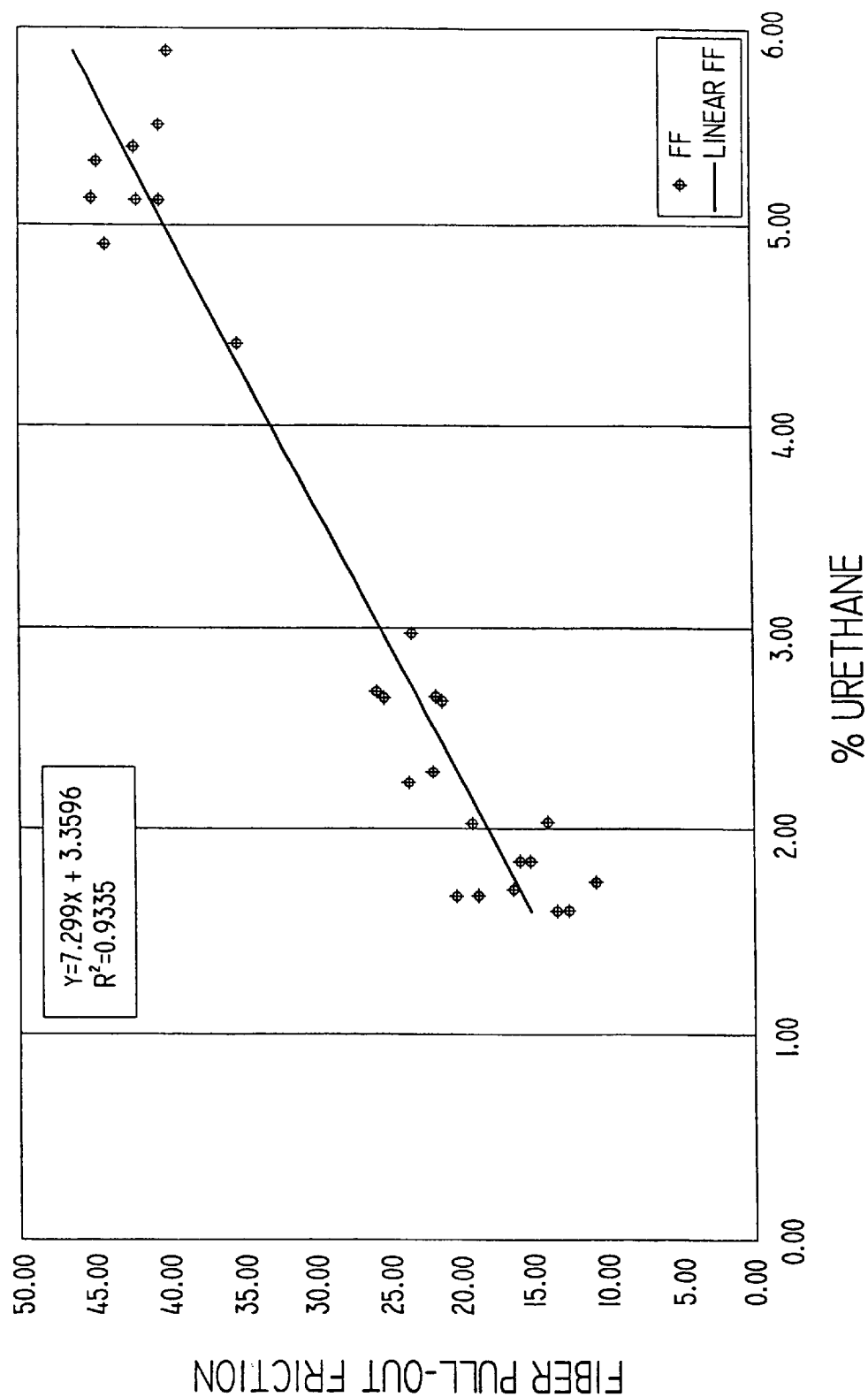
FIG. 7 illustrates a graph of the fiber pull-out friction versus urethane concentration.

FIG. 7 illustrates a graph which includes the data shown in Tables 15 and 16, above. As can be seen from FIG. 7, the urethane concentration in the inner primary composition directly affects the fiber pull-out friction. As the urethane concentration is decreased, the fiber pull-out friction is decreased.

Figure 8:
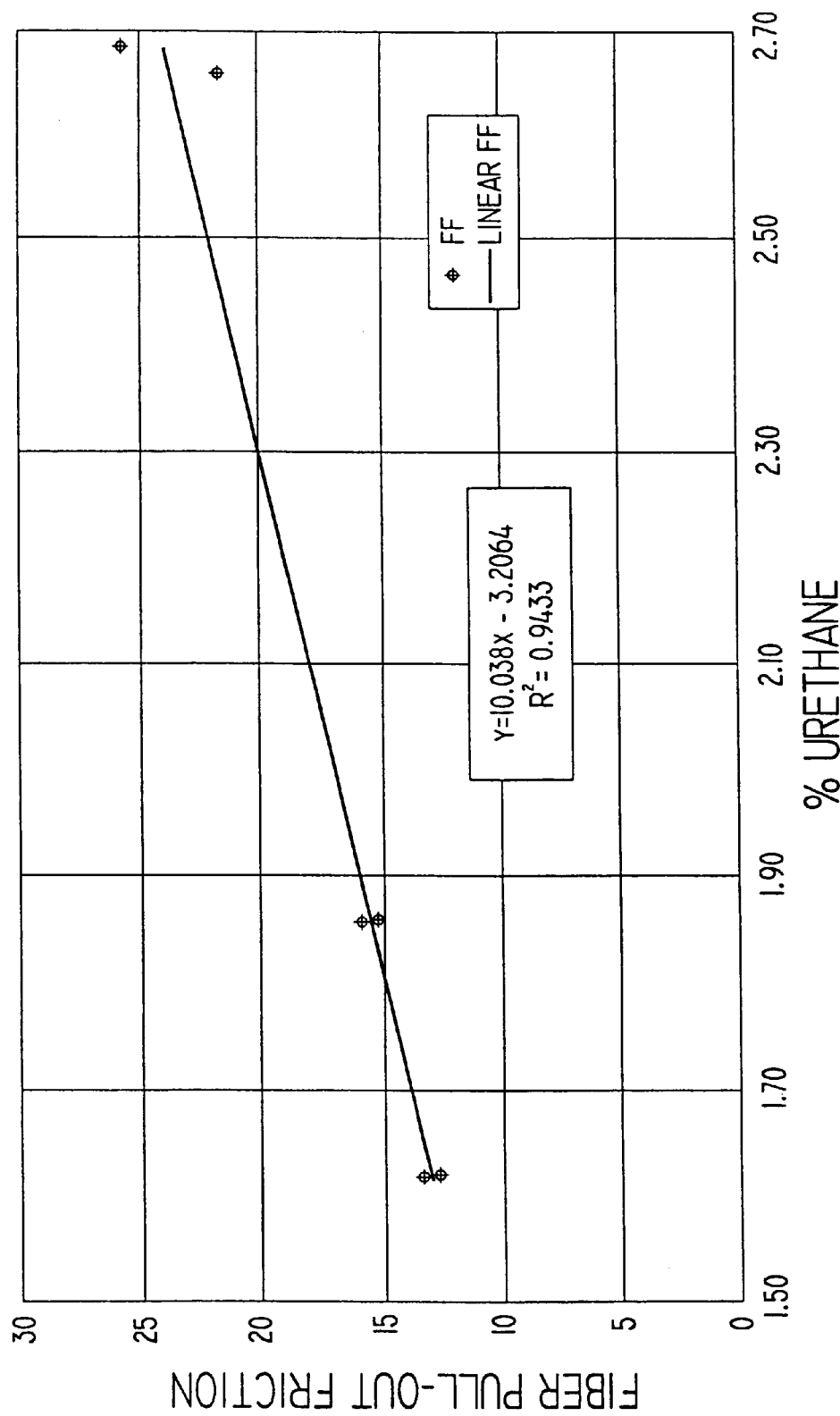
FIG. 8 illustrates a graph of the fiber pull-out friction versus urethane concentration.

FIG. 8 illustrates a graph of the fiber friction versus urethane concentration for Examples 10-10 through 10-14. FIG. 8 clearly demonstrates the direct correlation between fiber pull-out friction and urethane concentration in the inner primary composition. In particular, as the urethane concentration decreases the fiber pull-out friction decreases.

EXAMPLES 10-15 THROUGH 10-22

Inner primary compositions were made by combining the components shown in Table 17, in the same manner as described herein above. The viscosity of the compositions was measured as described above, and the results are shown in Table 17. The inner primary compositions were cured by exposure to UV radiation and the fiber friction and crack propagation properties were measured, in the same manner as described herein above. The test results are shown in Table 17.

TABLE 17

|  | Exmp. 10-15 | Exmp. 10-16 | Exmp. 10-17 | Exmp. 10-18 | Exmp. 10-19 | Exmp. 10-20 | Exmp. 10-21 | Exmp. 10-22 |
|---|---|---|---|---|---|---|---|---|
| Component (% by weight based on total weight of composition) | | | | | | | | |
| Oligomer H-(I-PTGL2000)$_2$-I-H | 23.71 | 28.45 | 33.19 | 37.93 | 42.68 | 47.42 | 52.16 | 56.9 |
| Phenoxy Ethyl Acrylate | 64.68 | 58.52 | 52.35 | 46.19 | 40.03 | 33.86 | 27.7 | 21.53 |
| Ethoxylated Nonylphenol Acrylate Ester | 7.11 | 8.53 | 9.95 | 11.38 | 12.87 | 14.22 | 15.64 | 17.06 |
| Thiodiethylene bis (3,5-di-tert-butyl-4-Hydroxy) Hydrocinnamate | 0.5 | 0.5 | 0.5 | 0.5 | 0.5 | 0.5 | 0.5 | 0.5 |
| 2-Hydroxy-2-Methyl-1-Phenyl-1-Propanone Bis (2,6-Dimethoxybenzyl) (2,4,4-Trimethylpentyl) Phosphine Oxide | 3 | 3 | 3 | 3 | 3 | 3 | 3 | 3 |
| gamma-Mercaptopropyl Trimethoxy Silane | 1 | 1 | 1 | 1 | 1 | 1 | 1 | 1 |
| Test Results | | | | | | | | |
| Viscosity mPa · s (25 C.) | 430 | 730 | 1200 | 2000 | 3270 | 5070 | 8500 | 14,500 |
| Urethane Concentration (%) | 1.25 | 1.5 | 1.75 | 2 | 2.25 | 2.5 | 2.75 | 3 |
| Fiber Pull-Out Friction (g/mm) | 20.5 | 22.7 | 23.9 | 28.7 | 26.4 | 35.2 | 31.8 | 40.1 |
| Crack Propagation (mm) | 2.31 | 2.32 | 1.96 | 1.89 | 1.8 | 1.77 | 1.75 | 1.51 |

The oligomers in Table 17 were formulated from the following components:
H = Hydroxyethylacrylate
I = Isophoronediisocyanate
PTGL 2000 = polymethyltetrahydrofurfuryl/polytetrahydrofurfuryl copolymer diol having an average molecular weight of 2000, (Mitsui, NY)

Figure 9:
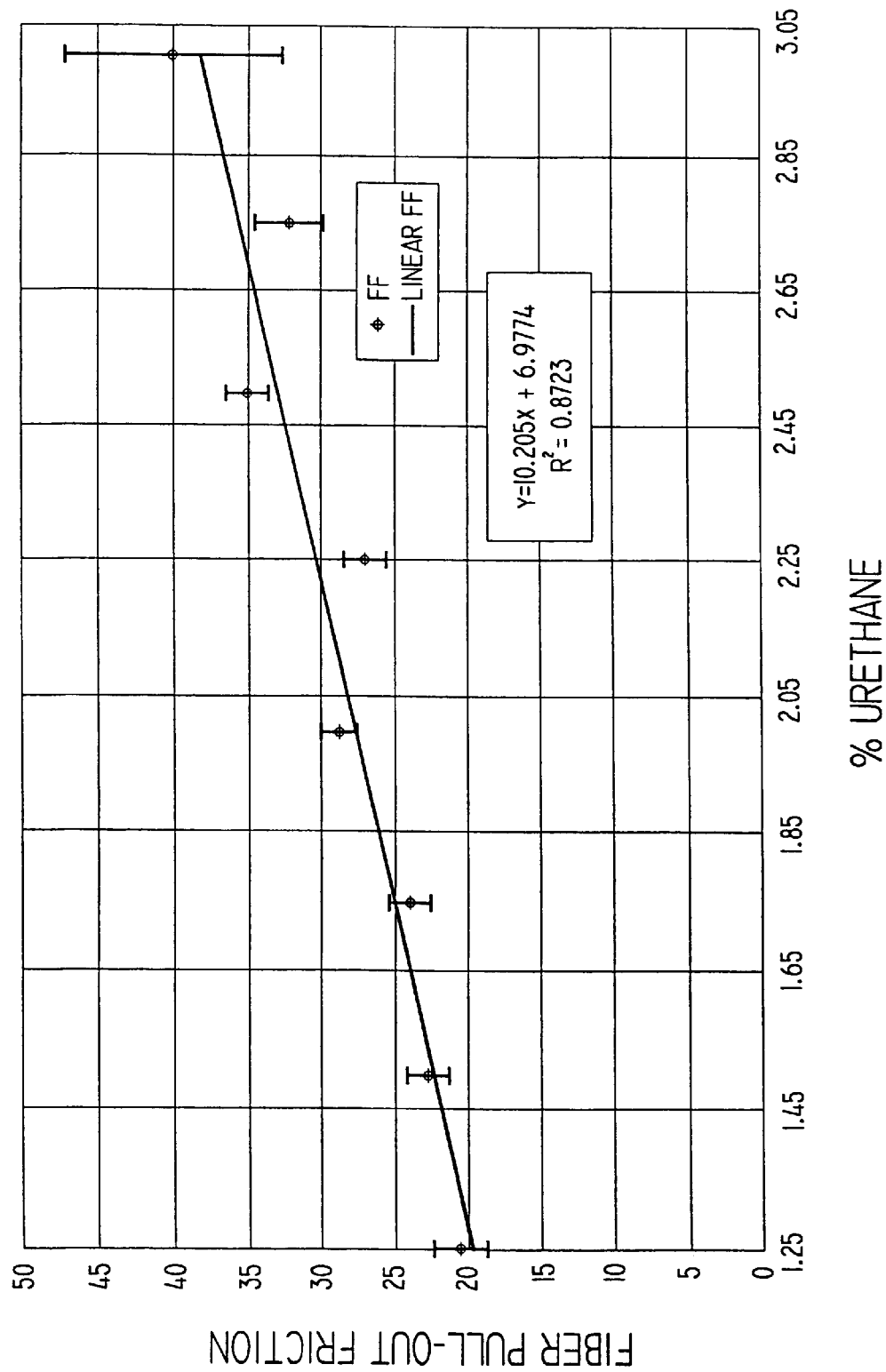
FIG. 9 illustrates a graph of the fiber pull-out friction versus urethane concentration.

FIG. 9 illustrates a graph of the experimental results of Examples 10-15 through 10-22. As can be seen from FIG. 9, as the urethane concentration decreases the fiber pull-out friction decreases.

EXAMPLES 10-22A THROUGH 10-24

Inner primary compositions were made by combining the components shown in Table 18, in the same manner as described herein above. The viscosity of the compositions was measured as described above, and the results are shown in Table 18. The inner primary compositions were cured by exposure to UV radiation and the fiber friction and crack propagation properties were measured, in the same manner as described herein above. The test results are shown in Table 18.

TABLE 18

|  | Example 10-22A | Example 10-23 | Example 10-24 |
|---|---|---|---|
| Component (% by weight based on total weight of composition) | | | |
| Oligomer H-I-PTGL4200-I-H | 0 | 49.38 | 45.01 |
| Oligomer H-(I-PTGL2000)$_2$-I-H | 49.38 | 0 | 0 |
| Monomer H-HI | 0 | 0 | 8.85 |
| Ethoxylated Nonylphenol Acrylate Ester | 40.32 | 40.32 | 36.75 |
| Thiodiethylene bis(3,5-di-tert-butyl-4-Hydroxy) Hydrocinnamate | 0.3 | 0.3 | 0.27 |
| Lauryl Acrylate | 6 | 6 | 5.47 |
| 2-Hydroxy-2-Methyl-1-Phenyl-1-Propanone Bis (2,6-Dimethoxybenzyl) (2,4,4-Trimethylpentyl) Phosphine Oxide | 3 | 3 | 2.73 |
| gamma-Mercaptopropyl Trimethoxy Silane | 1 | 1 | .91 |
| Test Results | | | |
| Viscosity mPa · s (25 C) | 9260 | 7050 | 5100 |
| Urethane Concentration (%) | 2.61 | 1.72 | 2.61 |

TABLE 18-continued

|  | Example 10-22A | Example 10-23 | Example 10-24 |
|---|---|---|---|
| Fiber Pull-Out Friction (g/mm) | 20.85 | 16.85 | 17.4 |
| Crack Propagation (mm) | 1.62 | 2.06 | 1.74 |

The oligomers and monomers in Table 18 were formulated from the following components:
H = Hydroxyethylacrylate
I = Isophoronediisocyanate
HI = Hexane isocyanate
PTGL 4200 = polymethyltetrahydrofurfuryl/polytetrahydrofurfuryl copolymer diol having an average molecular weight of 4200, (Mitsui, NY)
PTGL 2000 = polymethyltetrahydrofurfuryl/polytetrahydrofurfuryl copolymer diol having an average molecular weight of 2000, (Mitsui, NY)

By comparing Example 10-22A with 10-24, it becomes clear that by using a higher molecular weight polymeric block, 4200 g/mole in Example 10-24 compared to 2000 g/mole in Example 10-22A, the fiber friction can be significantly decreased and the crack propagation can be increased. The urethane concentration was the same for both Examples 10-22A and 10-24. The oligomer used contained a polyether backbone.

EXAMPLES 10-25 THROUGH 10-28

Inner primary compositions were made by combining the components shown in Table 19, in the same manner as described herein above. The viscosity of the compositions was measured as described above, and the results are shown in Table 19. The inner primary compositions were cured by exposure to UV radiation and the fiber friction and crack propagation properties were measured, in the same manner as described herein above. The test results are shown in Table 19.

TABLE 19

| Component (% by weight based on total weight of composition) | Ex. 10-25 | Ex. 10-26 | Ex. 10-27 | Ex. 10-28 |
|---|---|---|---|---|
| Oligomer H-I-(NissoPB2000)$_2$-I-H | 50 | 45 | 40 | 35 |
| Ethoxylated Nonylphenol Acrylate Ester | 29.5 | 34.5 | 39.5 | 44.5 |
| Isobornyl Acrylate | 10 | 10 | 10 | 10 |
| Thiodiethylene bis(3,5-di-tert-butyl-4-Hydroxy) Hydrocinnamate | 0.5 | 0.5 | 0.5 | 0.5 |
| Lauryl Acrylate | 6 | 6 | 6 | 6 |
| 2-Hydroxy-2-Methyl-1-Phenyl-1-Propanone Bis(2,6-Dimethoxybenzyl) (2,4,4-Trimethylpentyl) Phosphine Oxide | 3 | 3 | 3 | 3 |
| gamma-Mercaptopropyl Trimethoxy Silane | 1 | 1 | 1 | 1 |
| Test Results | | | | |
| Viscosity mPa · s (25 C) | | | | |
| Urethane Concentration (%) | 2.64 | 2.37 | 2.11 | 1.84 |
| Fiber Pull-Out Friction (g/mm) | 13.88 | 13.49 | 9.24 | 6.94 |
| Crack Propagation (mm) | 1.79 | 1.52 | * | * |

The oligomers and monomers in Table 19 were formulated from the following components:
H = Hydroxyethylacrylate
I = Isophoronediisocyanate
NissoPB 2000 = Polybutadiene copolymer diol having an average molecular weight of 2000, (Nippon Soda)
*The crack propagation could not be measured for these two coatings.

Figure 10:
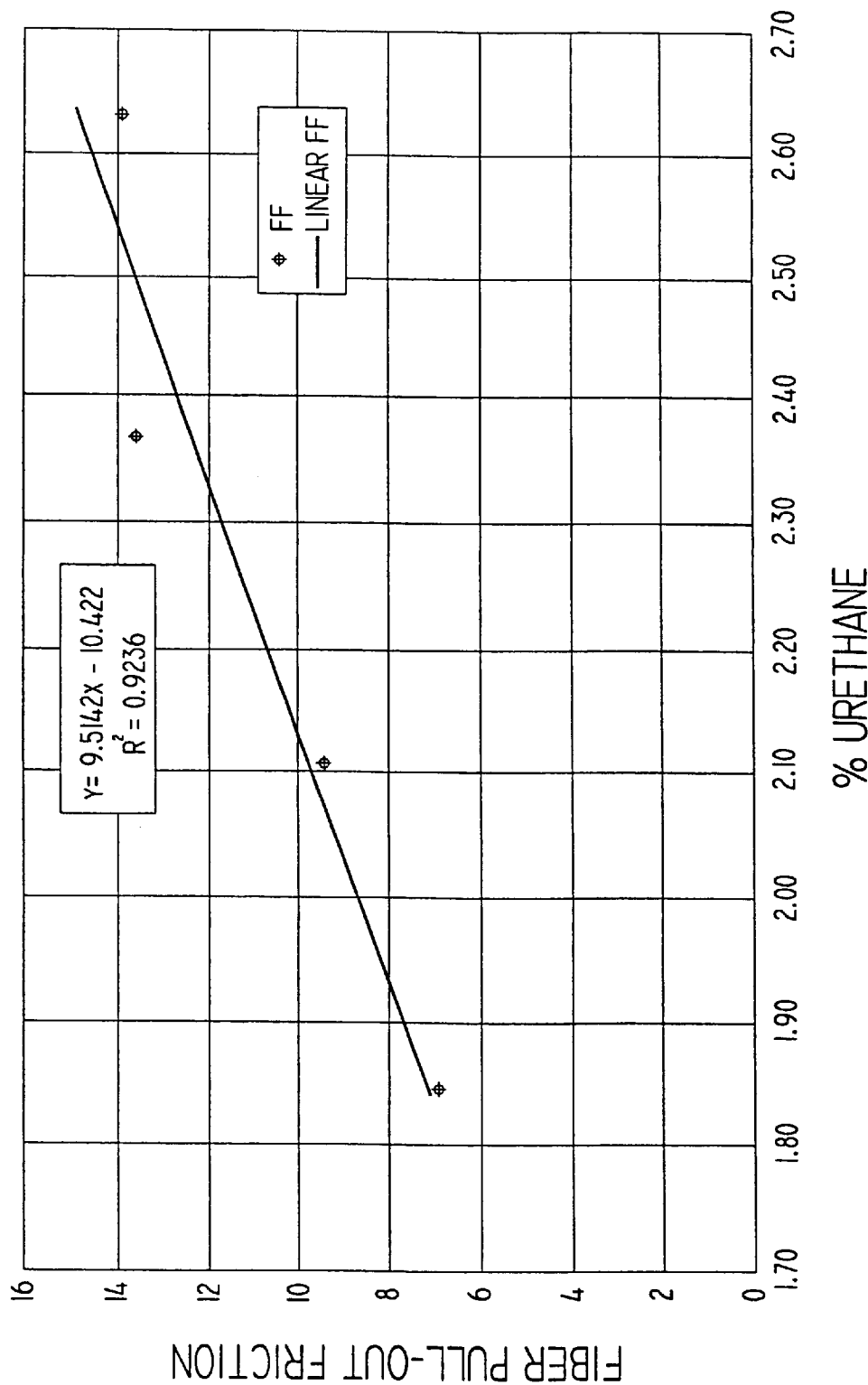
FIG. 10 illustrates a graph of the fiber pull-out friction versus urethane concentration.

FIG. 10 illustrates a graph of the experimental results of Examples 10-25 through 10-28. As can be seen from FIG. 10, as the urethane concentration decreases the fiber pull-out friction decreases. The oligomer used contained a polyolefin backbone.

EXAMPLES 10-29 THROUGH 10-32

Inner primary compositions were made by combining the components shown in Table 20 in the same manner as described herein above. The viscosity of the compositions was measured as described above, and the results are shown in Table 20. The inner primary compositions were cured by exposure to UV radiation and the fiber friction and crack propagation properties were measured, in the same manner as described herein above. The test results are shown in Table 20.

TABLE 20

| Component (% by weight based on total weight of composition) | Ex. 10-29 | Ex. 10-30 | Ex. 10-31 | Ex. 10-32 |
|---|---|---|---|---|
| Oligomer H-I-PTGL2000-I-H | 40 | 40 | 40 | 40 |
| H-BI | 0 | 4.24 | 9.18 | 14.12 |
| Ethoxylated Nonylphenol Acrylate Ester | 10 | 10 | 10 | 10 |
| Phenoxyethyl Acrylate | 45.5 | 41.26 | 36.32 | 31.38 |
| Thiodiethylene bis(3,5-di-tert-butyl-4-Hydroxy) Hydrocinnamate | 0.5 | 0.5 | 0.5 | 0.5 |
| 2-Hydroxy-2-Methyl-1-Phenyl-1-Propanone Bis(2,6-Dimethoxybenzyl) (2,4,4-Trimethylpentyl) Phosphine Oxide | 3 | 3 | 3 | 3 |
| gamma-Mercaptopropyl Trimethoxy Silane | 1 | 1 | 1 | 1 |
| Test Results | | | | |
| Viscosity mPa · s (25 C) | 770 | 810 | 870 | 950 |
| Urethane Concentration (%) | 2.5 | 3 | 3.5 | 4 |
| Fiber Pull-Out Friction (g/mm) | 39.1 | 40.4 | 42.7 | 47.9 |
| Crack Propagation (mm) | 1.27 | 1.24 | 1.28 | 1.13 |

Figure 11:
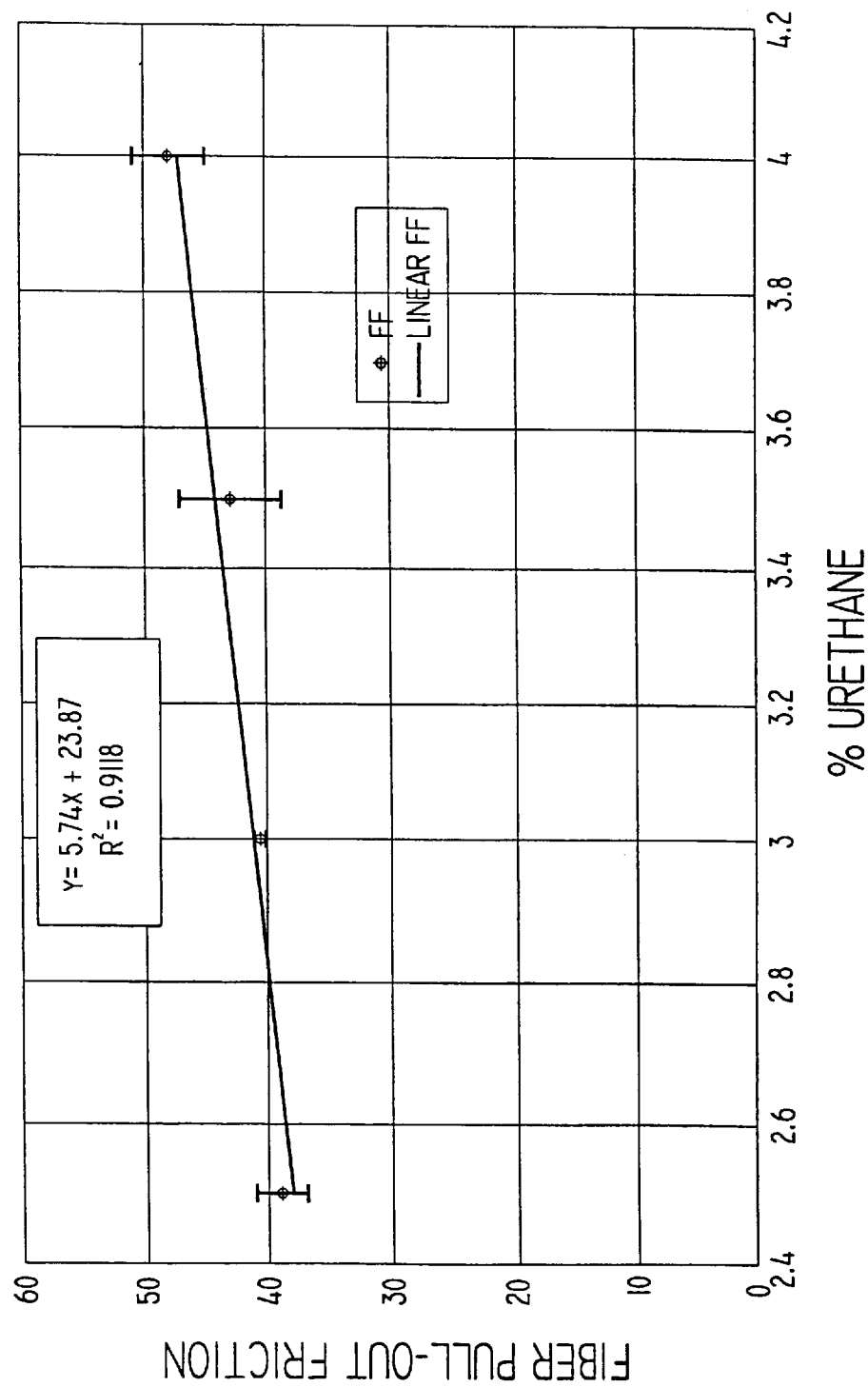
FIG. 11 illustrates a graph of the fiber pull-out friction versus urethane concentration.

The oligomers and monomers in Table 20 were formulated from the following components:
H = Hydroxyethyl Acrylate
I = Isophorone Diisocyanate
BI = Butyl Isocyanate FIG. 11 illustrates a graph of the experimental results of Examples 10-29 through 10-32. As can be seen from FIG. 11, as the urethane concentration decreases the fiber pull-out friction decreases.

EXAMPLES 10-33 THROUGH 10-36

Inner primary compositions were made by combining the components shown in Table 21, in the same manner as described herein above. The viscosity of the compositions was measured as described above, and the results are shown in Table 21. The inner primary compositions were cured by exposure to UV radiation and the fiber friction and crack propagation properties were measured, in the same manner as described herein above. The test results are shown in Table 21.

TABLE 21

| Component (% by weight based on total weight of composition) | Ex. 10-33 | Ex. 10-34 | Ex. 10-35 | Ex. 10-36 | Comp. Ex. J-1 |
|---|---|---|---|---|---|
| Oligomer H-I-PPG2025-I-Perm2000-I-H | 50 | 45 | 40 | 35 | 0 |
| Oligomer H-I-(PPG2025)$_{1.4}$-I-(Perm1000)$_{1.06}$-I-H | 0 | 0 | 0 | 0 | 70 |
| Ethoxylated Nonylphenol Acrylate Ester | 10 | 10 | 10 | 10 | 25.5 |
| Lauryl Acrylate | 6 | 6 | 6 | 6 | 0 |
| Thiodiethylene bis (3,5-di-tert-butyl-4-Hydroxy) Hydrocinnamate | 0.5 | 0.5 | 0.5 | 0.5 | 0.5 |
| 2-Hydroxy-2-Methyl-1-Phenyl-1-Propanone Bis (2,6-Dimethoxybenzyl) (2,4,4-Trimethylpentyl) Phosphine Oxide | 1.5 | 1.5 | 1.5 | 1.5 | 3 |
| gamma-Mercaptopropyl Trimethoxy Silane | 1 | 1 | 1 | 1 | 1 |

TABLE 21-continued

|  | Ex. 10-33 | Ex. 10-34 | Ex. 10-35 | Ex. 10-36 | Comp. Ex. J-1 |
|---|---|---|---|---|---|
| Test Results |  |  |  |  |  |
| Viscosity mPa · s (25 C.) |  |  |  |  | 6000 |
| Urethane Concentration (%) | 2.03 | 1.83 | 1.62 | 1.42 | 4.9 |
| Fiber Pull-Out Friction (g/mm) | 11.87 | 11.5 | 9.9 | 9.8 | 44 |
| Crack Propagation (mm) | 0 | 3.3 | 3.2 | 3.1 | 1 |

The oligomers and monomers in Table 21 were formulated from the following components:
H = Hydroxyethyl Acrylate
I = Isophorone Diisocyanate
Perm 1000 = Permanol KM10-1733 polycarbonate/polyether copolymer diol having an average molecular weight of 1000
PPG2025 = PC1122 a polycarbonate/polyether copolymer diol having an average molecular weight of 2000

The test results in Table 21 illustrate that as the urethane concentration decreases the fiber pull-out friction decreases and the crack propagation increases. The test results in Table 21 also illustrate that as the molecular weight of the polymeric block increases the fiber pull-out friction decreases and the crack propagation increases. The polymeric block used was a polycarbonate.

Ribbon Assemblies

Ribbon assemblies are now well known in the art and one skilled in the art will readily be able to use the disclosure provided herein to prepare the novel ribbon assemblies having enhanced ribbon strippability for the desired applications. The novel ribbon assembly made according to this invention can be advantageously used in various telecommunication systems. Such telecommunication systems typically include ribbon assemblies containing optical glass fibers, in combination with transmitters, receivers, and switches. The ribbon assemblies containing the coated optical glass fibers are the fundamental connecting units of telecommunication systems. The ribbon assembly can be buried under ground or water for long distance connections, such as between cities. The ribbon assembly can also be used to connect directly to residential homes.

The novel ribbon assembly made according to this invention can also be used in cable television systems. Such cable television systems typically include ribbon assemblies containing optical glass fibers, transmitters, receivers, and switches. The ribbon assemblies containing the coated optical glass fibers are the fundamental connecting units of such cable television systems. The ribbon assembly can be buried under ground or water for long distance connections, such as between cities. The ribbon assembly can also be used to connect directly to residential homes.

The novel ribbon assemblies can also be used in a wide variety of technologies, including but not limited to, various security systems, data transmission lines, high density television, and computer appliance systems. It will be appreciated that as a result of the fundamental discoveries described herein including the relationship between the fiber friction forces and the cohesive strength of the coatings themselves, and the means to control and establish such features and functions, the optical fiber art is now able to realize significant advantages. These are primarily exhibited, as explained above, in the stripping and cable splicing function, but those operations are nonetheless critical in the establishment of a ribbon/cable network of communication.

While the invention has been described in detail and with reference to specific embodiments thereof, it will be apparent to those of ordinary skill in the art that various changes and modifications can be made to the claimed invention without departing from the spirit and scope thereof. For instance, while this invention has principally been described with reference to ribbon constructions and assemblies of optical fibers, it is equally adaptable to other geometric and structural arrays of multiple fiber conduits and cables.

Accordingly, applicants believe that the scope of this invention is defined solely by the terminology set forth in the following claims and is not otherwise limited.

What is claimed is:

1. A composition for coating an optical fiber, said composition comprising a polyester oligomer having at least one functional group capable of polymerizing under the influence of radiation, said composition after radiation cure having the combination of properties of:
   (a) a fiber pull-out friction of less than 40 g/mm at 90° C.;
   (b) a crack propagation of greater than 1.0 mm at 90° C.;
   (c) a glass transition temperature of −10° C. or less; and
   (d) sufficient adhesion to said fiber to prevent delamination in the presence of moisture and during handling.

2. A coated optical fiber comprising at least an inner primary coating and an outer primary coating, wherein said inner primary coating is obtained by curing the composition of claim 1.

3. A ribbon assembly comprising:
   (i) a plurality of coated optical fibers, at least one of said coated optical fibers being the coated optical fiber of claim 2, and
   (ii) a matrix material bonding said plurality of coated optical fibers together.

4. The composition of claim 1, wherein said oligomer comprises a polyether polyol residue.

5. The coated optical fiber of claim 2, wherein said oligomer comprises a polyether polyol residue.

6. The ribbon assembly of claim 3, wherein said oligomer comprises a polyether polyol residue.

7. The composition of claim 1, further comprising gamma-mercaptopropyl trimethoxysilane.

8. The coated optical fiber of claim 2, wherein said composition further comprises gamma-mercaptopropyl trimethoxysilane.

9. The ribbon assembly of claim 3, wherein said composition further comprises gamma-mercaptopropyl trimethoxysilane.

10. The coated optical fiber of claim 2, wherein the ratio of the change in length of said inner primary coating to the change in length of said outer primary coating is less than 2 when said coatings are heated from 25° C. to stripping temperature.

11. The ribbon assembly of claim 3, wherein the ratio of the change in length of said inner primary coating to the change in length of said outer primary coating is less than 2 when said coatings are heated from 25° C. to stripping temperature.

12. A composition for coating an optical fiber, said composition comprising a fluorinated oligomer having at least one functional group capable of polymerizing under the influence of radiation, said composition after radiation cure having the combination of properties of:

(a) a fiber pull-out friction of less than 40 g/mm at 90° C.;

(b) a crack propagation of greater than 1.0 mm at 90° C.;

(c) a glass transition temperature of 10° C. or less; and (d) sufficient adhesion to said fiber to prevent delamination in the presence of moisture and during handling.

13. A coated optical fiber comprising at least an inner primary coating and an outer primary coating, wherein said inner primary coating is obtained by curing the composition of claim 12.

14. A ribbon assembly comprising:

(i) a plurality of coated optical fibers, at least one of said coated optical fibers being the coated optical fiber of claim 13; and (ii) a matrix material bonding said plurality of coated optical fibers together.

15. The composition of claim 12, wherein said oligomer is obtained by reacting a fluorinated compound having hydroxyl functionality with a diisocyanate and hydroxyethylacrylate.

16. The coated optical fiber of claim 13, wherein said oligomer is obtained by reacting a fluorinated compound having hydroxyl functionality with a diisocyanate and hydroxyethylacrylate.

17. The ribbon assembly of claim 14, wherein said oligomer is obtained by reacting a fluorinated compound having hydroxyl functionality with a diisocyanate and hydroxyethylacrylate.

18. The composition of claim 12, further comprising gamma-mercaptopropyl trimethoxysilane.

19. The coated optical fiber of claim 13, wherein said composition further comprises gamma-mercaptopropyl trimethoxysilane.

20. The ribbon assembly of claim 14, wherein said composition further comprises gamma-mercaptopropyl trimethoxysilane.

21. The composition of claim 12, wherein said glass transition temperature is −10° C. or less.

22. The coated optical fiber of claim 13, wherein said glass transition temperature is −10° C. or less.

23. The ribbon assembly of claim 14, wherein said glass transition temperature is −10° C. or less.

24. The coated optical fiber of claim 13, wherein the ratio of the change in length of said inner primary coating to the change in length of said outer primary coating is less than 2 when said coatings are heated from 25° C. to stripping temperature.

25. The ribbon assembly of claim 14, wherein the ratio of the change in length of said inner primary coating to the change in length of said outer primary coating is less than 2 when said coatings are heated from 25° C. to stripping temperature.

* * * * *